US007512454B1

(12) United States Patent
Li et al.

(10) Patent No.: US 7,512,454 B1
(45) Date of Patent: Mar. 31, 2009

(54) DISPLAY UNIT WITH PROCESSOR AND COMMUNICATION CONTROLLER

(75) Inventors: Yiwei Li, Austin, TX (US); Steven C. Nettles, Johnson City, TX (US); Larry D. Barto, Austin, TX (US); Gustavo Mata, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 1400 days.

(21) Appl. No.: 10/160,956

(22) Filed: May 31, 2002

Related U.S. Application Data

(63) Continuation of application No. 09/732,291, filed on Dec. 8, 2000, now Pat. No. 6,549,970.

(51) Int. Cl.
*G06F 19/00* (2006.01)
(52) U.S. Cl. ...................................................... 700/97
(58) Field of Classification Search .................. 700/97, 700/121, 100, 8; 705/8; 358/1.13
See application file for complete search history.

(56) References Cited

U.S. PATENT DOCUMENTS

| 4,796,194 | A | | 1/1989 | Atherton ..................... 364/468 |
| 4,800,376 | A | | 1/1989 | Suga et al. |
| 5,031,118 | A | | 7/1991 | Morizot |
| 5,093,794 | A | | 3/1992 | Howie et al. ................. 364/468 |
| 5,109,434 | A | | 4/1992 | Shimizu et al. |
| 5,369,570 | A | * | 11/1994 | Parad ............................ 705/8 |
| 5,375,061 | A | | 12/1994 | Hara et al. ................... 364/468 |
| 5,444,632 | A | * | 8/1995 | Kline et al. .................. 700/100 |
| 5,446,671 | A | * | 8/1995 | Weaver et al. ............... 700/100 |
| 5,548,535 | A | | 8/1996 | Zvonar ...................... 364/551.01 |
| 5,586,021 | A | | 12/1996 | Fargher et al. ......... 364/468.06 |
| 5,835,688 | A | | 11/1998 | Fromherz .................... 395/112 |
| 5,890,134 | A | | 3/1999 | Fox .................................. 705/9 |
| 5,953,229 | A | * | 9/1999 | Clark et al. ................. 700/100 |
| 6,038,539 | A | | 3/2000 | Maruyama et al. ............. 705/8 |

(Continued)

FOREIGN PATENT DOCUMENTS

DE       37 22 169 A1       1/1989

OTHER PUBLICATIONS

International Search Report dated Sep. 30, 2003 (PCT/US02/41777; TT4739-PCT).

(Continued)

*Primary Examiner*—Charles D. Garber
*Assistant Examiner*—Andre' C Stevenson
(74) *Attorney, Agent, or Firm*—Williams, Morgan & Amerson, P.C.

(57) ABSTRACT

A method and apparatus for scheduling appointments in a manufacturing process flow are disclosed. The method and apparatus include a number of aspects including appointments in which processing windows float within commitment windows; appointments in which the processing windows include consumption and processing intervals and in which the processing windows can overlap with the processing interval of other appointments; the use of different kinds of calendars including different types of appointments maintained in a variety of states; a calendaring system in which appointments are constrained by the implicit constraints not represented by booked appointments as well as the explicit constraints represented by booked appointments; calendar manipulation techniques used in managing the calendars; and corresponding appointments maintained over multiple calendars in a synchronized manner.

40 Claims, 12 Drawing Sheets

U.S. PATENT DOCUMENTS

| | | | | |
|---|---|---|---|---|
| 6,088,626 | A | 7/2000 | Lilly et al. | 700/100 |
| 6,091,998 | A | 7/2000 | Vasko et al. | 700/100 |
| 6,128,542 | A | 10/2000 | Kristoff et al. | 700/97 |
| 6,148,239 | A | 11/2000 | Funk et al. | 700/1 |
| 6,202,062 | B1 | 3/2001 | Cameron et al. | 707/3 |
| 6,263,255 | B1 | 7/2001 | Tan et al. | 700/121 |
| 6,356,797 | B1 | 3/2002 | Hsieh et al. | 700/101 |
| 6,374,144 | B1 | 4/2002 | Viviani et al. | 700/12 |
| 6,400,999 | B1 | 6/2002 | Kashiyama et al. | 700/100 |
| 6,434,443 | B1 * | 8/2002 | Lin | 700/100 |
| 6,438,436 | B1 * | 8/2002 | Hohkibara et al. | 700/97 |
| 6,584,369 | B2 | 6/2003 | Patel et al. | 700/100 |

OTHER PUBLICATIONS

U.S. Appl. No. 10/331,715, filed Dec. 30, 2002, Nettles et al.
U.S. Appl. No. 10/331,598, filed Dec. 30, 2000, Barto et al.
U.S. Appl. No. 10/331,596, filed Dec. 30, 2002, Barto et al.
U.S. Appl. No. 10/284,705, filed Oct. 31, 2002, Nettles et al.
U.S. Appl. No. 10/233,197, filed Aug. 30, 2002, Barto et al.
U.S. Appl. No. 10/232,145, filed Aug. 30, 2002, Barto et al.
U.S. Appl. No. 10/231,930, filed Aug. 30, 2002, Barto et al.
U.S. Appl. No. 10/231,888, filed Aug. 30, 2002, Barto et al.
U.S. Appl. No. 10/231,849, filed Aug. 30, 2002, Barto et al.
U.S. Appl. No. 10/231,648, filed Aug. 30, 2002, Barto et al.
U.S. Appl. No. 10/231,561, filed Aug. 30, 2002, Barto et al.
U.S. Appl. No. 10/190,194, filed Jul. 3, 2002, Li et al.
U.S. Appl. No. 10/160,990, filed May 31, 2002, Mata et al.
U.S. Appl. No. 10/160,956, filed May 31, 2002, Li et al.
U.S. Appl. No. 10/135,145, filed Apr. 30, 2002, Mata et al.

* cited by examiner

DISPLAY UNIT WITH PROCESSOR AND COMMUNICATION CONTROLLER

CROSS REFERENCE TO RELATED APPLICATION

This is a continuation of U.S. application Ser. No. 09/732,291, filed Dec. 8, 2000, now U.S. Pat. No. 6,549,970, issued Apr. 15, 2003, which is related to U.S. application Ser. No. 09/732,291, filed on the same date, now U.S. Pat. No. 6,513,008, issued Jan. 28, 2003, which is a continuation of U.S. application Ser. No. 09/265,363, filed Mar. 10, 1999, now U.S. Pat. No. 6,247,090, issued Jun. 12, 2001, which is a continuation of U.S. application Ser. No. 08/833,346, filed Apr. 4, 1997, now U.S. Pat. No. 5,887,147, issued Mar. 23, 1999, which is a continuation of U.S. application Ser. No. 08/598,903, filed Feb. 9, 1996, now U.S. Pat. No. 5,652,845, issued Jul. 29, 1997, which is a continuation of U.S. application Ser. No. 08/190,848, filed Feb. 3, 1994, now abandoned, the subject matter of which is incorporated by reference herein.

The United States Government has a paid-up license in this invention and the right in limited circumstances to require the patent owner to license others on reasonable terms as provided for by the terms of Cooperative Agreement No. 70NANB7H3041 awarded by the United States Department of Commerce, National Institute of Standards and Technology ("NIST"), Advanced Technology Program ("ATP").

BACKGROUND OF THE INVENTION

1. Field of the Invention

This invention pertains to automated manufacturing environments, and, more particularly, to the utilization of scheduling calendars and appointments in an automated manufacturing environment employing agent-based scheduling and factory control.

2. Description of the Related Art

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers. The fabrication process generally involves processing a number of wafers through a series of fabrication tools. Layers of materials are added to, removed from, and/or treated on a semiconducting substrate during fabrication to create the integrated circuits. The fabrication essentially comprises the following four basic operations:

layering, or adding thin layers of various materials to a wafer from which a semiconductor is produced;

patterning, or removing selected portions of added layers;

doping, or placing specific amounts of dopants in selected portions of the wafer through openings in the added layers; and heat treating, or heating and cooling the materials to produce desired effects in the processed wafer.

Although there are only four basic operations, they can be combined in hundreds of different ways, depending upon the particular fabrication process. See, e.g., Peter Van Zant, *Microchip Fabrication A Practical Guide to Semiconductor Processing* (3d Ed. 1997 McGraw-Hill Companies, Inc.) (ISBN 0-07-067250-4). Each fabrication tool performs one or more of four basic operations. The four basic operations are performed in accordance with an overall process to finally produce the finished semiconductor devices.

Controlling a semiconductor factory fabricating such integrated circuits, however, is a challenging task. A semiconductor factory ("fab") is a complex environment where numerous parts, typically 40,000 wafers or more, and numerous part types, typically 100 part types or more, are simultaneously being manufactured. As each wafer moves through the semiconductor factory (or, "fab"), it may undergo more than 300 processing steps, many of which use the same machines. A large factory may contain approximately 500 computer-controlled machines to perform this wafer processing. Routing, scheduling, and tracking material through the fab is a difficult and complicated task, even with the assistance of a computerized factory control system.

Efficient management of a facility for manufacturing products such as semiconductor chips requires monitoring various aspects of the manufacturing process. For example, it is typically desirable to track the amount of raw materials on hand, the status of work-in-process and the status and availability of machines and tools at every step in the process. One of the most important decisions is selecting which lot should run on each machine at any given time. Additionally, most machines used in the manufacturing process require scheduling of routine preventative maintenance ("PM") and equipment qualification ("Qual") procedures, as well as other diagnostic and reconditioning procedures that must be performed on a regular basis. These procedures should be performed such that they do not impede the manufacturing process itself.

One approach to this issue implements an automated "Manufacturing Execution System" ("MES"). An automated MES enables a user to view and manipulate, to a limited extent, the status of machines and tools, or "entities," in a manufacturing environment. In addition, an MES permits dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the MES database with respect to the status of that entity. Alternatively, if an entity is to be put down for repair or maintenance, the operator will log this information into the MES database, which then prevents use of the entity until it is subsequently logged back up to a production ready state.

Although MES systems are sufficient for tracking lots and machines, such systems suffer several deficiencies, the most obvious of which are their passive nature, lack of advance scheduling and inability to support highly automated factory operations. Current MES systems largely depend on manufacturing personnel for monitoring factory state and initiating activities at the correct time. For example, a lot does not begin processing until a wafer fab technician ("WFT") issues the appropriate MES command. And, prior to processing, a WFT must issue an MES command to retrieve the lot from the automated material handling system ("AMHS") with sufficient advance planning that the lot is available at the machine when the machine becomes available. If the WFT does not retrieve the lot soon enough, or neglects to initiate processing at the earliest available time, the machine becomes idle and production is adversely impacted.

These types of deficiencies in the typical automated MES emphasize the importance of the WFT in the efficient operation of the manufacturing process. WFTs perform many vital functions. For instance, WFTs initiate dispatching, transport, and processing as their attention and time permits. They make scheduling decisions such as whether to run an incomplete batch, as opposed to waiting for additional approaching lots, or performing PM or qualification procedures instead of processing lots. WFTs perform non-value added MES transactions and utilize conventional factory control systems that are passive. In this context, the term "passive" means activities in the control system must be initiated by the WFT, as opposed to being self-starting or self-initiating.

However, the presence of WFTs also inevitably introduces some inefficiencies. There typically is a large difference between the performance of the best WFT and the performance of the worst WFT. A WFT typically simultaneously monitors the processing of multiple tools and lots, making it difficult to focus on an individual lot or tool. Furthermore, the size and complexity of the modern fabrication process flows makes it exceedingly difficult for a WFT to foresee and prevent downstream bottlenecks or shortages arising from upstream activities. Shift changes, rest breaks, and days off for the WFT also create inefficiencies or machine idle time that adversely impact the manufacturing process flow. Just as the importance of the WFT is magnified by the deficiencies of the automated MES, so are the inefficiencies of the WFT magnified by his importance.

Thus, factory control systems utilized in today's wafer fabs are passive and do not enable a high degree of automation. These systems are very dependent on WFTs and other factory staff to monitor the state of the factory, to continuously react to change, to make rapid logistical decisions, and to initiate and coordinate factory control activity in a timely manner. These WFTs are agents, providing the active element that is lacking in factory control systems. As a result, factory effectiveness in the highly competitive semiconductor industry is quite dependent on the availability, productivity, skill level, and consistency of these human agents. WFTs must monitor and operate a number of tools located in various bays in a fab. They are forced to multiplex across tools, bays, material handling systems and a variety of factory control systems. As a fab's production ramps and more complex processes are introduced, it becomes more difficult to meet the increased complexity and volume without increasing staff or system capabilities. WFTs visibility of upstream and downstream operations, tool state, work-in-process and resource availability is limited.

However, key logistical decisions are frequently based on this limited and dated information, which is only partially provided by factory control systems. WFTs spend a significant amount of time interacting with systems, monitoring factory events and state changes, and performing other non-value added functions, such as MES logging. Shift changes disrupt the operation of the fab as the technicians are temporarily unable to provide required monitoring and coordination. Despite the best efforts of the technicians, utilization of tools suffer, adversely impacting other key factory metrics including cycle time, inventory levels, factory output and mix. With the need for intrabay material handling to transport 12-inch wafers in new 300 mm wafer fabs, significant additional complexity is introduced. Conventional factory control systems are not capable of providing this level of detailed scheduling and execution control.

The present invention is directed to resolving, or at least reducing, one or all of the problems mentioned above.

SUMMARY OF THE INVENTION

A method and apparatus for scheduling appointments in a manufacturing process flow are disclosed. The method and apparatus include a number of aspects including appointments in which processing windows float within commitment windows; appointments in which the processing windows include consumption and processing intervals and in which the processing windows can overlap; the use of different kinds of calendars including different types of appointments maintained in a variety of states; a calendaring system in which new appointments are constrained by the implicit constraints represented by previously booked appointments as well as the explicit constraints represented by those previously booked appointments; calendar manipulation techniques used in managing the calendars; and corresponding appointments maintained over multiple calendars in a synchronized manner.

BRIEF DESCRIPTION OF THE DRAWINGS

The invention may be understood by reference to the following description taken in conjunction with the accompanying drawings, in which like reference numerals identify like elements, and in which.

Figure 1:
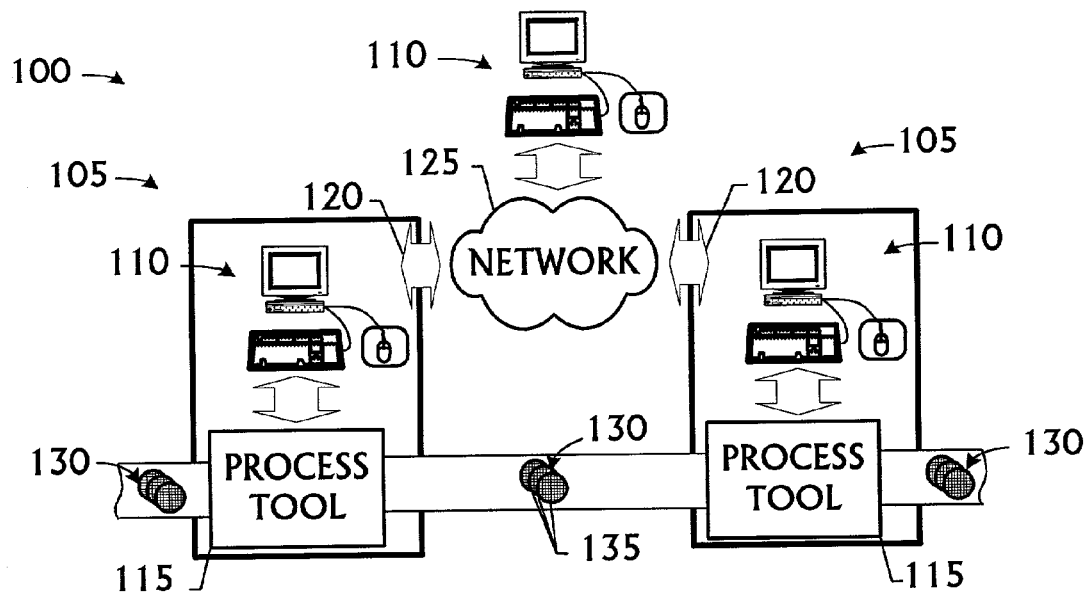
FIG. 1 conceptually depicts a portion of one particular embodiment of a process flow constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates a portion of one particular embodiment of a process flow 100 constructed and operated in accordance with the present invention. The process flow 100 fabricates semiconductor devices. However, the invention may be applied to other types of manufacturing processes. Thus, in the process flow 100 discussed above, the lots 130 of wafers 135 may more generically referred to as "work pieces." The process tools 115 and any process operation performed thereon need not necessarily be related to the manufacture of semiconductor devices in all embodiments. However, for the sake of clarity and to further an understanding of the invention, the terminology pertaining to semiconductor fabrication shall be retained in disclosing the invention in the context of the illustrated embodiments.

The illustrated portion of the process flow 100 includes two stations 105, each station 105 including a computing device 110 communicating with a process tool 115. The stations 105 communicate with one another over communications links 120. In the illustrated embodiment, the computing devices 110 and the communications links 120 comprise a portion of a larger computing system, e.g., a network 125. The process tools 115 are shown in FIG. 1 processing lots 130 of wafers 135 that will eventually become integrated circuit devices.

Figure 2:
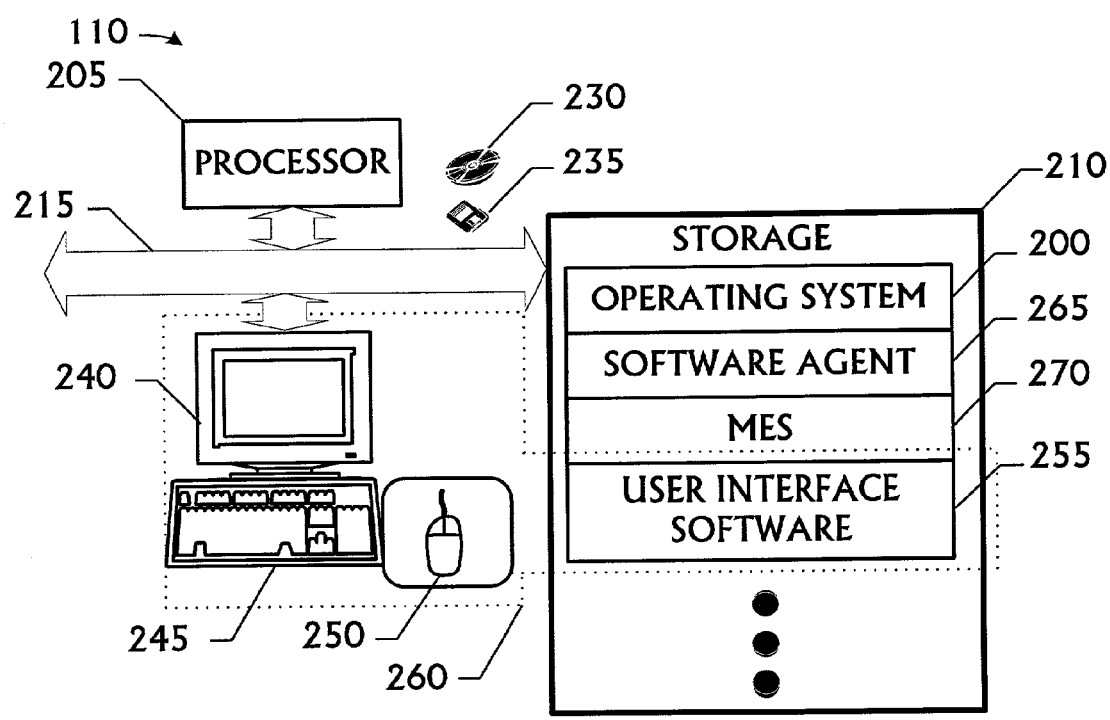
FIG. 2 conceptually depicts, in a partial block diagram, selected portions of the hardware and software architectures, respectively, of the computing devices in FIG. 1.

FIG. 2 depicts selected portions of the hardware and software architectures of the computing devices 110 programmed and operated in accordance with the present invention. Some aspects of the hardware and software architecture (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing devices 110 will include many such routine features that are omitted from FIG. 2.

In the illustrated embodiment, the computing device 110 is a workstation, employing a UNIX-based operating system 200, but the invention is not so limited. The computing device 110 may be implemented in virtually any type of electronic computing device such as a notebook computer, a desktop computer, a mini-computer, a mainframe computer, or a supercomputer. The computing device 110 may even be, in some alternative embodiments, a processor or controller embedded in the process tool 115. The invention also is not limited to UNIX-based operating systems. Alternative operating systems (e.g., Windows™-based or disk operating system ("DOS")-based) may also be employed. The invention is not limited by these aspects of any particular implementation of the computing device 110.

The computing device 110 also includes a processor 205 communicating with storage 210 over a bus system 215. The storage 210 typically includes at least a hard disk (not shown) and random access memory ("RAM") (also not shown). The computing device 110 may also, in some embodiments, include removable storage such as an optical disk 230, or a floppy electromagnetic disk 235, or some other form, such as a magnetic tape (not shown) or a zip disk (not shown). The computing device 110 includes a monitor 240, keyboard 245, and a mouse 250, which together, along with their associated user interface software 255 comprise a user interface 260. The user interface 260 in the illustrated embodiment is a graphical user interface ("GUI"), although this is not necessary to the practice of the invention.

The processor 205 may be any suitable processor known to the art. For instance, the processor may be a general purpose microprocessor or a digital signal processor ("DSP"). In the illustrated embodiment, the processor 205 is an Athlon™ 64-bit processor commercially available from Advanced Micro Devices, Inc. ("AMD"), but the invention is not so limited. The 64-bit UltraSPARC™ or the 32-bit microSPARC™ from Sun Microsystems, any of the Itanium™ or Pentium™-class processors from Intel Corporation, and the Alpha™ processor from Compaq Computer Corporation might alternatively be employed.

Each computing device 110 includes, in the illustrated embodiment, a software agent 265 residing in the storage 210. Note that the software agents 265 may reside in the process flow 100 in places other than the computing devices 110. The situs of the software agent 265 is not material to the practice of the invention. Note also that, since the situs of the software agents 265 is not material, some computing devices 110 may have multiple software agents 265 residing thereon while other computing devices 110 may not have any. At least a portion of an automated MES 270, such as WORK-STREAM™, resides on at least one computing device 110.

Returning briefly to FIG. 1, as was mentioned above, the computing devices 110 may also be part of a larger computing system 125 by a connection over the communications links 120. Exemplary computing systems in such an implementation would include local area networks ("LANs"), wide area networks ("WANs"), system area networks ("SANs"), intranets, or even the Internet. The computing system 125 employs a networked client/server architecture, but alternative embodiments may employ a peer-to-peer architecture. Thus, in some alternative embodiments, the computing devices 110 may communicate directly with one another. The communications links 120 may be wireless, coaxial cable, optical fiber, or twisted wire pair links, for example. The computing system 125, in embodiments employing one, and the communications links 120 will be implementation specific and may be implemented in any suitable manner known to the art. The computing system 125 may employ any suitable communications protocol known to the art, e.g., Transmission Control Protocol/Internet Protocol ("TCP/IP").

Referring now to both FIG. 1 and FIG. 2, the software agents 265, collectively, are responsible for efficiently scheduling and controlling the lots 130 of wafers 135 through the fabrication process. The software agents 265 each represent some "manufacturing domain entity," e.g., a lot 130, a process tool 115. Some of these manufacturing domain entities, e.g., the lots 130, are "consumers," i.e., they consume process resources. Some of these manufacturing domain entities are "providers," i.e., they provide process resources to be consumed. For instance, a process tool 115 represents a resource that may be consumed, e.g., process time, in the process flow 100. A process tool 115 may be a fabrication tool used to fabricate some portion of the wafers 135, i.e., layer, pattern, dope, or heat treat the wafers 135. Or, the process tool 115 may be a metrology tool used to evaluate the performance of various parts of the process flow 100. Note some manufacturing domain entities may sometimes be classed as a provider in one context and a consumer in another context, depending on their role in the process flow 100 at any given time.

Thus, some of the software agents 265 represent the interests of consumers, e.g., the lots 130 or PM procedures (not shown), in advancing the lots 130 through the process flow 100 in a timely and efficient manner. Some of the software agents 265 represent the interests of providers, e.g., machines such as the process tool 115, in meeting the demands of consumers for processing resources in advancing the lots 130 through the process flow 100 in a timely and efficient manner. Because each manufacturing domain entity has at least one corresponding software agent 265, the software agents 265 are capable of assessing a plurality of resources for subsequent processing of the lots 130 of wafers 135. As part of their responsibility to schedule and control the lots 130 through the process flow 100, the software agents 265 negotiate among themselves for the allocation of those process resources for subsequent processing of the lot 130 of wafers 135. The software agents 265 then allocate those resources and, ultimately, they are consumed as the lots 130 move through the process flow 100.

In the illustrated embodiment, the software agents 265 are intelligent, state aware, and are imbued with specific goals for which they autonomously initiate behaviors to achieve. The software agents 265 are implemented as objects in an object oriented programming ("OOP") environment, but the invention may be implemented using techniques that are not object oriented. Their behavior is relatively simple and is influenced by scripts, rules and external properties. The behavior is designed to achieve selected goals such as achieving an assigned lot due date, achieving a predefined level of quality, maximizing machine utilization, and scheduling opportunistic preventive maintenance. In furtherance of these objectives, the software agents 265 interface with the MES 270 and are integrated with other existing factory control systems (not shown). As will be apparent to those skilled in the art having the benefit of this disclosure, the manner in which this interface and integration occurs is implementation specific, depending upon the makeup and configuration of the MES 270 and the factory control systems.

Collectively, the software agents 265 schedule ahead for each lot 130 one or more operations on a specific qualified process tool 115, including transports and resources, as discussed further below. In the illustrated embodiment, for instance, the software agents schedule the lots 130 for processing on the process tools 115, as well as PMs and Quals for the process tools 115. This scheduling includes making optimizing decisions such as running an incomplete batch, as opposed to waiting for an approaching lot 130, and scheduling opportunistic preventive maintenance ("PM") procedures or qualification tests ("Quals") to meet specifications. The software agents 265 schedule activities such as lot transport and processing, perform MES transactions, monitor processing and transport, and react to deviations from scheduled activities or unscheduled activities.

The scheduling decisions in this particular embodiment are made by the software agents 265 based on a "contract net negotiation protocol." Note, however, that other scheduling approaches might be implemented in conjunction with the present invention. To further the implementation of the contract net negotiation protocol for allocating resources, an appointment commitment window concept and powerful calendar manipulating routines are used to implement a floating appointment model approach. Each scheduling agent 265 maintains a "calendar" on which it books appointments for the respective entity, e.g., process tool 115, lot 130, PM, Qual, or resource. The appointments scheduled through the scheduling decisions of the software agents 265 are "booked" on both the consumer and the provider's calendars. The appointment is booked for a duration in which it is expected the scheduled task will be accomplished.

Figure 3:
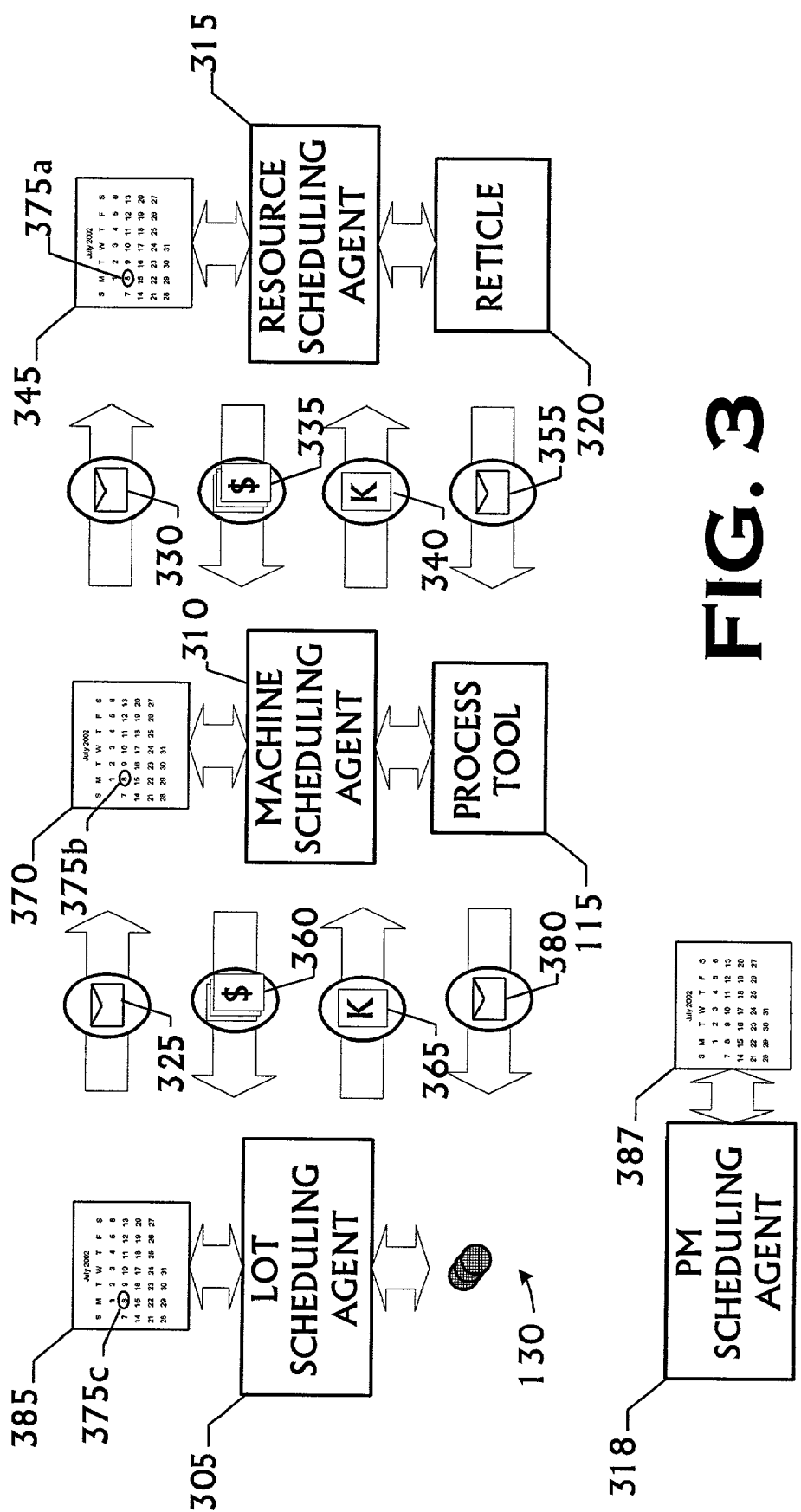
FIG. 3 conceptually depicts one particular implementation of the apparatus of FIG. 1, i.e., a portion of a process flow from a semiconductor fabrication facility, and the manner in which it schedules appointments for the consumption of resources.

FIG. 3 illustrates the negotiation for and scheduling of processing appointments in one particular implementation 300 of the semiconductor fabrication process flow 100 first shown in FIG. 1. The process flow 300 implements a contract net negotiation protocol for scheduling purposes. More particularly, the process flow 300 includes:
- a lot scheduling agent ("LSA") 305 representing the lot 130, which is a consumer;
- a machine scheduling agent ("MSA") 310 representing the process tool 115, which is both a consumer and a provider depending on the context in which it is operating;
- a resource scheduling agent ("RSA") 315 representing the reticle 320, which is a provider; and
- a PM scheduling agent ("PMSA") 318 which represents PMs and Quals (not shown), which are consumers.

The lot 130, process tool 115, reticle 320, and PMs and Quals also have corresponding "processing" agents (not shown) to whom the scheduling agents pass control when it is time to execute the scheduled activity. The LSA 305, MSA 310, RSA 315, PMSA 318, and the processing agents are but one particular implementation of the software agent 265 in FIG. 2.

Each of the scheduling agents 305, 310, 315, and 318, maintains and uses a respective calendar 385, 370, 345, and 387. More particularly:
- the LSA 305 keeps a lot calendar 385;
- the MSA 310 keeps a machine calendar 370;
- the RSA 315 keeps a resource calendar 345; and
- the PMSA 318 keeps a PM calendar 387.

The types of appointments booked on the calendars will depend on the nature of the entity represented by the scheduling agent 265. In the illustrated embodiment, for instance, the scheduling agents 305, 310, 315, and 318 book the types of appointments set forth in Table 1 on the calendars 385, 370, 345, and 387, respectively. Each of these appointment types is discussed in more detail below following Table 1.

As will be appreciated by those skilled in the art having the benefit of this disclosure, some PMs invoke the performance of follow-up Quals before the process tool 115 can be reintroduced to the process flow 100. The follow-up Quals are intended to ensure that the PM did not, e.g., upset the calibration of the process tool 115, etc. Other Quals, however, are "stand-alone" Quals, i.e. they are not invoked by the occurrence of a PM. Follow-up Quals, as opposed to stand-alone Quals, should be performed at a time determined by the performance of the PM. More particularly, the follow-up Quals should be performed after the PM that invokes them buy before any other kind of appointment.

To help insure that this happens, the illustrated embodiment treats follow-up Quals as part of the PM that invoices them. Thus, when the PM is scheduled, the follow-up Quals are automatically scheduled to be performed upon completing the PM. The follow-up Quals are not represented by separate appointments on the machine and MP calendars 370, 387 because they are considered a part of the PM that invokes them. The duration of the scheduled PM appointments is sufficient not only for the PM itself, but also any follow-ups Qual it invokes. Thus, Qual appointments are scheduled on the machine and PM calendars only for stand-alone Quals.

TABLE 1

Appointments Booked by Scheduling Agents

| Scheduling Agent | Calendar | Appointment | Appointment Description |
|---|---|---|---|
| LSA | Lot Calendar | Move Appointment | The lot is transported between bays ("intrabay") or within bays ("interbay") to the process tools. |
| | | Lot Appointment | The lot is processed on the process tools. |
| | | Load Appointment | The lot is loaded into the process tools. |
| | | Unload Appointment | The lot is unloaded from the process tools. |
| | | Feeder Appointment | The lot accounts for the cycle time of upstream, non-control operations when scheduling several operations in advance. |
| | | Max Move Appointment | The lot accounts for transport time from a feeder appointment until accurate moves can be scheduled from a specific process tool. |
| MSA | Machine Calendar | Lot Processing Appointment | A lot is processed on the process tools - corresponds to a "lot appointment" on a lot calendar. |
| | | Setup Appointment | Time during which the process tool is prepared, or "setup," for a different type of processing than it is currently processing. |
| | | PM Appointment | Period during which a PM is performed on the respective process tool - corresponds to a PM appointment on a PM calendar. |
| | | Qual Appointment | Period during which a stand-alone Qual is performed on the respective process tool - corresponds to a Qual appointment on a PM calendar. |
| | | Machine Batch Appointment | Multiple lots are assembled into a batch and processed simultaneously. |
| | | Unscheduled Downtime Appointment | An anticipated time during which a process tool that has unexpectedly gone down will remain down. The "anticipated time" is the mean time to repair ("MTTR") for process tools in the process flow, but can be any other suitable duration. |
| PMSA | PM Calendar | PM Appointment | Time during which a PM and any follow-up Quals required by the PM are performed on a process tool. |
| | | Qual Appointment | Time during which a stand-alone Qual is performed on a process tool. |

TABLE 1-continued

Appointments Booked by Scheduling Agents

| Scheduling Agent | Calendar | Appointment | Appointment Description |
|---|---|---|---|
| RSA | Resource Calendar | Load Lot Appointment | The lot is loaded into the process tool by the resource - corresponds to a load appointment on a lot calendar. |
| | | Unload Lot Appointment | The lot is unloaded from the process tool - corresponds to a unload appointment on a lot calendar. |
| | | Charge Lot Appointment | Process tool and resource specific appointment in which, e.g., loaded lots are placed into a furnace tube by a furnace loader. |
| | | Discharge Lot Appointment | Process tool and resource specific appointment in which, e.g., loaded lots are removed from a furnace tube by a furnace loader. |
| | | Resource Load Batch Appointment | An appointment for the associated resource to load a batch onto a respective process tool. |
| | | Resource Unload Batch Appointment | An appointment for the associated resource to unload a batch from a respective process tool. |
| | | Resource Charge Batch Appointment | An appointment for the associated resource to charge a batch into a portion of the respective process tool. |
| | | Resource Discharge Batch Appointment | An appointment for the associated resource to discharge a batch from a portion of the respective process tool. |
| | | PM Appointment | Period during which a PM is performed on the respective process tool - corresponds to a PM appointment on a PM calendar. |
| | | Qual Appointment | Period during which a Qual is performed on the respective process tool - corresponds to a Qual appointment on a PM calendar. |
| | | Downtime Appointment | Period during which the respective resource is expected to be down due to an unanticipated problem. The duration is set to the mean time to repair process tools 115 in the process flow 300, buy any suitable duration may be used. |

The LSA 305 tries to keep the lot 130 it represents on schedule. The MSA 310 tries to maximize utilization of the process tool 115 it represents. Similarly, the RSA 315 tries to maximize utilization of the reticle 320. Note that the RSA 315 can represent other types of resources, e.g., machine loading resource, dummy wafers, cassettes, wafer fab technicians, maintenance technicians, etc., in other implementations. The PMSA 318 attempts to opportunistically schedule PMs and Quals on, inter alia, the process tool 115. The various agents 305, 310, 315, and 318 do this in the context of negotiating appointments for the consumption of processing resources by adjusting the prices they offer or budgets to pay for services in accordance with the schedules they need to meet or want to keep.

More particularly, a lot 130 typically negotiates with a number of pieces of equipment, e.g., process tools 115. The LSA 305 tries to find a time slot offered by a process tool that will allow the lot 130 to meet its due date and feed the next bottleneck machine station at the appropriate time. At the same time, the MSA 310 tries to acquire lots 130 for processing in a way that optimizes the utilization of the process tool 115. Overall, the goals of the MSA 310 are to maximize the overall utilization of its respective process tool 115, respect the relative priority of the lots 130, reduce setup or recipe changes, and optimize its batch size. This collaboration of agent interaction results in the scheduling of a lot 130 on a particular process tool 115 within a specified time window.

In general terms, the LSA 305 begins the negotiation by publishing a "request bid" message 325 to all of the MSAs 310 representing process tools 115 capable of performing a desired manufacturing operation. At this point, a MSA 310 is acting as a provider because the process tool 115 is providing resources, i.e., processing time. The MSA 310 for each capable process tool 115, upon receipt of the request bid message 325, identifies a potential bid, and recognizes that it will need a qualified reticle 320 to perform the job, and publishes its own request bid message 330 to the RSAs 315 of all capable resources, i.e., qualified reticles 320. The MSA 310 has now shifted from a provider at this point to a consumer since the process tool 115 is now consuming process resources, i.e., time with the reticle 320. Each RSA 315 representing a qualified reticle 320 submits one or more bids 335, one of which the MSA 310 selects for inclusion in its bid 360. The MSA 310, having now identified the necessary resources, returns to its role as a provider of processing resources. If another potential bid is identified by the MSA 310, it once again requests bids from the appropriate RSAs 315.

Each MSA 310 representing a capable process tool 115 submits one or more bids 360 to the LSA 305 that published the request bid message 325. The LSA 305 selects one bid 360 from among all the bids 360 of all the MSAs 310. The LSA 305 then awards the contract 365 to the MSA 310 submitting the selected bid 360. The MSA 310 checks its machine calendar 370, determines that the bid is still available and, if so, awards the contract 340 to the reticle 320 that submitted the selected bid 335. The RSA 315 checks its resource calendar 345, sees that the bid is still available, and schedules the appointment 375a on its own resource calendar 345. The RSA 315 then confirms the contract with a "confirm bid" message 355, and the MSA 310 schedules an appointment 375b on its machine calendar 370, with a reference to the RSA 315 that provided the "resource" bid 335. The MSA 310 then sends a "confirmed bid" message 380 to the LSA 305. The LSA 305 then schedules the corresponding appointment 375c on its own lot calendar 385. When the time arrives for the appointments 375a, 375b, 375c to execute, the scheduling agents 305, 310, and 315 pass control to their respective processing agents (not shown).

Note that an activity may require more than one type of resource. The MSA 310 may therefore negotiate with several different types of RSAs 315. For example, lot processing may require not only a reticle 320, but also an empty carrier (not shown) and a WFT (also not shown). Thus, the MSA 310 may repeat the negotiation described relative to the RSA 315 and reticle 320 several times.

Still referring to FIG. 3, the "contract net negotiation protocol" approach discussed briefly above shall now be discussed in greater detail. As mentioned, the bidding process begins when the LSA 305 requests the bids 360 from all capable process tools 115. As will be appreciated by those in the art having the benefit of this disclosure, capability will primarily be predicated on whether a process tool 115 can perform the process operation the lot 130 seeks to enter. When a LSA 305 requests a bid 360 from the capable process tools 115, it includes the following information in the bid request 325:

the transport start time ("TST"), or earliest time to begin transport from the last (previous) machine, or current location;
the process-operation ("PO") and process-step ("PS") to be scheduled;
the consumer's latest delivery time ("$LDT_C$"), or the latest completion time acceptable to the lot 130;
the identity of the last location, or "source" location, i.e., the location from which the consumer will be transported to the process tool 115; and
the identity of the lot 130 requesting the bid.

In some embodiments, consumer agents provide a budget calculator to the provider agent. The budget calculator permits the provider agent to determine the consumer's priority relative to other appointments previously booked on the provider's calendar.

In one particular implementation, the LSA 305 calculates the initial value of $LDT_C$ as the time at which the lot will fall behind schedule. The corresponding $LDT_C$ is determined using the following equation:

$$LDT_C = \text{DueDate} - (CRA*DFLTLD + CRB) - \text{TargetCR}*(RPT*\beta)$$

where:
DueDate the time at which the lot 130 is due to complete the process flow 300;
RPT a sum of the cycle times of all the remaining process-operations;
$\beta$ cycle time compression factor based on lot priority;
CRA configurable control A for CR adjustment proportional to expected cycle time;
CRB configurable control B for CR adjustment to accommodate disruption near the end of the process flow 300;
DFLTLD expected lead-time for the lot 130, i.e., expected total cycle time; and
TargetCR target Critical Ratio for $LDT_C$, a configurable variable whose initial value is set by lot priority and defaults to 1.0.

However, this initial value for the $LDT_C$ is not necessarily the value that is passed with the request for bids.

The MSA 310 for the capable process tools 115 formulate bids 360. As mentioned above, the MSA 310 maintains a machine calendar 370 to track its appointments. When the request bid message 325 is received, the MSA 310 searches the machine calendar 370 for an opening in which the lot 130 can be scheduled for an appointment. An "appointment" has a "processing window" ("PW"). A processing window is a time interval of an estimated duration for providing services defined by an Appointment Start Time ("TS") and an Appointment End Time ("TE"). In the floating appointment approach, most appointments have a "commitment window" ("CW") within which the process window PW may float. A "commitment window" is a time interval within which the service is to be provided. The start time of the commitment window CW is defined by the Earliest Start Time ("EST") when the consumer can be available for the service. The end time of the commitment window is defined by the provider's Latest Delivery Time ("$LDT_P$") for the service. Note that the $LDT_P$ may be different from the $LDT_C$ in the request bid message 325 from the LSA 305 for lot 130. In the illustrated embodiment, the MSA 305 is permitted to search beyond the $LDT_C$ specified by the lot 130 if necessary in order to locate a valid bid 360. If this occurs, the MSA 310 sets the $LDT_P$ of the bid to the TE of the resulting appointment. Each appointment will store both the processing window PW [TS, TE] and the commitment window CW [EST, $LDT_P$] information. This information is then used, in the illustrated embodiment, in formulating the bids 360.

Figure 4A:
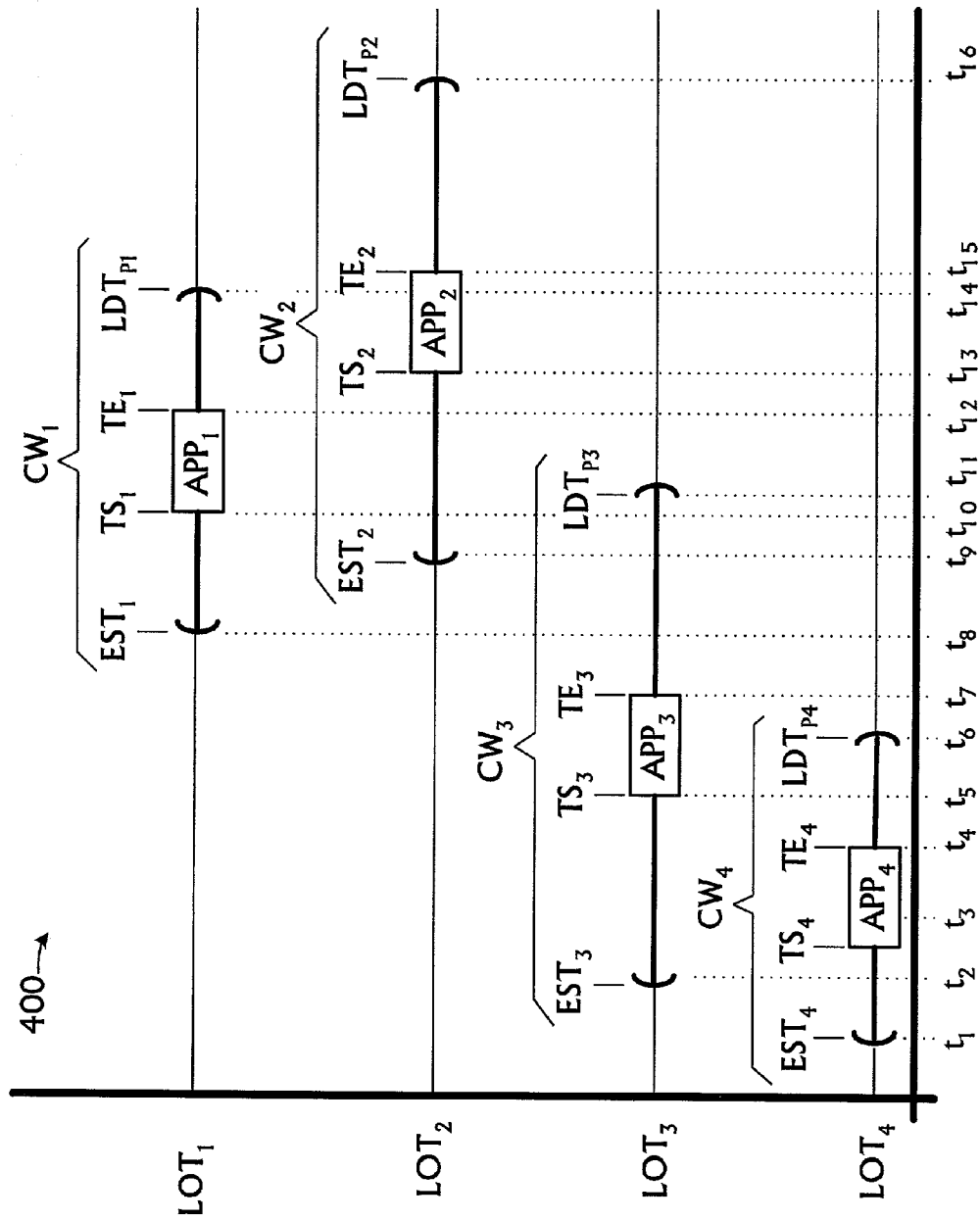
FIG. 4A conceptually depicts a calendar of booked appointments maintained and employed in accordance with the present invention.

More particularly, FIG. 4A conceptually illustrates a calendar 400 storing information concerning appointments for a process tool 115 for a number of consumers, which are lots 130 of wafers 135, in the illustrated embodiment. In FIG. 4A, the MSA 310 for the process tool 115 has booked appointments $APP_1$-$APP_4$ for the lots $Lot_1$-$Lot_4$, respectively. Thus, the appointment information for $Lot_1$-$Lot_4$ is as follows:

$Lot_1$: $APP_1[t_{10},t_{12}]$, $CW_1[t_8,t_{14}]$
$Lot_2$: $APP_2[t_{13},t_{15}]$, $CW_2[t_9,t_{16}]$
$Lot_3$: $APP_3[t_5,t_7]$, $CW_3[t_2,t_{11}]$
$Lot_4$: $APP_4[t_3,t_4]$, $CW_4[t_1,t_6]$

The appointments $APP_1$-$APP_4$ represent processing windows within the commitment windows $CW_1$-$CW_4$. Note that, in the illustrated embodiment, several of the commitment windows overlap but none of the appointments do. However, in alternative implementations, this may not always be the case, as will be discussed further below.

Returning now to FIG. 3, the MSAs 310 for the capable process tools 115 next submit the bids 360 to the LSA 305. The bids 360 contain "bid information" that varies by implementation. The bid information might include, for instance, only the identification of the process tool 115 submitting the bid 360 and the processing time interval. In the illustrated embodiment, the bid information includes at least the:
TS Appointment Start Time, as defined above;
TE Appointment End Time, as defined above;
EST Earliest Start Time for processing, i.e., the earliest time at which the lot 130 can commit to be ready for processing at the process tool 115; and
$LDT_P$ Latest Delivery Time, as defined above, which may be later or otherwise different than $LDT_C$ requested by lot.

However, additional information may also be included, such as the bid cost. In the illustrated embodiment, the process tool 115 may adjust the $LDT_P$ if it is not able to locate an appointment that finishes before the $LDT_C$ requested by the lot 130. This could be due to a late TS, the addition of a setup, or both.

The determination of the EST depends on the type of appointment. Most types of appointments have a static EST ("$EST_{static}$"). In this case, the static EST is a fixed time when the activity could start, such as the earliest time a time-based PM can start. However, some types of appointments calculate the EST dynamically. These types of appointments include lot appointments, lot processing appointments, lot load appointments, resource load lot appointments, and batch appointments. The basic calculation for dynamic EST is:

$EST=\max(T+RTT,EST_{static})$ where
$T=\max(T_{now},TST)$;
$T_{now}$=current time;
TST=transport start time;
RTT=remaining transport time (sum of all transport times between TST and lot appointment); and
$EST_{static}$=static EST.

However, this basic calculation is, in the illustrated embodiment, varied in application in some contexts. In particular, loading constraints are applied to yield a more accurate determination when the lot 130 is to be loaded onto the process tool 115 before processing starts. Among these constraints are:
LST=loading start time;
RLT=remaining loading time; and
ELT=earliest loading time, which is essentially the basic determination set forth above (i.e. the EST).

These loading constraints are attributes of lot appointments, lot processing appointments, and resource charge lot appointments. The following unloading constraints are attributes of PM, Qual, downtime, machine batch and resource charge batch appointments on the machine/resource calendars 370, 345:
UST=unloading start time; and
RUT=remaining unloading time.

If these unloading constraints are set, the respective appointment will be constrained so its shifting ability (discussed more fully below) requires that it maintain the required time interval between itself and the previous batch processing appointment so that lots 130 involved in a preceding appointment can be unloaded. This is not implemented via the dynamic EST because this is not a hard constraint. The UST and RUT are used by the machine calendar 370 to determine if a shift is valid. An appointment with unloading constraints cannot start processing until the lots 130 in the previous appointment have completed unloading.

Returning to dynamic EST calculation, for a lot appointment:
if no loading is needed, then the EST=ELT;
if loading is needed, but has not yet started, then the EST=ELT+RLT; and
if loading has started but is not completed, then the EST=max(ELT,LST); and
once loading is complete, then the $EST=T_{now}$.

For a lot processing appointment or a resource charge appointment:
if no loading is needed, then the $EST=ELT+D_{setup}$;
if loading is needed, but has not yet started, then the $EST=ELT+D_{setup}+RLT$; and
if loading has started but is not completed, then the EST=max(ELT,LST); and
once loading is complete, then the $EST=T_{now}$.

In this determination, $D_{setup}$ is duration of the setup. Note that the dynamic EST determination should consider whether the setup occurs before loading or whether setup and loading are performed in parallel. Note also that this implementation assumes the setup occurs before loading. And, for a batch appointment, the default determination is:

$EST_{batch}=\max(EST$ of batch participants$)$

However, this formulation sometimes experiences problems where the batch participants require loading and the maximum load size is less than the maximum batch size. The EST of each batch participant takes into account that the individual lot requires loading time but since the load size is less than the batch size, all of the lots 130 cannot be loaded in parallel. These difficulties can be resolved, however, by considering the order in which the participants will be loaded. To this end, each lot processing appointment and resource charge lot appointment includes an attribute "transferSequence" identifying where in the loading order the respective lot 130 falls, e.g., 1, 2, 3 indicating first, second, third. A value of "0" indicates that loading is not needed. The following pseudo-code algorithm may then be employed:

Found=false $EST_{batch}=\max$ (EST of batch participants)

If (batch participants with transfersequence=1) then $ES_{Tbatch}$=max (EST of batch participants with transferSequence=I)

Found=true

I=2

While (Found==true)

If (batch participant with transferSequence=I) then $ELT_{batch}$=max(ELT of batch participants with transfersequence=I)

$ELT_{batch}$=Max($EST_{batch}$,$ELT_{batch}$)

$RLT_{batch}$=max(RLT of batch participants with transfersequence=I)

$LST_{batch}$=max(LST of batch participants with transferSequence=I)

If $RLT_{batch}$!=0, then $ES_{Tbatch}$=$ELT_{batch}$+$RLT_{batch}$

If $RLT_{batch}$=0 and $LST_{batch}$=null then $EST_{batch}$=$ELT_{batch}$

If $RLT_{batch}$=0 and $LST_{batch}$!=null then $EST_{batch}$=max($ELT_{batch}$,$LST_{batch}$)

else Found=false

EndWhile

However, other suitable algorithms may be employed in alternative embodiments.

Note that, because this determination is dynamic, some quantities used are updated when specific events occur. For instance, LSA 305 is responsible for updating the TST and the RTT of the lot 130. For instance, the values of RTT and TST are updated when:

- the appointment 375 is first booked, since the appointment will have new attributes RTT and TST whose initial values are set as follows:
  - TST=TE of previous lot appointment (the current time $T_{now}$ is used if no previous appointment has been booked); and
  - RTT=sum of the transport times of all transport appointments between TST and the processing appointment.
- a previous appointment completes, whereupon the value of TST is set to the actual end time TE of the previous appointment.
- a previous appointment's end time TE changes. This can occur due to previous appointment expanding (e.g., it runs late or the number of work pieces increase), shrinking (completes early or number of workpieces decrease), shifting left or shifting right, etc. In this case, the value of TST is set to the revised end time (the new TE) of the previous lot appointment.
- a transport appointment starts, whereupon the value of TST is set to the scheduled end time TE of the transport appointment that started and the value of RTT is decremented by the scheduled duration of the transport appointment that started.
- a transport appointment completes, whereupon the TST is updated with the actual end time (i.e., the actual TE) of the transport appointment;
- a transport appointment shifts left or right before transport starts. There is no change to TST or RTT of next lot appointment since they are based on an earlier lot appointment or transport appointment. Shifting of transport appointments is not permitted in the illustrated embodiment after they have started.
- a transport appointment expands/shrinks before transport starts. This could occur if a transport appointment is modified due to an unexpected change in the lot's location. The next lot's appointment is updated as follows:

RTT=(current RTT)−(old transport duration)+(new transport duration)

- a transport appointment expands/shrinks after transport starts, whereupon the next lot's appointment is updated as follows:
  - TST=revised end time (new TE) of transport appointment
- the lot location changes after the previous lot appointment is completed. The LSA is notified that a lot's location has unexpectedly changed and the existing transport appointments should be modified and/or cancelled. After modifying, canceling and/or re-booking the transport appointments that have not already started, the next lot appointment is updated as follows:

RTT=sum of the transport times of all transport appointments between TST and the next lot processing appointment

- the re-booking of a previous lot appointment, i.e., the previous lot appointment is cancelled and re-booked. TST and RTT should not change until a replacement lot appointment is re-booked. This may also require modifying, canceling and/or re-booking the subsequent transport appointments. The next lot appointment is updated as follows:
  - TST=new TE of previous lot appointment (the one re-booked); and RTT=sum of the transport times of all transport appointments between TST and the next lot processing appointment Still other events might prompt an update in addition to, or in lieu of, those set forth above, depending on the implementation. The RSA 315 for the loading resource updates the LST and RLT in a similar fashion. For instance, the LST and RLT may be updated:

- when the appointment 375 is first booked, since the appointment will have new attributes LST and RLT, such that the initial values are:
  - LST=$EST_{static}$ of the lot appointment; and
  - RLT=the loading duration;
- if loading is needed. If loading is not needed, then the initial values are set to:
  - LST=null; and
  - RLT=0;
- when the loading appointment starts, whereupon:
  - LST=end time of the loading appointment; and
  - RLT=0;
- the loading appointment ends, whereupon LST=$T_{now}$;
- the loading appointment is shrunk or expanded before loading starts, whereupon RLT=the new loading duration; and
- the loading appointment is shrunk or expanded after loading starts, whereupon LST=the new end time of the loading appointment.

Still other events might prompt an update in addition to, or in lieu of, those set forth above, depending on the implementation.

Returning to FIG. 3, in one particular implementation, each MSA 310 for each capable process tool 115 actually prepares multiple bids 360 predicated on different appointment start times. Each bid 360 includes a different "cost." In the illustrated embodiment, each of the scheduling agents 305 and 318, representing "end" consumers, has associated with it a budget calculator tool (not shown) to facilitate rapid budget determinations. Each provider scheduling agent 310, 315 calls the consumer's respective budget calculator tool to determine the relative priority of a consumer in formulating the multiple bids 360 being prepared. The scheduling agents 310 and 315, representing providers, each has an associated "cost calculators" also employed in formulating bids to determine costs for available time slots. The cost determinations reflect the desire of the MSA 310 or RSA 315 to achieve its goals for its process tool 115 or resource 320. For instance, if the process tool 115 is relatively idle, the cost may be relatively low in an attempt to reduce machine idle time. Conversely, if the process tool 115 is relatively busy, the cost may be relatively high—thereby reflecting a lesser need to increase machine utilization. The MSA 310, representing an "intermediate" consumer, passes the budget calculator tool of the provider agent (e.g., the LSA 305, PMSA 318) with which it is negotiating to the provider agent with which it is also negotiating (e.g., the RSA 315). Thus, providers can readily determine the available budget for end consumers and costs for offering their processing resources to the end consumers.

The MSA 310 packages the bid information and submits the bid(s) 360 to the LSA 305. In the illustrated embodiment, the MSA 310 actually returns several alternative bids 360, each with a different start time, in the form of a bid list. These bids 360 will be generated by using, in the illustrated embodiment, searches on the machine calendar 370 for open time slots using existing setups; open time slots requiring new setups; time slots where a lot 130 can join an existing batch; time slots where lots 130 can join an existing batch by bumping another lot 130; and time slots that require bumping ("canceling") appointments booked for other lots 130. Several of these searches may return the same time slot but a time slot should only appear once in the bid list returned to the lot 130. At least one bid 360 is always returned in this particular embodiment, and the minimum number of returned bids is determined by a configurable property value.

Note how maintenance of the calendars 385, 370, 345, and 387 facilitates the scheduling process. The calendars 385, 370, 345, and 387 impose a structure on booked appointments for the process flow 300 that permits the scheduling agents 305, 310, 315, and 318 to quickly and easily search through the booked appointments, find suitable time slots, and generate (or otherwise participate) in the bidding and bid conformation process. This structure also allows the application of appointment management routines, some of which are described below, that can similarly facilitate the scheduling process and help the process flow 300 to operate more efficiently.

After receiving all bids 360 from all MSAs 310 for the capable process tools 115, the LSA 305 evaluates the bids 360 and selects one bid 360 from among those submitted. The bids 360 are evaluated through an Objective Function F in light of the end time ("Bid End Time") of the bid 360 and some other information, including cost ("Bid Cost"). The LSA 305 for the lot 130 evaluates every bid 360 from every process tool 115 in this manner. An objective function F is employed:

$$F = COL(\text{BidEndTime}) * \text{Budget} * COLF + \text{BidCost}$$

where COL, the cost of lateness, is a function of the bid end time and COLF is a configurable weight. The bid 360 with the minimum objective function value is selected.

Still referring to FIG. 3, once the LSA 305 selects a bid 360, it awards the contract 365 to the MSA 310 that submitted the accepted bid 360. More technically, the LSA 305 sends a "confirm bid" message to the MSA 310. If the MSA 310 accepts the contract 365, and if the process operation does not involve any resources, it returns a "bid confirmed" message 380 to the LSA 305 to confirm the bid 360, and the appointment 375b is booked on the machine calendar 370 of the process tool 115 and appointment 375c is booked on the lot calendar 385. If the process operation requires resources, the MSA 310 will first send a "confirm bid" message 340, or contract, to the RSA 315 that submitted the bid. The RSA books the appointment 375a on its calendar 345 and sends a "bid confirmed" message 355 to the MSA 310. After receiving a bid confirmed message 355 from the RSA 315, the MSA 310 books the appointment 375b on its machine calendar 370 and sends the "bid confirmed" message 380 to the LSA 305, which books the appointment 375c on the lot calendar 385.

However, by the time the LSA 305 seeks confirmation of the bid 360, the machine calendar 370 of process tool 115 may have changed and the time slot may not be available or the bid cost may have changed. The MSA 310 will confirm the bid 360 only if the time slot is available and the bid cost does not increase more than a configurable percentage of the original bid cost. Otherwise, the MSA 315 replies to the LSA 305 indicating the bid 360 is not confirmed.

If the process tool 115 does not confirm the selected bid 360, then the LSA 305 determines whether to start the bidding over or to select the next best bid. The LSA 305 compares the number of remaining bids 360 with a configurable "rebid threshold." If the number of remaining bids 360 is greater than the rebid threshold, the lot 130 returns to the bid selection process described above and selects the next best bid 360. After selecting the next best bid 360, the LSA 305 calculates the objective function F (discussed above) for the new bid 360. If the value of F has not increased by more than a configurable percentage of the objective function F for the best bid 360, the LSA 305 attempts to confirm the next bid 360. Otherwise, if the remaining bids are less than a rebid threshold or the objective function F for the next bid 360 has increased too much, the LSA 305 begins the entire process over again by requesting bids from all capable process tools 115.

In one particular implementation, MSAs 310 differentiate as to whether they represent process tools 115 that are batch or are sequential ("cascading"). For example, there are many types of process tools 115, and each type of process tool 115 might possess different characteristics for which a respective software agent 265 might advantageously be specialized. Exemplary characteristics that may lend themselves to specialization in machine agents (both scheduling and processing) in the illustrated embodiment include:

whether the process tool 115 processes by wafer, by lot, or by batch;

whether the process tool 115 processes wafers, lots or batches serially or sequentially;

the number of ports for the process tool 115;

whether the ports for the process tool 115 are input, output, or input/output;

whether the chambers for the process tool 115 are used in series or in parallel;

whether the process tool 115 can chain PMs;

the number of chambers in the process tool 115;

whether the process tool 115 includes internal storage;

whether the process tool 115 can start processing a lot or batch while completing processing of another lot or batch;

whether the process tool 115 requires loading and/or unloading;

whether the process tool 115 requires resources and, if so, whether those resources are dedicated resources or shared resources.

Note, however, that the factors along which a MSA 310, or any software agent 265, are specialized will be implementation specific.

Consider, for instance, an implementation wherein machine agents are specialized by whether they process by wafer, by lot, by batch, etc. In one particular embodiment, the following machine agents are employed:
- a baseline processing agent;
- a wafer-based processing agent;
- a wafer-based, sequential processing agent;
- a wafer-based batch sequential processing agent;
- a wafer-based, batch processing agent;
- a lot based processing agent;
- a lot-based, sequential processing agent;
- a lot-based, batch processing agent;
- a lot-based batch sequential processing agent;
- a baseline scheduling agent;
- a wafer-based scheduling agent;
- a wafer-based, sequential scheduling agent;
- a wafer-based, batch sequential scheduling agent;
- a wafer-based, batch scheduling agent;
- a lot-based scheduling agent;
- a lot-based, sequential scheduling agent;
- a lot-based, batch scheduling agent; and
- a lot-based batch sequential scheduling agent.

This particular embodiment implements the agents using object oriented programming techniques and the baseline agents provide the class definition and the others are subclasses of that class.

Other agent specializations might also be employed. PM agents may be specialized by whether the maintenance procedures they perform are based on time, wafers processed, lots processed, batches processed, processing time, an occurrence of an event, etc. In one particular embodiment, the following PM agents are employed:
- a wafer-based PMSA;
- a time-based PMSA;
- a processing unit-based (e.g., number of lots processed, number of batches processed) PMSA;
- an event-based PMSA; and
- a processing time-based (e.g., cumulative processing time) PMSA.

Resource agents may likewise be specialized by whether they represent dedicated resources (e.g., a loading resource used by only one machine) or a shared resource (e.g., a wafer fab tech, reticle, or empty carrier) that may be shared among multiple process tools 115. Lot agents may also be specialized according to their priority, product, product family, or other attributes that mitigate for differentiation of behavior. Still other specializations may be employed in alternative embodiments.

Figure 4B:
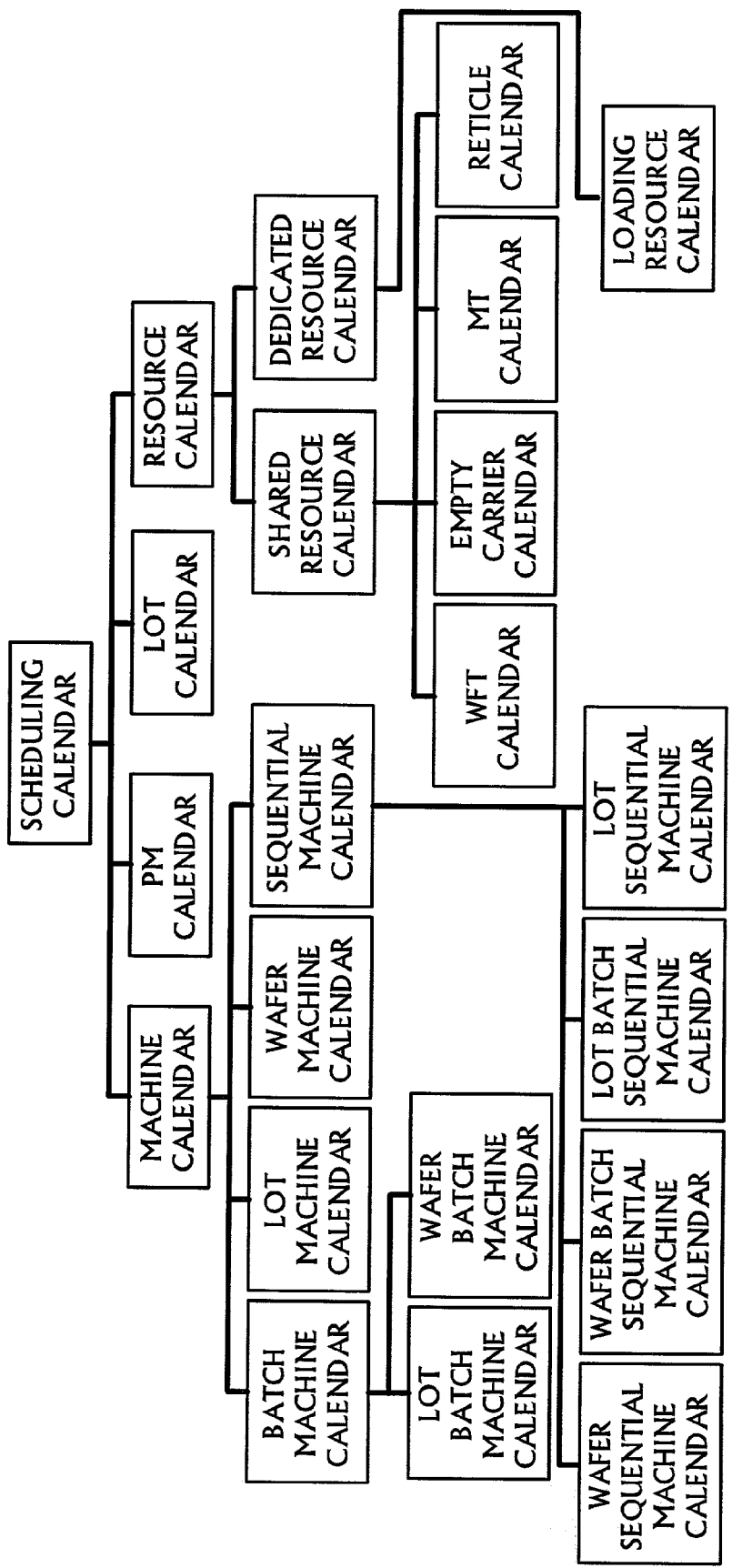
FIG. 4B illustrates a hierarchy of calendar specializations employed in one particular embodiment.

Calendars, e.g., the calendar 327 in FIG. 3, may also be specialized as are the machines, lots, resources, or PMs with which they are associated. Note, however, that this is not necessary to the practice of the invention. FIG. 4B illustrates the hierarchy of calendar specializations employed on one particular embodiment that are implemented as objects in an OOP environment.

Thus, where these types of agent specialization are employed, the calendars 370, 385, 345, and 387 may also be specialized. On some specialized calendars—sequential calendars, for example—a portion of the appointment is allowed to overlap with other appointments. As will be appreciated by those skilled in the art having the benefit of this disclosure will appreciate, the term "sequential" refers to a capability for processing more than one material (e.g., wafer 135, lot 130, or batch) at a time. That is, the process tool 115 can begin processing a second material before it is finished processing a first material. Consider, for example, a process tool 115 called a "sink." A sink has several tubs in which lots 130 of wafers 135 can be exposed to various chemical baths in sequence. While one lot 130 is being exposed in one bath, a second lot 130 can be exposed in a second bath, and both are being processed by the same process tool 115 in sequence.

Figure 4C:
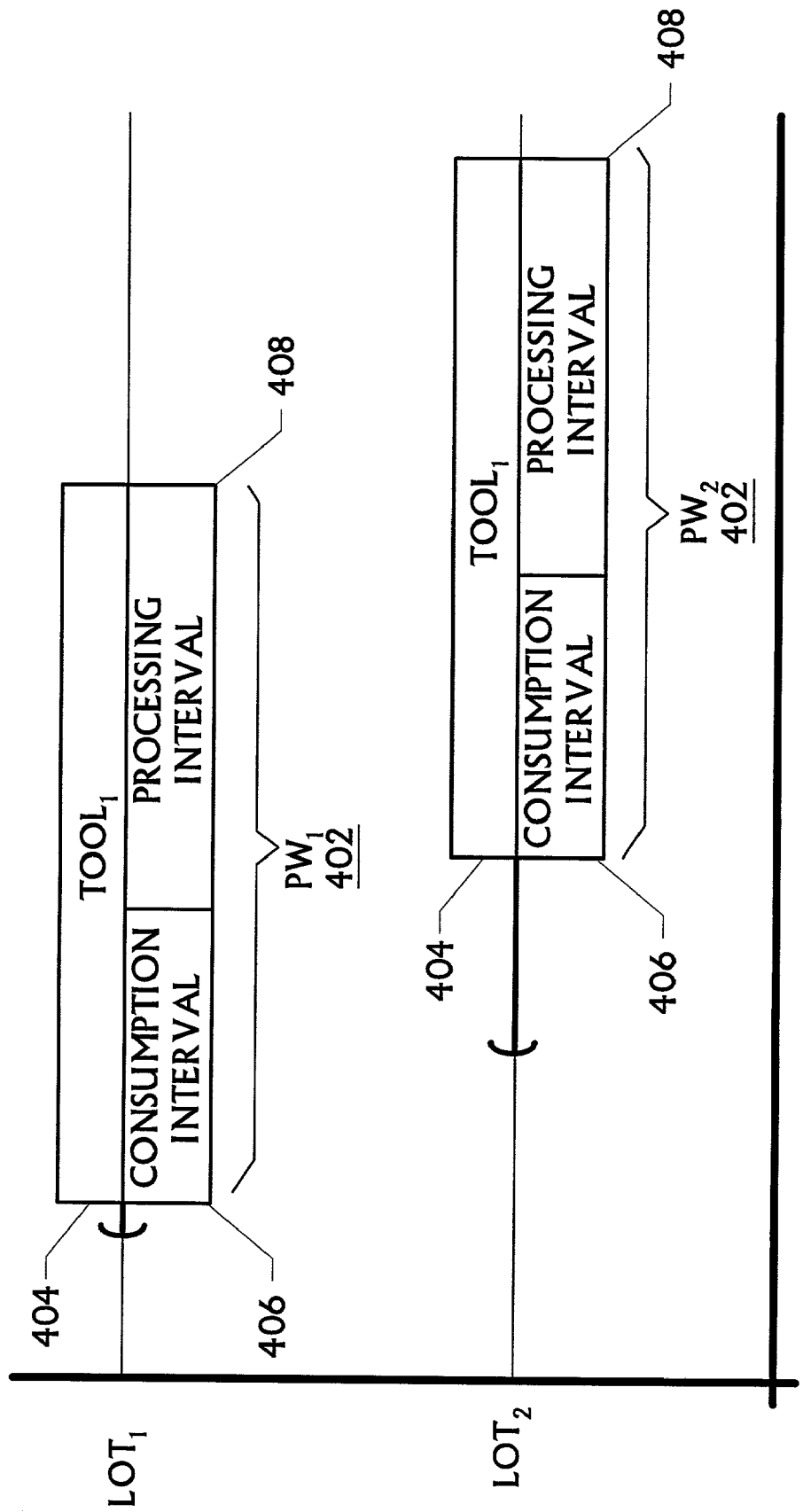
FIG. 4C conceptually illustrates one particular implementation in which some portions of some appointments are permitted to overlap.

In cases where the process tool 115 is a sequential machine, and the MSA 310 and the machine calendar 370 are specialized, some portions of some appointments may overlap. As is shown in FIG. 4C, the processing window PW 402 of an appointment 404 in these calendars will have two intervals: a consumption interval 406 and a processing interval 408. (Note that the concomitant commitment windows are omitted in FIG. 4C for the sake of clarity.) In the consumption interval 406, the lots 130 are entering the process tool 115 (i.e., being "consumed") for processing. The processing interval 408 is then defined to be everything else in the PW 402 after the consumption interval 406. The processing interval of one appointment may overlap with the consumption interval of another appointment with the same setup requirements, but none of the consumption intervals can overlap. In FIG. 4C, the lots $LOT_1$, $LOT_2$ have scheduled appointments 404 on the process tool $TOOL_1$ wherein the consumption interval 406 for the appointment 404 of the lot $LOT_2$ overlaps the processing interval 408 of the appointment 404 for the lot $LOT_1$. Note, however, that lot processing appointments requiring different setups cannot be overlapped even on this type of specialized machine calendar 370.

Thus, as was mentioned above, the type of appointments scheduled on any given calendar will depend largely on the nature of the entity that the software agent 265 that is keeping the calendar represents and the degree of agent and calendar specialization. In the illustrated embodiment, there are four types of scheduling agents as is set forth in Table 1: MSA, LSA, RSA and PMSA. Each scheduling agent will have its own scheduling calendar to store its booked appointments: machine calendar, lot calendar, resource calendar, and PM calendar.

Figure 5:
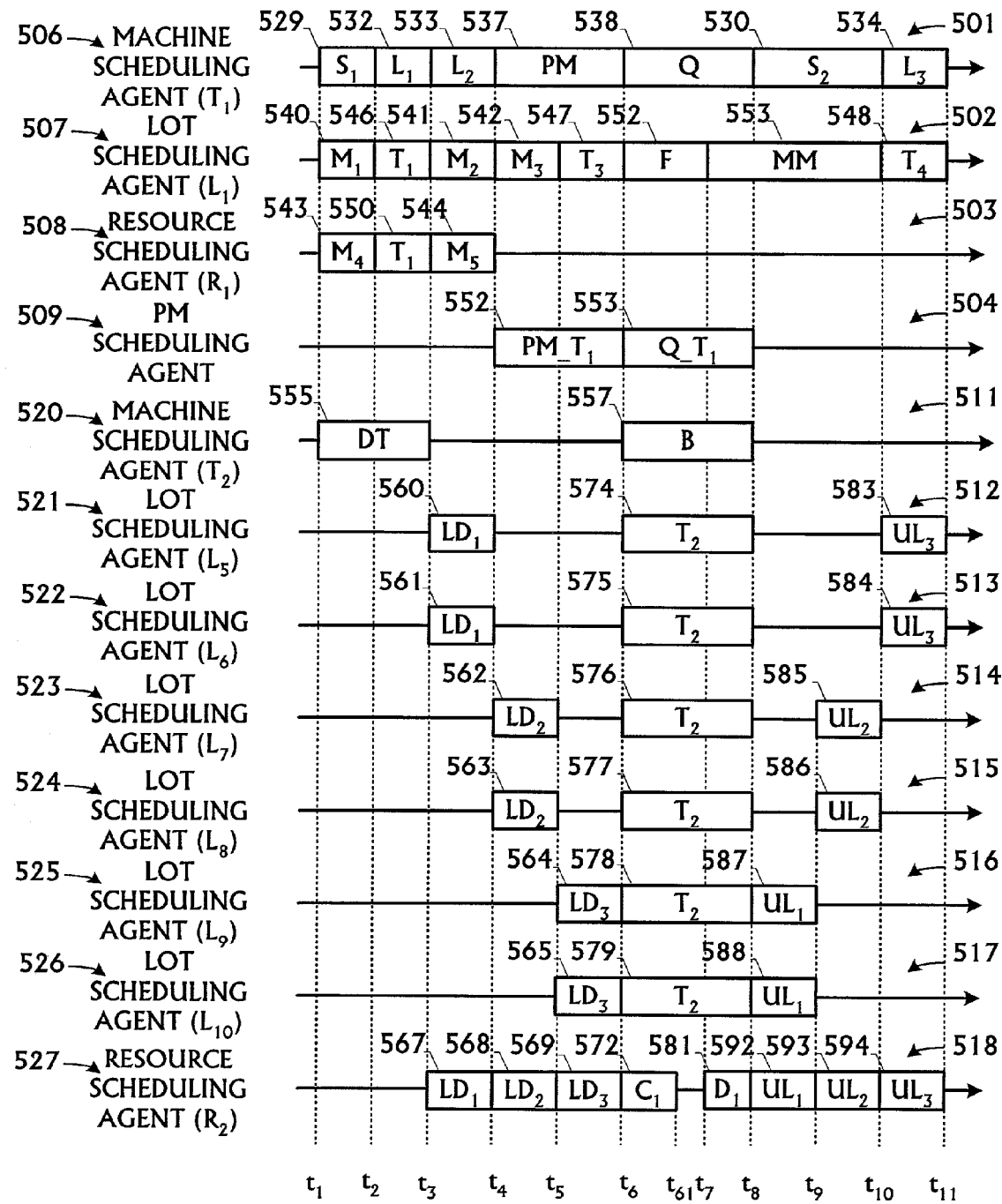
FIG. 5 conceptually depicts a number of calendars of booked appointments illustrating selected aspects of the interaction and characteristics of the calendars and scheduling agents.

FIG. 5 conceptually illustrates a variety of calendars to help illustrate the various types of appointments kept by various types of calendars in the illustrated embodiment. FIG. 5 also helps illustrate how some of appointment types on some calendars are booked with "corresponding" appointments on other types of calendars. More particularly, FIG. 5 depicts:
- a machine calendar 501 for a process tool $T_1$ maintained by a MSA 506;
- a lot calendar 502 for a lot $L_1$ maintained by a LSA 507;
- a resource calendar 503 for a machine resource $R_1$ maintained by a RSA 508; and
- a PM calendar 504 for preventive maintenance maintained by a PMSA 509.

FIG. 5 also illustrates:
- a machine calendar 511 for a process tool $T_2$ kept by a MSA 520;
- a plurality of lot calendars 512-517, each for a respective lot $L_5$-$L_{10}$ kept by a respective LSA 521-526; and
- a resource calendar 518 for a machine loading resource R2 kept by a RSA 527.

In the illustration of FIG. 5, as opposed to the illustration of FIG. 4A, all appointments for a given calendar are collapsed onto a single timeline. The commitment windows for each appointment are omitted to facilitate this collapse and to keep from unduly cluttering the illustration. A brief discussion of the various kinds of appointments summarized in Table 1 and illustrated in FIG. 5 for this particular embodiment follows immediately below.

MSAs (e.g., MSAs 506, 520) schedule and book a number of types of appointments. In FIG. 5, a MSA 506 for the tool $T_1$ books several kinds of appointments on the machine calendar 510. These include: the setup appointments 529-530; the lot processing appointments 532-534; a PM 537; and a stand-alone Qual 538. As is shown on the machine calendar 515 for the tool $T_2$, the MSA 520 booked a machine batch appointment 557 and a downtime appointment 555. Note that, in the illustrated embodiment, some appointments may be scheduled for any process tool 115, e.g., the setup appointments 529-530, lot processing appointments 532-534, the PM appointment 537, and the Qual appointment 538. However, some may not. For instance, the batch appointment 557 cannot be scheduled on process tools 115 that do not perform batch operations. (Note that, on batch calendars, lot processing appointments are not scheduled directly on the machine calendar 370. Rather, they are booked as participants of the batch appointment.) Some embodiments may also employ alternative kinds of appointments.

The lot processing appointments 532-534 are the appointments in which the tool $T_1$ is scheduled to actually perform the processing on the lots $L_1, L_2, L_3$. As will be appreciated by those skilled in the art having the benefit of this disclosure, the tools $T_1, T_2$ will occasionally have to undergo a "setup" in preparation for processing a given lot. All else being equal, it is generally preferable to reduce the number of setups by scheduling lots requiring the same setup successively. Such is the case for the lots $L_1, L_2$ on the tool $T_1$, whose lot processing appointments 532-533 are scheduled together after the setup appointment 529 since they require the common setup $S_1$. These types of preferences are realized in the scheduling process in the formulation of bids discussed above. More particularly, cost factors are apportioned in the bidding process to encourage lot processing appointments having common setups to be scheduled together. However, in FIG. 5, the lot $L_3$ requires a new setup $S_2$, and the MSA 506 has scheduled a separate setup appointment 530 prior to the lot processing appointment 534. Note that, although not shown, setup appointments are scheduled in a similar fashion for tools (e.g., the tool $T_2$) on which batch operations are performed.

As the name implies, the batch appointment 557 is an appointment on a process tool 115 (e.g., $T_2$) to process a batch of lots 130. Each lot 130 (e.g., $L_5$-$L_{10}$) is considered a "participant" in the batch, and the batch appointment actually comprises a plurality of "participant" appointments. Participant appointments are, in actuality, just lot processing appointments that describe the makeup of the batch. In the illustrated embodiment, the lot appointments 574-579 are counterpart "participant appointments" for the batch appointment 574. Lots 130 may be added to or removed from a batch by joining, removing, canceling, and/or bumping individual participant appointments. If the batch needs loading onto the process tool 115, the RSA 527 will schedule load and unload appointments 567-569, 593-594 in a manner discussed more fully below.

As summarized in Table 1, the LSAs 507, 521-526 for the lots $L_1, L_5$-$L_{10}$ usually books six kinds of appointments on the lot calendars 502, 512-517: the move appointments 540-542; the lot appointments 546-548, 574-579; a maximum move appointment 553; a feeder appointment 552; load appointments 560-565 (e.g., $LD_1, LD_2, LD_3$); and unload appointments 583-588 (e.g., $UL_1, UL_2, UL_3$). The move appointments 540-542 and lot appointments 546-548, 574-579 are scheduled where all the parameters used to schedule with certainty are known. The maximum move appointment 553 and feeder appointment 552 are scheduled as "place holders" on the calendar until sufficient certainty is achieved, i.e., both the source and destination process tools 115 are known and move durations can be determined and they can be replaced by move and lot appointments such as the move appointments 540-542 and lot appointments 546-548, 574-579. More precisely, the replacement comes when a LSA (e.g., the LSA 507) detects that the lot 130 (e.g., lot $L_1$) moves in at the final feeder operation and a machine is selected. Thus, the feeder appointment 552 and maximum move appointment 553 are useful in the context of scheduling a control operation several operations in advance before scheduling some of the earlier intervening operations for a particular process tool 115.

More particularly, the lot appointments 546-548, 574-579 are appointments for processing the respective lots $L_1, L_5$-$L_{10}$ on the particular process tools $T_1, T_2, T_3, T_4, T_5$. As will be appreciated by those skilled in the art having the benefit of this disclosure, the lots 130 typically are moved from process tool 115 to process tool 115 in order to be processed on successive operations defined in the lots' processes. For example, FIG. 1 illustrates a lot 130 being moved from a first process tool 115, or source location, on the left to a second process tool, or destination location, on the right. These moves are generally scheduled as the lot appointment is scheduled. There are typically two types of moves—interbay and intrabay moves. Interbay moves transport lots 130 between bays (not shown) of the manufacturing facility. Intrabay moves transport lots 130 to different locations within the same bay. So, a typical move of a lot 130 from one process tool 115 to another process tool 115 in a different bay involves at least three moves: an intrabay move from the port of a first process tool 115 to a stocker (not shown) in that tool's bay; an interbay move from that stocker to another stocker (also not shown) which is in the same bay as the second process tool 115; and the final intrabay move from that stocker to the port of the second process tool 115.

However, in a partially automated fab, only a portion of the process operations may be scheduled and controlled by the software agents 265. Thus, only a subset of the process tools 115 in the fab are under the control of the software agents 265 and the fab is not fully under the control of this system. Those process operations controlled by the software agents 265 are called "control process operations." Immediately before each control process operation, a sequence of "feeder" operations can be derived from a configurable multiple of the process time of the controlled process operation. Feeder appointments, such as the feeder appointment 552, are used in determining the TST for an appointment, e.g., the lot appointment 548, being scheduled ahead. More particularly, feeder appointments are used when a LSA is scheduling ahead and the time has not yet arrived for scheduling the feeder operation with an actual process tool 115. Feeder appointments are used to represent processing activities for those feeder operations with the duration equal to the cycle time of the respective feeder operations.

However, for a feeder operation, the specific process tool 115 that will perform the final feeder operation is not known until the lot 130 begins processing at the final feeder operation. A "maximum move" appointment, such as the maximum move appointment 553, represents transport activities from the last feeder process tool 115 to a controlled process tool 115. In one embodiment, the duration of the maximum move appointment is derived by the worst case transport time between the last feeder process tool station 105 and the controlled process tool station 105. When the actual process tool 115 performing the last feeder operation is known, the maximum move appointment will be replaced by a move appointment or a sequence of move appointments, between the feeder process tool and the controlled process tool.

Note that feeder and maximum move appointments represent explicit, as opposed to implicit, constraints on the scheduling process. Explicit constraints are represented as appointments on the calendars that directly affect the scheduling and booking of other appointments. Examples of explicit constraints include, but are not limited to, move, load, unload, maxmove, and feeder appointments. These appointments explicitly constrain the scheduling of the lot appointments on the lot calendar. Implicit constraints are not represented as appointments on the calendar, but rather as attributes of the appointments they affect. For example, the lot processing appointment on the machine calendar has attributes that represent the constraints of loading, transport, and unloading because these constraints are not represented by appointments on the machine calendar. Similarly, discharge duration, like the UST and RUT, discussed above, also is an implicit constraint. Like the UST and the RUT, the discharge duration is not a hard constraint—so, it does not affect the dynamic EST, but it does constrain shifting because loading or unloading related to the next batch appointment cannot overlap with the discharge.

For some process operations, the process tool 115 (e.g., the tool $T_2$) may require loading and unloading the lot 130. For those operations, the LSA (e.g., the LSAs 521-526) will book lot load and lot unload appointments (e.g., the load and unload appointments 560-565, 583-588) on its own calendar (e.g., the lot calendars 512-517). These load and unload appointments match the loading and unloading appointments (e.g., the load and unload appointments 567-569, 592-594) scheduled by the RSA (e.g., the RSA 527) on its calendar (e.g., the resource calendar 518). In FIG. 5, the tool $T_2$ requires loading, and the resource $R_2$ loads the lots $L_5$-$L_{10}$ on the tool $T_2$ in a manner more fully described below. Consequently, the RSA 527 for the resource calendar 518 for the resource $R_2$ includes load appointments 567-569 and unload appointments 592-594 in which the resource $R_2$ is scheduled to load the lots $L_5$-$L_{10}$ on the tool $T_2$. Note that each of the lot calendars 512-517 includes load and unload appointments 560-565 and 583-588 that are counterparts to the load appointments 567-569 and unload appointments 592-594 on the resource calendar 518. Note further that the machine calendar 511 for the tool $T_2$ does not contain any load or unload appointments, but the lot processing appointment has attributes representing these implicit constraints.

The PMSA 509 books two kinds of appointments on the calendar 530: PM appointments such as the PM appointment 552, and stand-alone Quals such as the Qual appointment 553. The PMSA 509 schedules PMs and Quals opportunistically, but in accordance with known constraints on when they should be scheduled. The calendar 530 shows only the one PM appointment 552 and the one Qual appointment 553 scheduled for the tool $T_1$. Note that the machine calendar includes counterpart PM and Qual appointments 537-538 booked thereon. As will be appreciated by those skilled in the art having the benefit of this disclosure, multiple PMs and Quals may be performed on a tool, and so the machine and PM calendars 501, 593 in an actual embodiment may include multiple PM and Qual appointments for one tool. Some PMs are required to be followed by one or more follow-up Quals before the process tool 115 can be reintroduced to the process flow 300. In these circumstances, the follow-up Quals are automatically scheduled within the PM appointment.

RSAs (e.g., the RSAs 508, 527), in the illustrated embodiment, are specialized by the kind of resource they represent. There are two kinds of resources: shared resources and dedicated resources. Shared resources are resources that may be shared by multiple process tools 115, such as the reticle 320 shown in FIG. 3. Dedicated resources, such as machine loaders (not shown) operate in conjunction with a single process tool 115. This type of specialization of resource calendars is but one salutary variation permitted by the use of specialized agents discussed above.

The types of appointments booked by a RSA depends on the type of resource it represents. The shared RSA 508 for the resource $R_1$, shown in FIG. 5, books at least two kinds of appointments on its own resource calendar 503: resource consumption appointments such as the resource consumption appointment 550 and move appointments such as the move appointments 543, 544. Since the resource $R_1$ is shared by several process tools 115 (e.g, $T_1$), it may need to be moved among the process tools 115—hence, the move appointments 543, 544. Note that the moves themselves may be performed by still other resources (not shown) and a shared resource such as a reticle may be moved to a storage location such as a reticle stocker when it is not being used at a process tool. The dedicated RSA 527 schedules appointments related to its dedicated process tool 115 (e.g., $T_2$) only. In the illustrated embodiment, the dedicated RSA 527 represents a machine loading resource (not shown) for a furnace (also not shown). The dedicated RSA 527 books four kinds of appointments on the calendar 540: the load appointments 567-572; the charge appointment 572; the discharge appointment 581; and the unload appointments 592-594. The load appointments 567-572, charge appointment 572, discharge appointment 581, and unload appointments 592-594 are implementation specific and are discussed in more detail immediately below.

As will be appreciated by those skilled in the art having the benefit of this disclosure, some process tools 115 (e.g., $T_2$) perform lot batch process operations in which multiple lots 130 are simultaneously processed in a batch. Some of these process tools 115 use load, charge, discharge and unload steps. In the embodiment of FIG. 5, the tool $T_2$ first loads all the batch participants, i.e., lots 130, from the tool I/O ports (not shown) to the tool internal stocker (also not shown). Usually this type of process tools 115 has multiple I/O ports, and the load/unload operations are also performed in batches. For example, if the tool $T_2$ has two I/O ports, and the batch process operation allows a maximum of six participants in a batch, three batch load operations are required to load six lots 130 into the internal stocker of the tool $T_2$. After all the batch participants are loaded, the tool $T_2$ performs a batch charge operation to move the batch participants from the internal stocker into a furnace tube (not shown) before the processing can actually begin. After the tool $T_2$ completes the batch process operation, it discharges the batch participants from the tube back into the internal stocker. Finally when the lots 130 are ready to be moved to the tool I/O ports, a sequence of batch unload operations is performed.

Due to the constraints of the tool internal transport mechanism, appointments are not permitted to overlap on this kind of resource scheduling calendar. These load, charge, discharge, and unload activities are performed in a mutually exclusive fashion, i.e., they cannot occur at the same time because they use the same resource. Thus, loading moves the lot 130 from a machine port to an internal stocker of the machine. Charging moves the wafers 135 from the internal stocker to the furnace tube for heating (processing). Discharging removes the wafers 135 from the furnace tube (after cooling) and moves them back to the internal stocker. Unloading moves the lot 130 from the internal stocker to a machine port.

Note that the RSA 527 is not concerned with the actual processing—that is represented on the machine calendar 511 by the batch appointment 557. However, there is a relationship between the charging and discharging appointments 572, 581 on the resource calendar 518 and the batch appointment 557 on the machine calendar 511. More particularly, charging starts when processing starts and discharging ends when processing ends. Charging or discharging typically takes about 15 minutes while processing typically takes four or more hours. On the machine calendar 511, the batch is considered "processing" from the time the start command is issued (before charging starts) until the furnace has completed discharging. Note that the MSA 520 is not concerned with loading, charging, discharging or unloading because these are all tracked by the RSA 527 on its resource calendar 518. The machine calendar 511 contains the batch appointment 557 that represent "processing," which is time when no other batch can be "processing" on the tool $T_2$.

As previously mentioned, on the machine calendar 511, the batch appointment actually contains participants that are each lot processing appointments, one for each lot 130 in the batch. Meanwhile, loading and unloading activities can occur in parallel with "processing," so long as they do not conflict with one another or with charging or discharging. Loading or unloading lots while another batch is "processing" is a technique for increasing the throughput of the furnace.

For this particular type of furnace, the lots $L_5$-$L_{10}$ are loaded two at a time because that is the number of machine I/O ports where lots 130 can be loaded or unloaded. But, the furnace can run up to six lots 130, so if the number of lots 130 in the batch is more than two, then the lots 130 are loaded in sub-batches of two lots 130. Thus, the lots $L_5$, $L_6$ are loaded during the load appointment 567 on the resource calendar 518, the lots $L_7$, $L_8$ during the load appointment 568, and the lots $L_9$, $L_{10}$ during the load appointment 569. Note that the load appointments 567-569 on the resource calendar 518 have counterpart appointments on the lot calendars 512-517. More particularly, since each load appointment 567-569 includes two lots, each of the load appointments has two counterparts. Thus, the load appointment 567 has counterparts 560, 561 on the lot calendars 512, 513; the load appointment 568 has counterparts 562, 563 on the lot calendars 514, 515; and the load appointment 569 has counterparts 564, 565 on the lot calendars 516, 517. So, a batch with six lots 130 (e.g., lots $L_5$-$L_{10}$) might have three sub-batch load appointments (e.g., load appointments 567-569) on the resource calendar (e.g., resource calendar 518). Note also that, in the illustrated embodiment, each load appointment 567-569 is actually a batch loading appointment containing a resource lot loading appointment for each participant lot that is being loaded.

Charging is performed for all lots 130 (with a maximum of six) at the same time on this particular furnace. The charge appointment 572 represents the charging batch, which actually comprises a participant charge appointment (not shown) for each participant (e.g., lots $L_5$-$L_{10}$) in the batch. Thus, for each furnace run, there will be one charge appointment 572 with up to six participants. Discharging is also performed for all lots 130 at the same time. The discharge appointment 581 represents the discharging batch and actually comprises a participant discharge appointment (not shown) for each participant (e.g., lots $L_5$-$L_{10}$) in the batch. For each furnace run, there will be one discharge appointment 581 with up to six participants. As was mentioned earlier, however, the individual lots 130 (e.g., lots $L_5$-$L_{10}$) are not concerned with charging and discharging, as these steps are internal to the process tool (e.g., the tool $T_2$). Thus, the charge and discharge appointments 572, 581 have no counterparts on the lot calendars 512-517. The lots $L_5$-$L_{10}$, instead subsume the time for charging and discharging into the lot appointments 574-579.

Unloading is the reverse of loading. Like loading, unloading is performed in sub-batches of at most two lots 130 at a time. So, a batch with six lots 130 (e.g., lots $L_5$-$L_{10}$) might have three sub-batch unload appointments (e.g., unload appointments 592-594) on the resource calendar (e.g., the resource calendar 518). The unload appointments 592-594 also each have two counterparts appointments on the lot scheduling calendars 512-517, one for each participant in that particular sub-batch unload. The unload appointment 592 has counterpart unload appointments 588, 587 on the lot calendars 516, 517; the unload appointment 593 has counterpart unload appointments 585, 586 on the lot calendars 514, 515; and the unload appointment 594 has counterpart unload appointments 583, 584 on the lot calendars 512, 513. Note that the sequence for unloading is independent of the sequence for loading. Loading sequence is primarily dependent on arrival time (EST) of the lots 130, while unloading sequence may depend on the priority of the lot 130 or the time of its next appointment. Thus, although unloading is performed in the reverse order of loading in the illustrated invention, this is not necessary. Note also that, in the illustrated embodiment, each unload appointment 592-594 is actually a batch unloading appointment containing a resource lot unloading appointment for each participant lot that is being unloaded.

In FIG. 5, the results of the interaction of the MSAs 506, 520; LSAs 507, 521-526; RSAs 508, 527, and the PMSA 509 can be seen by comparing the various calendars. The lot processing appointment $L_1$ is scheduled on the machine calendar 501 for $[t_1, t_2]$, on the reticle calendar 540 and on the lot calendar 520 as $T_1$ for the same period. However, note that the MSA 506 considers the setup $S_1$ and the LSA 507 considers the move $M_1$ in scheduling this appointment. Similarly, the PM is scheduled on the machine calendar 501 for the tool $T_1$ and on the preventive maintenance calendar 504 for the period $[t_4,t_6]$ and the Qual is scheduled on the machine and PM calendars 501, 504 for the period $[t_6,t_8]$. For the batch process operations require loading, charging, discharging and unloading steps, a lot load appointment and a lot unload appointment are scheduled on the lot calendars 512-517 and a batch load appointment and a batch unload appointment with the same time interval as those on the lot calendar are scheduled on the loading resource calendar 518. A batch lot processing appointment is scheduled on the machine calendar 511 for $[t_6,t_8]$, a batch charge appointment for the period $[t_6,t_6]$ and a batch discharge appointment for the period $[t_7,t_8]$ are scheduled on the loading resource calendar 518.

Thus, appointments scheduled as discussed relative to FIG. 3 are booked on calendars, e.g., the calendars 345, 370, 385, maintained by each scheduling agent, e.g., the scheduling agents 305, 310, and 315. However, as is apparent from the above scheduling discussion, booked appointments are subject to modification to accommodate the scheduling of new appointments. Booked appointments may be shifted, bumped, shrunken, expanded, aborted, canceled, and re-scheduled. These modifications may be initiated by the consumers, providers, or secondary resources, depending on the situation.

For instance, booked appointments may be shifted. As mentioned above, most appointments have a commitment window. Appointments are viewed as "beads on a string." Existing appointments are permitted to slide backward or forward within their respective commitment windows as necessary to provide a calendar with flexibility that in turn permits the scheduling agent to create a more efficient schedule and react to unexpected events. In the illustrated embodiment, to simplify the logic, appointments are not permitted to shift past the next appointment in either direction.

Figure 6:
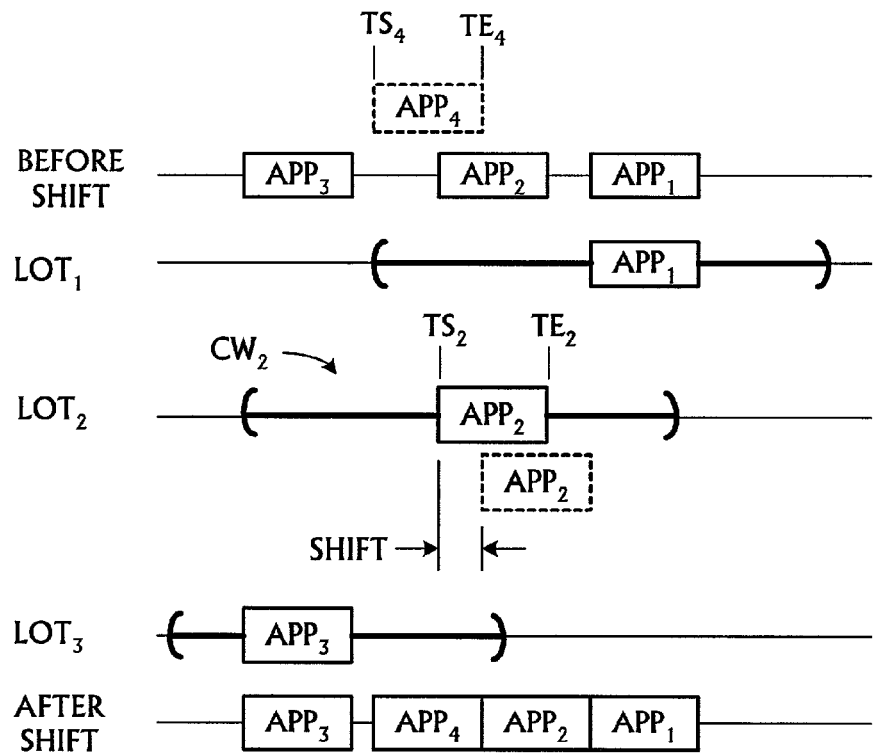
FIG. 6 conceptually illustrates how booked appointments may be shifted to accommodate the scheduling of a new appointment.

Consider, for example, the calendar conceptually illustrated in FIG. 6. The calendar has three appointments $APP_1$-$APP_3$ booked for three lots $LOT_1$-$LOT_3$, respectively. Note that each appointment $APP_1$-$APP_3$ is booked within a corresponding commitment window $CW_1$-$CW_3$, respectively. Assume that the provider for whom this schedule is maintained wishes to schedule the $APP_4$ for the $LOT_4$. The proposed appointment time slot $[TS_4, TE_4]$ conflicts with the scheduled appointment time $[TS_2, TE_2]$ for the booked appointment $APP_2$. However, the appointment $APP_2$ has ample room within its commitment window $CW_2$ within which to shift so that the appointment $APP_4$ can still be scheduled. In this particular example, the appointment $APP_2$ is shifted right, or later in time, within its commitment window $CW_2$ so that the appointment $APP_4$ may be scheduled and booked.

A variety of approaches may be taken to this kind of shifting, depending on the implementation. For instance:
- a booked appointment may be considered for shifting to an earlier start time TS if it is preceded by a schedule gap or other appointments that can shift left and if shifting it to an earlier start time TS will allow the candidate appointment to be scheduled in the open time slot created by the shift;
- booked appointment(s) may be considered for shifting to a later start time TS if there is no gap or an unusable gap (i.e., a candidate appointment will not fit) in the schedule immediately preceding the booked appointment(s) and the candidate appointment will eliminate the gap after shifting the booked appointment(s) to a later start time TS;
- if a schedule gap precedes a setup, the setup may be shifted to an earlier start time to enable a new appointment (with the same setup) to be added immediately in front of a booked appointment that uses the same setup;
- a setup can be eliminated if it is shifted to an earlier start time that immediately follows a booked appointment that requires the same setup; and
- a setup can be eliminated if it is shifted next to a setup of the same type.

Figure 7:
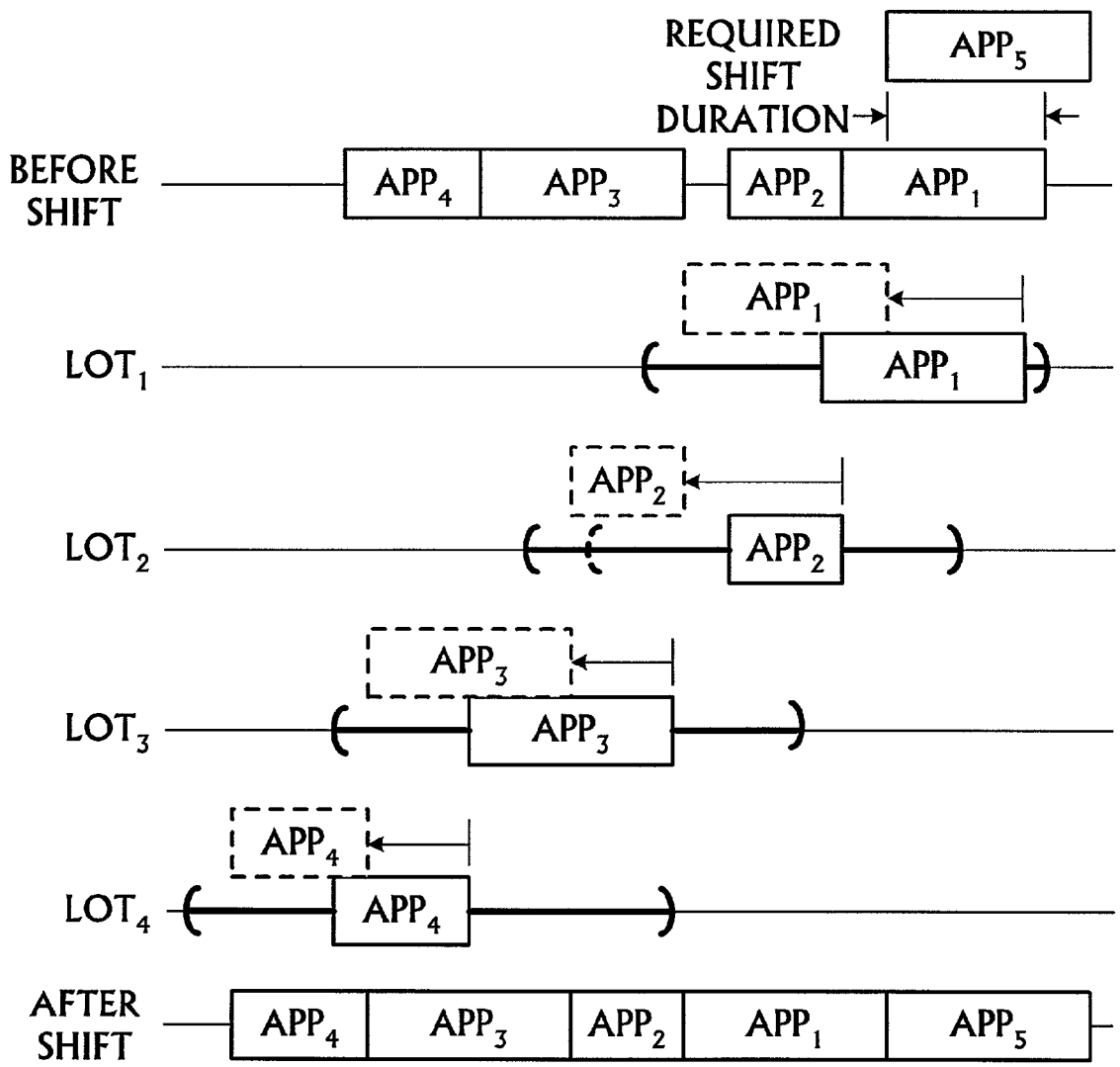
FIG. 7 conceptually illustrates a "cascade shift left" of booked appointments to accommodate the scheduling of a new appointment.

The shifting can also be more complex than just shifting a single booked appointment. One such situation is shown in FIG. 7, wherein several booked appointments are shifted in a "cascading" fashion to accommodate the scheduling of a new appointment $APP_5$. In FIG. 7, the new appointment $APP_5$ seeks to schedule at the time for which the appointment $APP_1$ is already booked. In this case, the commitment windows of all the booked appointments $APP_1$-$APP_4$ are ample enough to allow them to shift left (to an earlier time) in a "cascading" fashion to allocate the time slot for the new appointment $APP_5$. A more complicated and powerful shifting routine formed by combining a sequence of "cascading left shift" and "cascading right shift" moves can be used to open a time slot on the calendar for a new appointment.

Besides the process window and the commitment window, each appointment may have other attributes depending on the nature of the appointment. For example, a move appointment will have the attributes: source location and target location to represent the source and the destination of the move. A lot processing appointment will have the attributes: transport start time and remaining transport time which will be used to calculate the dynamic earliest start time of the appointment. If a loading operation is involved in a process operation, the corresponding lot processing appointment will have two extra attributes: load start time and the remaining load time. The dynamic EST of this lot processing appointment can therefore be derived from the these four attributes together with the current time and static EST.

Figure 9A:
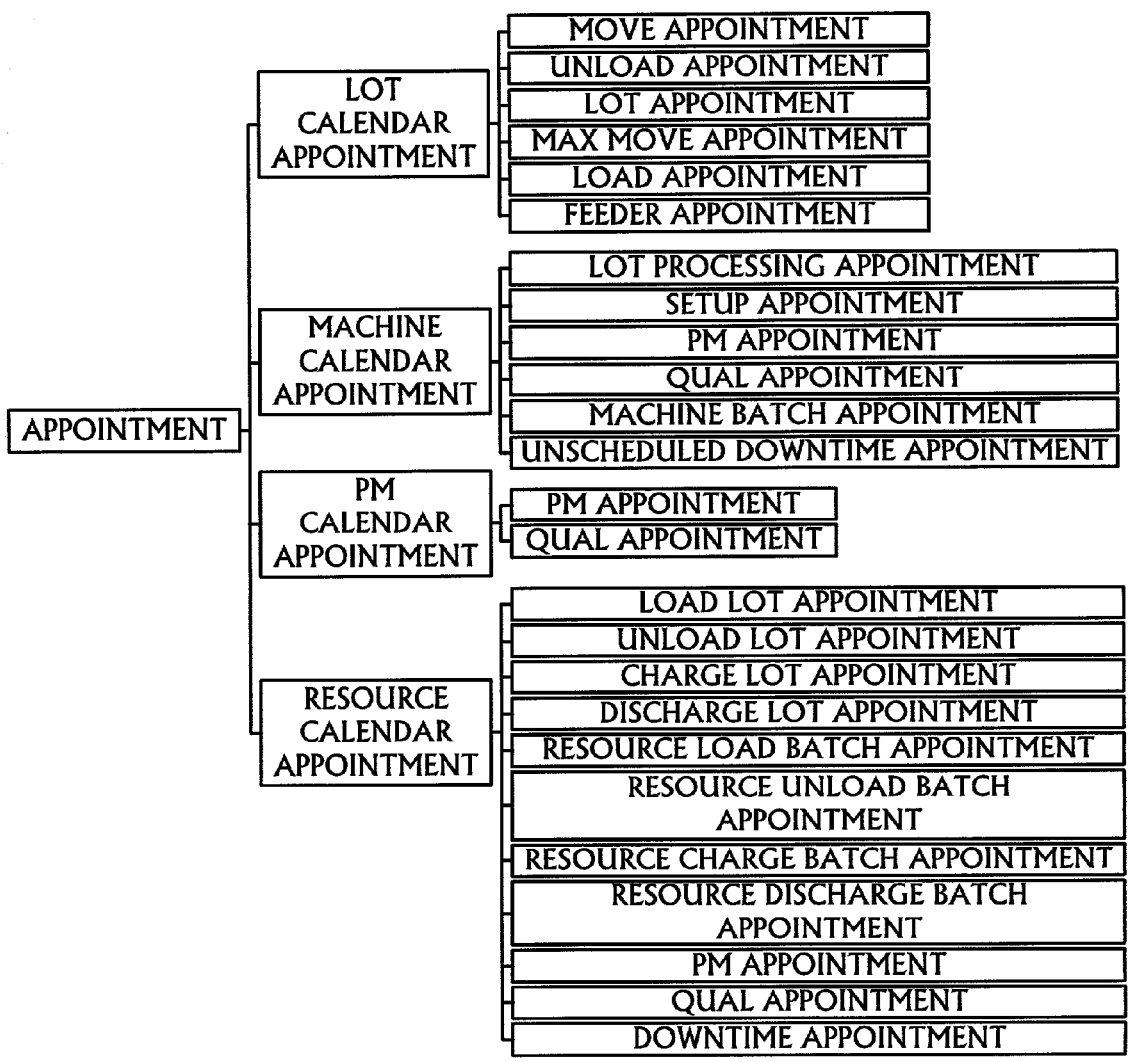
FIG. 9A illustrates the hierarchy of an appointment class in one particular implementation of the present invention employing object oriented programming techniques.

Some appointments will share some same properties. For examples: all the appointments have a processing window and an appointment ID; all the lot appointments will have a reference of a lot; all the Batch appointments will have a list of all the batch participants. The appointment classes, in the illustrated embodiment, are organized in a hierarchy structure that makes the code maintenance task easier and more efficient. This hierarchy is illustrated in FIG. 9A.

Figure 9B:
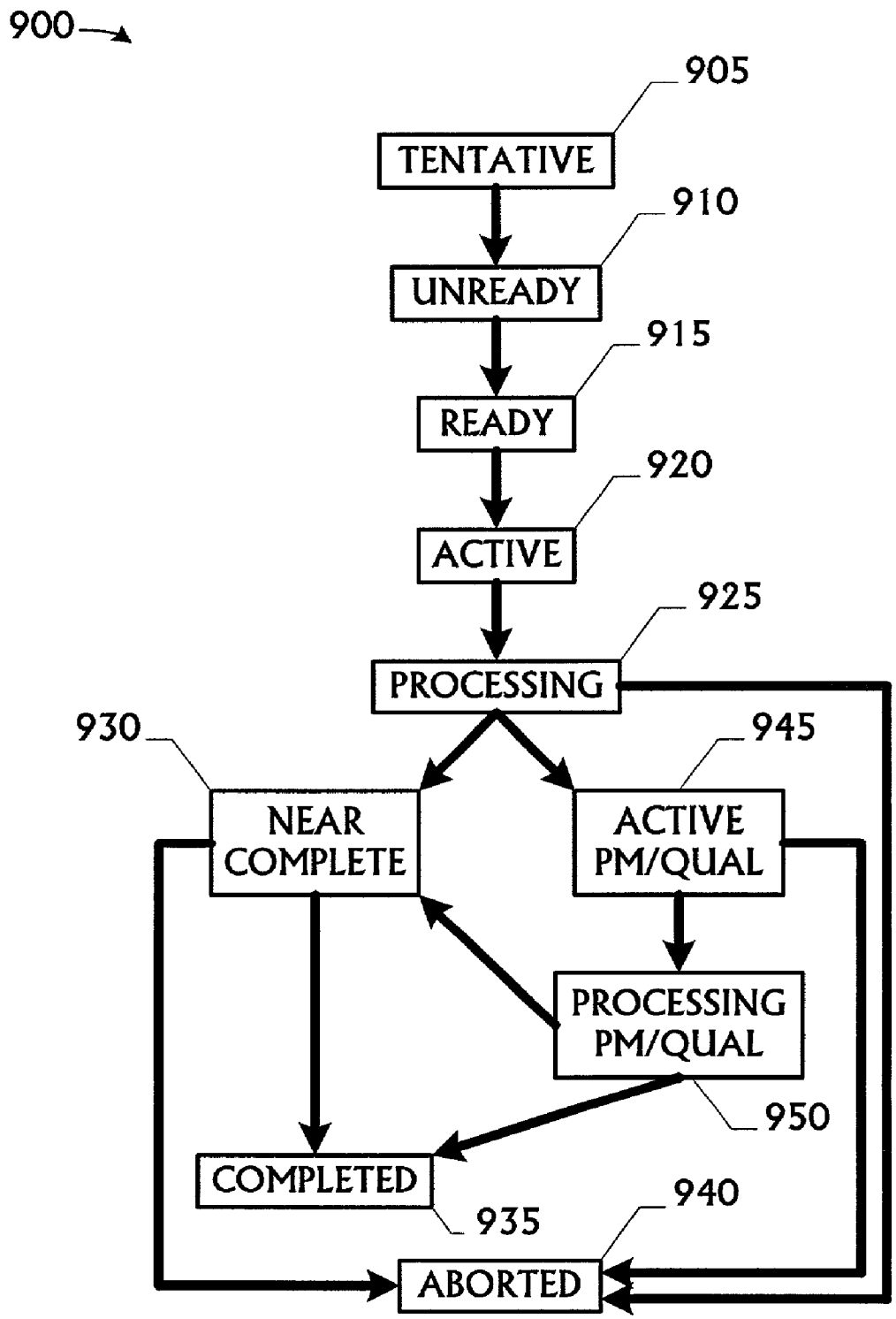
FIG. 9B diagrams the changes in status of appointments in one particular implementation.

FIG. 9B is a diagram 900 for the status in which appointments may exist in the illustrated embodiment. At any given time, each appointment will have a tentative (at 905), unready (at 910), ready (at 915), active (at 920), processing (at 925), near complete (at 930), completed (at 935), or aborted (at 940) status. Note that, in the illustrated embodiment, PMs and Quals may also be in an active PM/Qual (at 945) or processing PM/Qual (at 950) status. The scheduling agents maintaining calendars are responsible for changing the appointment status when specific events occur.

For example, when a lot processing appointment is initially created, it will be assigned the "tentative" status. When the appointment was booked onto the process tool calendar, the MSA will change the appointment status from "tentative" (at 905) to "unready" (at 910). When the lot 130 arrives at the I/O port (not shown) of the process tool 115, the MSA will change the appointment status to "ready" (at 915). When the start time of the appointment arrives, the MSA will change the appointment status to "active" (at 920). After receiving a message from the equipment interface of the process tool 115 indicating that the lot 130 is actually started processing on the process tool 115, the MSA changes the appointment status to "processing" (at 925). Depending on the type of the process tool 115, the MSA may change the appointment status from "processing" (at 925) to "near complete" (at 930). Typically, this change is made if the MSA receives another message from the equipment interface indicating that the process tool 115 has reached a specified processing stage. For example, the passage of 80% of the processing time might indicate that an appointment is "near complete." When the lot 130 completes or aborts its processing on the process tool 115, the MSA changes the appointment status to "completed" (at 935) or "aborted" (at 940), respectively.

The appointment status is used to help scheduling agents to determine what kind of response should be taken to specific events. For example, when a MSA receives a machine down event (not shown) indicating that a process tool 115 is currently down, and there is a current appointment in the "active" (at 920) or "processing" (at 925) status, the MSA should take some action. In the illustrated embodiment, the MSA first shrinks that appointment such that the end time of the appointment will be set to the time when the machine down event was received. The MSA will then change the appointment status to "aborted" (at 940) and cancel all the appointments for the down process tool 115 after the aborted appointment so it can book a downtime appointment. However, if there is no current appointment in the "active" (at 920) or "processing" (at 925) status when the MSA receives a machine down event, the MSA will cancel all future appointments on its calendar and book a downtime appointment.

To prevent undesirable appointment shifting, the illustrated embodiment employs a locking mechanism. Generally speaking, when a lot 130 starts its final move from a source location to a machine port of the process tool 115, it is undesirable to have a new appointment jumping in front of it by canceling or shifting that appointment to the right, or later in time. To prevent this from occurring, when the LSA 305 asks the MSA 310 to reserve a machine port, the MSA 310 "locks" the lot processing appointment when the lot 130 starts its final move. But, sometimes, locked appointments do need to be shifted. For instance, assume two appointments are booked on the calendar for a particular process tool 115, and the first one is processing while the lot 130 for the second one is moving to the port of the process tool 115. The second appointment is locked because it is in its "final" move to the process tool 115. If the first appointment runs long and is to be expanded, the second one is first shifted to permit the first one to expand. Thus, the locked second appointment is shifted even though this is generally undesirable. In these cases, some special calendar shift routines designed specifically for handling locked appointments are used. The shifting of locked appointments is performed at the agent's discretion depending on circumstances. In the situation cited above, the locked second appointment most likely cannot be rescheduled elsewhere with an earlier start time.

As is apparent from earlier in the discussion, some appointments are scheduled along with "corresponding" appointments on other calendars. "Corresponding" appointments are appointments booked on different calendars in furtherance of the same activity. The appointments 375a, 375b, 375c in FIG. 3, for example, are "corresponding" appointments for processing the lot 130 in the process tool 115. For example:
- a lot appointment and a corresponding lot processing appointment will appear on the lot scheduling calendar and the machine scheduling calendar; respectively;
- a PM appointment and a corresponding machine PM appointment will appear on the PM scheduling calendar and machine scheduling calendar, respectively; and
- a lot load appointment and a corresponding resource load appointment will appear on the lot scheduling calendar and loading resource scheduling calendar, respectively, if a loading operation is required on the process tool for the process operation.

These corresponding appointments are "synchronized," i.e., a change in one appointment triggers the change in the other so that they will have the same characteristics (e.g., start time, end time, etc.). In the illustrated embodiment, appointment changes can include changes in appointment status, changes in the processing window of an appointment, changes in the commitment window of an appointment, transport related changes, loading related changes, unloading related changes, transport location changes, and batch appointment related changes. More particularly, changes in the appointment's status may include (as indicated in FIG. 9B):
- changing the appointment's status to "unready";
- changing the appointment's status to "ready";
- changing the appointment's status to "active";
- changing the appointment's status to "active PMIQual";
- changing the appointment's status to "processing";
- changing the appointment's status to "processing PM/Qual";
- changing the appointment's status to "near complete";
- changing the appointment's status to "completed"; and
- changing the appointment's status "aborted."

Changes in the processing window may include:
- shifting the start time of the processing window;
- shifting the end time of the processing window;
- shifting the processing window left, or earlier in time, within the commitment window;
- shifting the processing window right, or later in time, within the commitment window;
- setting the duration of the processing window;
- shrinking a consumption interval of a processing window;
- shrinking a processing interval of a processing window;
- expanding a consumption interval of a processing window; and
- expanding a processing interval of a processing window.

Changes in the commitment window may include:
- updating the duration of the commitment window;
- updating the start time of the commitment window; and
- updating the end time of the commitment window.

Transport related changes may include:
- setting the remaining transport time;
- setting the transport start time; and
- setting both the transport start time and the remaining transport time;

Loading related changes may include:
- setting the remaining load time;
- setting the load start time; and
- setting both the remaining load time and the load start time;

Unloading related changes may include:
- setting remaining unload time;
- setting the unload start time; and
- setting both the remaining unload time and the unload start time.

Transport location related changes may include:
- setting the source location; and
- setting the target location.

Batch appointment related changes may include:
- canceling a participant from a batch;
- joining a participant to a batch;
- removing a participant from a batch;
- changing the commitment window for the batch appointment;
- setting the identification number of the batch;
- setting the batch requirements; and
- shifting a participant appointment to join the batch.

Note that not all change types are applicable to all appointment types.

Figure 11:
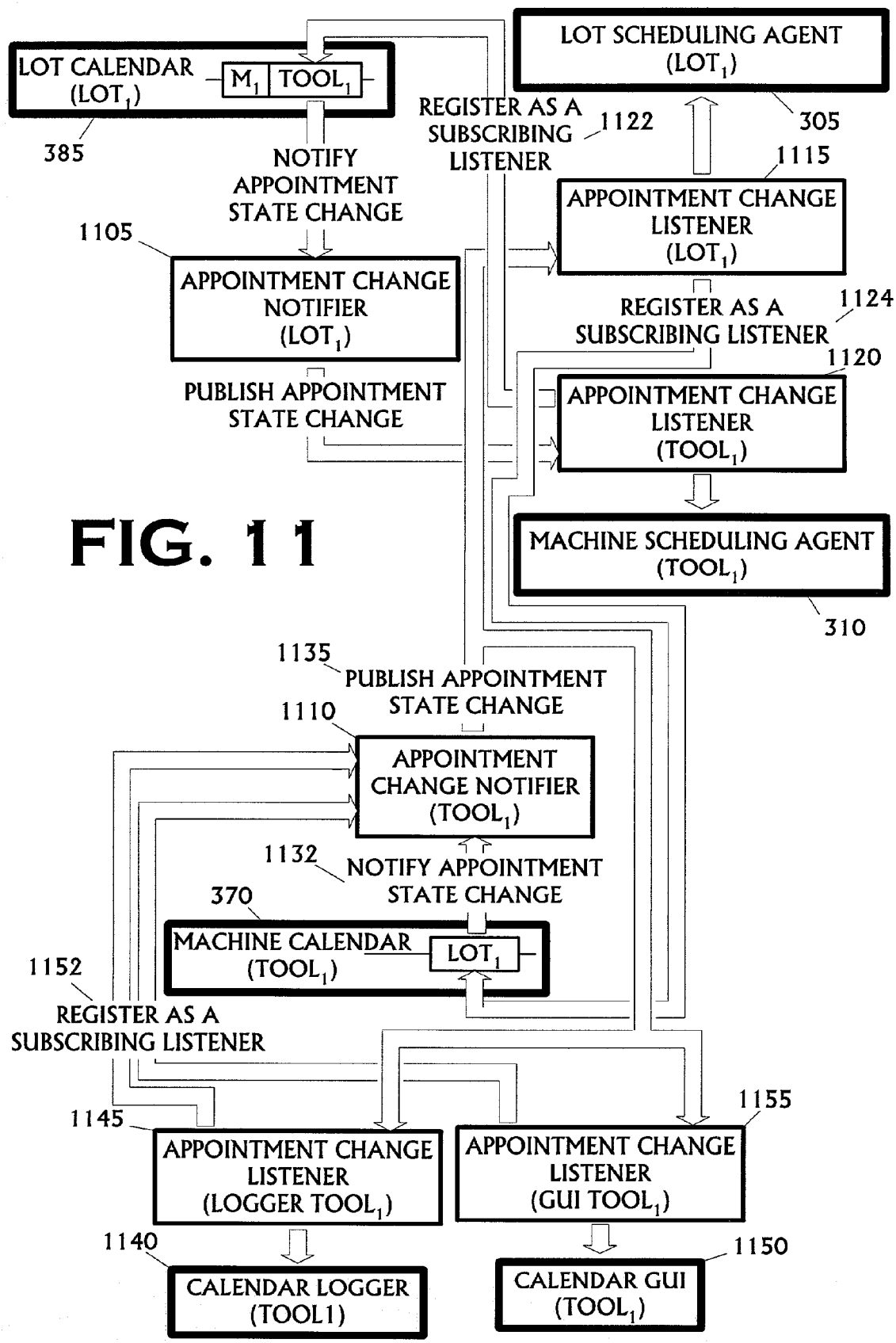
FIG. 11 illustrates the notification mechanism employed in one particular embodiment to keep corresponding appointments on different calendars synchronized.

To keep corresponding appointments synchronized, the illustrated embodiment uses an appointment change notification mechanism illustrated more fully in FIG. 11. FIG. 11 illustrates the mechanism with respect to the LSA 305, lot calendar 385, MSA 310 and the machine calendar 370 of FIG. 3. Note, however, that the mechanism illustrated in FIG. 11 can be extended to any set of calendars and corresponding appointments in the process flow 100.

Each calendar 385, 370 has a change notifier 1105, 1110, respectively that publishes changes to its appointments. Each of the corresponding appointments, either on the provider side or on the consumer side, is created with a reference to the respective change notifier 1105, 1110 for the respective calendar 385, 370 on which it is booked. Each of the scheduling agents 305, 310 maintaining the corresponding appointment has a "change listener" 1115, 1120, respectively. The change listeners 1115, 1120 subscribe to appointment changes that are published by the change notifiers 1105, 1110 that belong to the corresponding appointment on the other side. In FIG. 11, the appointment change listener 115, 1120 register (at 1122, 1124, respectively) with the lot appointment TOOL$_1$ and the lot processing appointment LOT$_1$, respectively, as subscribing listeners.

When the change listener 1115, 1120 receives a change event about the corresponding appointment on the other side, it will trigger its respective scheduling agent 305, 310 to find the corresponding appointment, and make appropriate adjustment to that appointment so that the appointment(s) on the provider side and consumer side will always keep in synch, if possible. However, the scheduling agent 305, 310 receiving the appointment change may need to react differently. In that case, it makes a different change to its appointment(s) and publishes that change to the listeners 1115, 1120.

More particularly, when a provider (e.g., the process tool 115 in FIG. 3) changes a booked appointment (e.g., the appointment LOT$_1$ on the machine calendar 370) through its scheduling agent (e.g., the MSA 310), it notifies (at 1132 in FIG. 11) the respective appointment change notifier (e.g., the change notifier 1110). The change notifier of the provider publishes an "appointment change event" (at 1135 in FIG. 11) to its subscribing listeners (including the one from the consumer). When the consumer change listener (e.g., the change listener 1115) receives the appointment change event, it triggers the consumer scheduling agent (e.g., the LSA 305) to make the same change to the corresponding appointment (e.g., the lot appointment TOOL$_1$) on its respective calendar (e.g., the lot calendar 385). The appointment change event in the illustrated embodiment includes the information about the changed appointment (e.g., a copy of the appointment), the old start time of the appointment, and the name of a specific method associated with the type of appointment change. The consumer change listener calls the matching method name in its scheduling agent, which will use this information to find the corresponding appointment, and make appropriate changes on the consumer side.

A slightly different change notification mechanism is used by calendar loggers and calendar "graphic user interface" ("GUI") display tools. In the illustrated embodiment, each calendar (e.g., the machine calendar 370) has a respective calendar logger (e.g., the calendar logger 1140) that logs all the changes occurring to the appointments on the calendar. Each calendar logger has an appointment change listener (e.g., the change listener 1145) subscribing to the changes on all the appointments (not just one) on the corresponding calendar. The calendar logger and calendar GUI (e.g., the calendar GUI 1150) register (e.g., at 1152) their listeners directly with the change notifier of the calendar they are listening to, rather than subscribing directly to each individual appointment. This allows the calendar logger and calendar GUI to listen to changes to every appointment on the calendar, including the booking of new appointments.

When one appointment or a set of appointments on the calendar is changed, the change listener will be notified as described above. The change listener will then trigger the calendar logger to log the corresponding change event(s) and dump the calendar. The entire history of a calendar can be recorded in a calendar log file in this manner. WFTs view a calendar using a set of GUI display tools. In this case, every calendar displayed on a computer screen has its own appointment change listener. As in the case of the calendar logger, this change listener is also subscribing to the changes of all the appointments on the displayed calendar. When something changes on the calendar, this change listener will be notified by the change notifier of the appointments, and this in turn will automatically trigger the refresh of the displayed calendar.

Figure 8A:
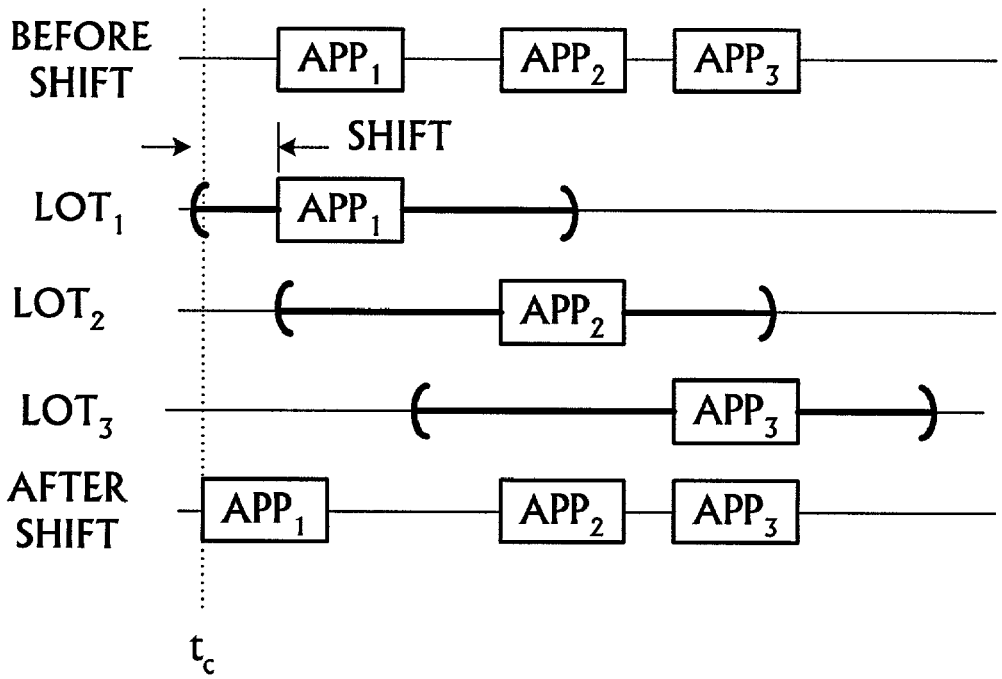
FIG. 8A and FIG. 8B conceptually illustrates the changing of booked appointments to take advantage of early start times.

One common reason for changing an appointment is to take advantage of "early starts." For example, if the MSA 310 in FIG. 3 encounters idle time while executing its schedule, the MSA 310 will attempt to shift the next appointment to an earlier start time and start it immediately. This instance is shown in FIG. 8A, wherein the current time tC falls within the commitment window CW$_1$ for the next appointment APP$_1$. The next appointment APP$_1$ is then shifted left, or to an earlier time, so that its processing can begin immediately or, perhaps, earlier than its current start time. This helps avoid idle time of the process tool 115.

Figure 8B:
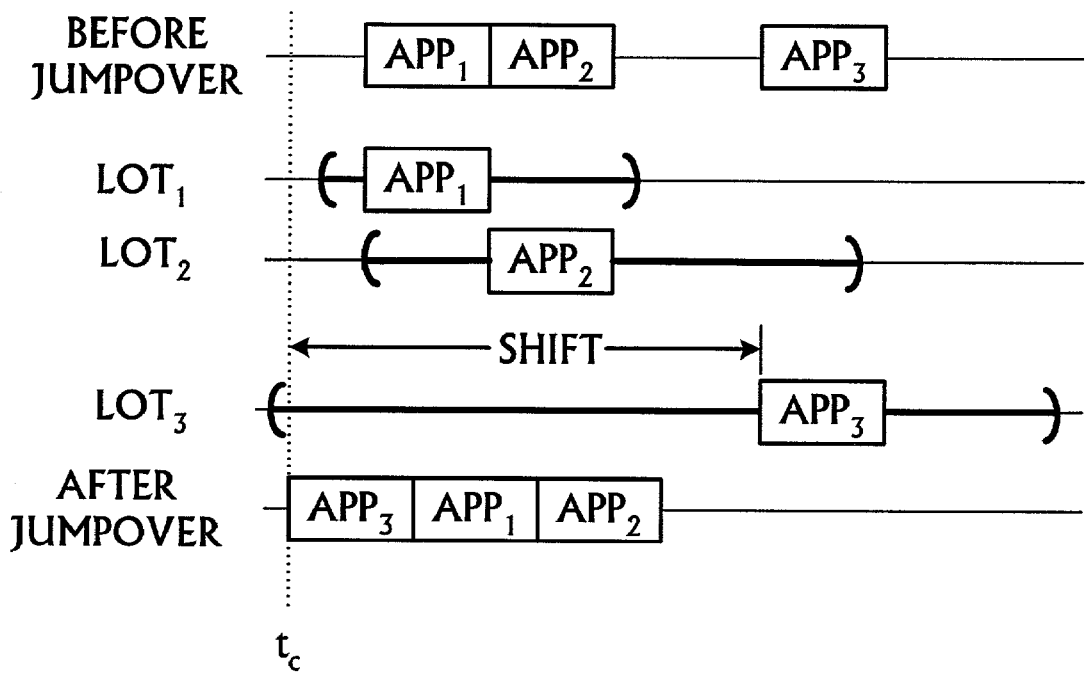

If the next booked appointment cannot be shifted to start at the current time, the MSA 310, in one of the alternative embodiments, will search for any other booked appointments that may have commitment windows starting at the current time or earlier. If one of these booked appointments can be moved to start immediately without causing cancellation of any other booked appointments, the booked appointment will be moved in a "jump over" fashion and other booked appointments will be shifted as required. This scenario is shown in FIG. 8B, wherein the current time $t_c$ at which the provider is idle is outside the commitment window CW$_1$ of the next booked appointment APP$_1$, but falls within the commitment window CW$_3$ of the third booked appointment APP$_3$. Hence, the third appointment APP$_3$ jumps over to the left, or to an earlier time, and the appointments APP$_1$ and APP$_2$ are shifted right, or to a later time, respectively, in a "cascading" fashion.

Note that, if an appointment other than the next booked appointment is considered for moving to the start position, setups are considered. It may be necessary to add a setup before, and after, the booked appointment that is moved into the start position. This type of move should only be considered if the sum of the extra setup time is less than the idle time remaining until the earliest start time of the next appointment.

Figure 10A:
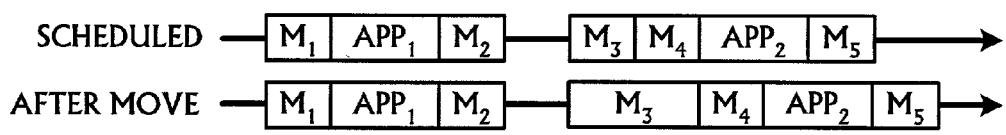
FIG. 10A and FIG. 10B conceptually illustrate two circumstances in which booked appointments are changed to accommodate unexpectedly long durations for preceding booked appointments.
Figure 10B:
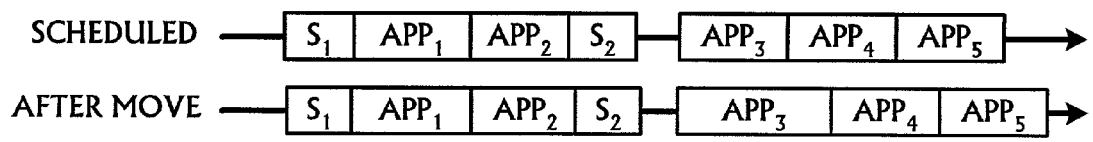

Appointments are also frequently changed when their duration, or the duration of an appointment preceding it, is shorter or longer than expected. FIG. 10A and FIG. 10B illustrate two such situations. In FIG. 10A, the move M$_3$ on the lot scheduling calendar was expanded because the transport was running longer than expected, and so the moves M$_4$, M$_5$ and the appointment APP$_2$ were shifted right to accommodate this longer duration. Note that shifting the processing appointment APP$_2$ will trigger an identical shift of the corresponding appointment (not shown) on the machine calendar unless it cannot be accommodated, in which case the MSA 310 may cancel the appointment instead of shifting it. In FIG. 10B, the appointment APP$_3$ took longer than was expected and was therefore expanded, so the appointments APP$_4$ and APP$_5$ were shifted right. The shifting of appointments APP$_4$ and APP$_5$ then triggers identical shifts of the corresponding appointments on the respective lot calendars. Note that in both FIG. 10A and FIG. 10B, the illustrated changes necessarily imply that, in both circumstances, the commitment windows for the changed appointments were wide enough to accommodate the changes. Otherwise, some appointments would have had to be canceled.

As alluded to immediately above, booked appointments may also be canceled. The appointment change listener for the lot 130 may receive a "cancel" appointment change event from the change notifier of the process tool 115, for instance, if the process tool 115 is no longer able to keep the booked appointment within its commitment window. When the LSA 305 receives the appointment cancel event through the change listener, it will remove the corresponding lot appointment from its own lot calendar 385 and reschedule for the process operation.

One common reason for canceling a scheduled appointment is "bumping." It may be more beneficial for a process tool 115 to confirm a new bid 365 for a lot with higher priority or a lot already behind its schedule. This may provoke cancellation of one or more existing appointments on the machine calendar 370 if the existing appointment(s) cannot be shifted enough to clear the required time interval. On a batch process tool, a participant of a booked batch appointment may be "bumped" out of the batch for the same reason. Sometimes the batch appointment may be forced to shift right or to a later time to accommodate a more urgent lot even with the bumping of an existing participant.

If a process tool 115 or lot 130 requests that an appointment be canceled, typically, only that one particular appointment is canceled. Because of the appointment change notification mechanism, both the process tool 115 and the lot 130 will remove the appointment from their respective calendars 370, 385. However, in some embodiments, canceling one appointment may result in canceling all subsequent, previously booked appointments. For example, if a LSA has multiple lot appointments booked in advance, and if one intermediate lot appointment is canceled, then all the subsequent appointments (move, lot appointment, load and unload) may be canceled. If the last lot appointment is canceled, then all the move appointments leading to that process tool 115, and possible lot load appointment, lot unload appointment, and the move appointment after that lot appointment may be canceled. The LSA will then start re-scheduling for canceled process operations. On the other hand, on a machine scheduling calendar, cancellation of a booked appointment due to bumping will not necessarily cause the cancellation of all appointments following the bumped appointment. A bumping bid may need to schedule a setup appointment following the newly booked appointment if insertion of the newly booked appointment removes or changes a setup required for subsequent appointments.

Note that, as booked appointments are shifted, shrunk, expanded, canceled, and rescheduled, the changes can ripple through the process flow and, in particular, the calendars. Changes are instituted by a single software agent, but each changed appointment may have corresponding appointments booked on multiple calendars. The changes are consequently communicated to the other software agents so they can update their respective calendars as was discussed immediately above. However, when the corresponding appointments on the other calendars are changed, the notification is suppressed so that it does not notify the agent that initiated the change. Otherwise, an infinite loop of change notifications will be formed between two scheduling agents.

To avoid this kind of undesirable change notification propagation, in the illustrated embodiment, a change event registration scheme is used. More specifically, when a MSA receives a change on a lot appointment, the change event is registered into a list (not shown) for the machine scheduling calendar. Later, when the MSA is ready to send a change notification about the corresponding lot processing appointment on its calendar, the MSA will first check the list of all the registered change events. In this case, a matched event will be found, and the MSA will interpret the event as a reactive change event coming from the LSA. Thus, no further action is required on the machine side, and the MSA will just remove the matched change event from the list. However, non-agent appointment listeners such as the calendar loggers and calendar GUI are always notified of relevant appointment changes. This occurs regardless of whether the change is being initiated or is a reactive change because these types of applications typically listen to only one calendar.

The ability to change appointments as discussed above is only incidental to the ability to manage the calendars in a more sophisticated fashion to improve the efficiency and efficacy of a process flow, e.g., the process flow 100 in FIG. 1. The power of the structure imposed on the various appointments by the calendaring technique of the present invention becomes most apparent when the associated calendars become relatively congested. If calendars are relatively uncongested, or if the calendaring techniques are relatively primitive, scheduling becomes easy—e.g., appointments can be scheduled on a "first come, first served" basis. On an uncongested calendar, this is not much of a concern as there is plenty of time and plenty of resources so that considerations such as a lot's priority become less important. There is enough processing resources so that problems are relatively few. On congested calendars, this is no longer true.

The sophisticated calendaring technique of the present invention respects the priority or importance of different lots 130 in the process flow 100, permits the opportunistic scheduling of PMs and Quals, and facilitates numerous other powerful calendar management capabilities. Some of these capabilities are useful in determining whether booked appointments on a given calendar may be managed to create a suitable slot for booking a new appointment. Some of these capabilities actually manage the booked appointments by shifting, bumping, or canceling booked appointments to create the time slot. To illustrate the power of the calendaring technique disclosed herein, several of these capabilities shall be discussed further in detail below.

As previously mentioned, the various software agents 265, in the illustrated embodiment, are implemented as "objects" in an object oriented programming environment. The management capabilities are implemented through "methods" called by the objects that are the software agents 265. These methods can, in turn, call other methods. Some of these methods determine the feasibility of a proposed action. Some of these methods actually implement a proposed action. However, details such as these are implementation specific, and will vary across embodiments. For instance, some embodiments might choose to both make the feasibility determination and implement the action within the same method. Indeed, some embodiments might not even employ OOP techniques, such that alternative approaches to performing the same functions might be employed. With that in mind, the discussion turns now to the implementation of the calendar management capabilities.

The illustrated embodiment employs a number of management techniques that may be considered "foundational" or "basic" with respect to some of the more powerful techniques. These foundational techniques may also be categorized as calendar accessor, calendar updating, appointment calendar updating, and appointment accessor methods. In one particular implementation, the calendar accessor methods include:

- getting a plurality of previously identified appointments;
- getting an active appointment;
- getting a first appointment;
- getting a last appointment;
- getting a "previous appointment;
- getting the next appointment;
- getting a particular, previously identified appointment;
- getting a first appointment ending after a given time;
- getting a first appointment starting after a given time;
- getting the last appointment ending before a given time;
- getting the last appointment starting before after a given time; and
- getting overlapping appointments.

The basic calendar updating methods include:
  canceling all appointments after a given time; and
  inserting a setup if one is required.

The basic appointment updating methods include:
  booking a new appointment;
  canceling a booked appointment;
  expanding a booked appointment;
  shrinking a booked appointment;
  shifting a booked appointment left, or earlier in time;
  shifting a booked appointment right, or later in time;
  shifting the start time of a booked appointment;
  shifting the end time of a booked appointment;
  shrinking the consumption interval of a booked appointment;
  expanding the consumption interval of a booked appointment;
  shrinking the processing interval of a booked appointment;
  expanding the consumption interval of a booked appointment;
  shifting a booked, locked appointment left, or earlier, in time;
  shifting a booked, locked appointment left, or earlier, in time where the appointment does not require a new setup;
  shifting a booked, locked appointment left, or earlier, in time where the appointment requires a new setup;
  adding a change listener;
  setting the identification number of a batch appointment;
  setting an identification number; and
  locking an appointment.

The basic appointment accessor methods include:
  getting the duration of an appointment;
  getting the start time of an appointment;
  getting the end time of an appointment;
  getting the duration of the processing window of an appointment;
  getting the static EST of an appointment;
  getting the earliest load time of an appointment;
  getting the EST of an appointment;
  getting the latest end time of an appointment;
  getting the transport start time of an appointment;
  getting the remaining transport time of an appointment;
  getting the load start time of an appointment;
  getting the remaining load time of an appointment;
  getting the unload start time of an appointment;
  getting the remaining unload time of an appointment;
  getting the processing duration of an appointment;
  getting the processing start time of an appointment;
  getting the processing end time of an appointment;
  getting the duration of the commitment window of an appointment;
  getting the start time of the commitment window of an appointment;
  getting the end time of the commitment window of an appointment;
  getting the duration of a consumption interval of an appointment;
  getting the start time of a consumption interval of an appointment;
  getting the end time of a consumption interval of an appointment;
  getting a change listener;
  getting the identification number of an appointment;
  getting the identification number of a batch appointment;
  identifying whether an appointment is locked;
  identifying what setup is required for an appointment;
  determining whether a setup is required for an appointment;
  determining whether a previous setup is compatible with the setup requirements for an appointment
  identifying the resource participants for an appointment;
  determining the feasibility of a shift left;
  determining whether a locked appointment requiring no setup can be shifted left;
  determining whether a locked appointment requiring a setup can be shifted left;
  determining the feasibility of a shift right;
  determining whether a locked appointment can be shifted right;
  determining whether a start time can be shifted;
  determining whether the start time of a locked appointment requiring no setup can be shifted;
  determining whether the start time of a locked appointment requiring a setup can be shifted;
  determining whether the end time of an appointment can be shifted; and
  determining whether the end time of a locked appointment can be shifted.

Note that not all methods are equally applicable to all appointments, or even all appointments of a given type. However, these methods collectively provide, in the illustrated embodiment, the basic functions necessary to implement the more powerful methods discussed immediately below.

One important task in scheduling appointments on congested calendars is the ability to "open" or "clear" slots on the calendar. Increased congestion for the calendar translates into increased difficulty in finding sufficient, uncommitted time in which to book new appointments. Since the committed time on the calendar for any booked appointment is defined by the commitment window, and since the processing windows may slide within the commitment window, there is some flexibility in manipulating booked appointments to open or clear slots in which new appointments may be booked. The illustrated embodiment employs several techniques including opening slots and clearing slots.

To open a slot, a scheduling agent begins by calling a method openSlotFeasibility. This method is used extensively during bid generation in order to find open slot bids on the machine calendar by attempting to open a slot between booked appointments that do not have sufficient time between them. It is also used during bid confirmation to determine if an appointment can be booked by opening a slot instead of canceling appointments that are already on the calendar. This method determines the feasibility of opening a slot with the specified duration on the calendar starting at the specified start time. If pre-setup or post-setup appointments are required, the method determines the feasibility of opening a slot large enough to accommodate the setup appointments in addition to the requested duration. The openSlotFeasibility method receives as inputs:
  a requested start time for a slot, excluding setup;
  a desired duration of the slot, not including setup time; and
  any setup required for the slot.

The openSlotFeasibility method returns as outputs:
  a Boolean indicator of whether opening the slot is feasible;
  an actual slot start time for the feasible slot, which may be the start time for a setup if one is required;
  an actual slot end time for the feasible slot;
  a process start time, which may be later than the slot start time if a setup is required;
  a net change in setup time; and a list of appointment actions required in order to open the feasible slot.

The openSlotFeasibility method calls two other methods, cascadeLeftShiftFeasibility and cascadeRightShiftFeasibility, discussed further below, to determine the feasibility of opening the slot.

More particularly, the openSlotFeasibility method determines the last appointment starting before the requested start time ("before appointment") and the first appointment starting after the requested start time ("after appointment") and determines if it is possible to open the required slot between them. First, the openSlotFeasibility method determines if time should be allocated for a setup prior to the requested start time. If the slot requires a setup, and the "before appointment" does not have a compatible setup or there is no "before appointment," then the openSlotFeasibility method subtracts the setup duration from the requested start time and thereby calculates the start time of the "expanded slot." The start time of the "expanded slot" is compared to the current time and, if it is less than the current time, it is reset to the current time. If the start time of the "expanded slot" is earlier than the end time of the "before appointment," the method calculates the desired left shift duration that the "before appointment" should shift left by computing the difference between the end time of the "before appointment" and the start time of the "expanded slot."

The openSlotFeasibility method then calls cascadeLeftShiftFeasibility method to determine whether the "before appointment" can be shifted left (to an earlier time) the desired left shift duration. If the desired shift is feasible, the "feasible slot start time" is set to the start time of the expanded slot. If the desired shift is not feasible, the response from cascadeLeftShiftFeasibility indicates the actual amount of time the "before appointment" can shift and the "feasible slot start time" is set to what the end time of the "before appointment" would be if it shifted left the actual amount of time it is capable of. If there is no "before appointment" or if the end time of the "before appointment" is before the current time, then there is no need to attempt to determine if the "before appointment" can be shifted to the left (to an earlier time).

The openSlotFeasibility method then adds the input slot duration, and the setup duration, if applicable, to the start time of the "expanded slot" to calculate the "feasible slot end time." The openSlotFeasibility method determines if a post-setup would be required after the slot. If there is an "after appointment" that requires a setup that is different than the slot setup, then the openSlotFeasibility method adds the post-setup duration to the "feasible slot end time" to calculate a revised "feasible slot end time." The openSlotFeasibility method then compares the revised "feasible slot end time" to the start time of the "after appointment" to determine if the "after appointment" should to be shifted to the right (to a later time). If there is an "after appointment" that should be shifted, the openSlotFeasibility method calculates the desired right shift duration as the difference between the "feasible slot end time" and the start time of the "after appointment." The method then calls cascadeRightShiftFeasibility to determine whether the "after appointment" can be shifted right the desired right shift duration. If the "after appointment" can shift right the desired right shift duration, the method then returns a feasible result, including the net change in setup time. Otherwise, if the "after appointment" cannot shift the desired right shift duration, the openSlotFeasibility method ends and returns a not-feasible result.

If it is feasible to open the slot and it is subsequently desirable to do so, the slot is opened. The scheduling agent calls one of two methods. The first of these methods is the openSlot method. This openSlot method opens a slot with the specified duration on the calendar starting at the specified start time. If pre-setup or post-setup appointments are required, the method opens a slot large enough to accommodate the setup appointments in addition to the requested duration. The second of these methods is the openSlotAndBookAppointment method. The openSlotAndBookAppointment method opens a slot starting at the specified start time with the specified duration on the calendar and then books an appointment. If pre-setup or post-setup appointments are required, the method opens a slot large enough to accommodate the setup appointments and also books the required setup appointments. Both the openSlot method and openSlotAndBookAppointment method use the cascadeLeftShift and cascadeRightShift methods, discussed further below, to open the slot on the calendar with the desired start time and duration.

Turning now to the openSlot method, it receives as inputs:
a requested start time for slot, excluding setup;
a desired duration of slot, not including setup time; and
a setup required for slot.

and outputs a Boolean indicator of whether the slot has been successfully opened. The openSlot method uses the same logic as the openSlotFeasibility method, except it calls the cascadeLeftShift method instead of the cascadeLeftShiftFeasibility method and it calls the cascadeRightShift method instead of the cascadeRightShiftFeasibility method. If both cascadeLeftShift and cascadeRightshift are performed successfully, then the openSlot method returns a Boolean true indicating the slot has been successfully opened on the calendar. Otherwise, if either cascadeLeftShift or cascadeRightShift cannot be performed successfully, the openSlot method returns a Boolean false indicating the slot cannot be opened. Note that no other methods are allowed to update the calendar while the openSlot method is executing.

Turning now to the openSlotAndBookAppointment, it receives as an input the appointment to be booked and returns no output. The openSlotAndBookAppointment method first finds the last appointment on the calendar. If there is a last appointment and if the last appointment is a lot processing appointment and if the appointment to be booked is a lot processing appointment with zero remaining transport time, then the openSlotAndBookAppointment method saves the original end time of the last appointment and sets a flag indicating the last appointment may be cancelled. The openSlotAndBookAppointment method then calls the openSlot method to open a slot on the calendar starting at the appointment start time, with duration of the appointment's duration and setup matching the appointment's setup requirement, if any.

After the openSlot method is performed, the openSlotAndBookAppointment method books the new appointment and any required pre-setup or post-setup appointments on the calendar. The openSlotAndBookAppointment method then checks the new end time of the last appointment, if any, against the original end time of the last appointment. If the last appointment has shifted to a later time, it calculates the ratio of the shift duration to the appointment duration and compares the ratio against a configurable property. If the calculated ratio is greater than the property value, the last appointment should be cancelled so the openSlotAndBookAppointment method determines if the last appointment should get a penalty refund. If the last appointment paid a bumping fee, which is normally non-refundable, the openSlotAndBookAppointment method sets the penalty refund of the last appointment equal to the bumping fee it paid, otherwise the penalty refund for the last appointment is set to zero.

If the last appointment should be cancelled, the openSlotAndBookAppointment method then cancels the last appointment. After canceling the last appointment, if necessary, the openSlotAndBookAppointment method ends. The reason for canceling the last appointment is that when it is shifted beyond the threshold, it may be able to find a better appointment on another machine. Note that no other methods are allowed to update the calendar while the openSlotAndBookAppointment method is executing.

Although both the openSlot and openSlotAndBookAppointment methods open a slot on the calendar, they are used differently. In confirming a bid, a MSA calls a helper class object known as a "bid confirmer." The bid confirmer calls the openSlot method when is preparing to book an appointment in an open slot that has previously been found to be feasible by calling openSlotFeasibility. On the other hand, the MSA may directly call the openSlotAndBookAppointment method to open a slot and book an appointment in one calendar operation. Note, also, that the openSlotAndBookAppointment method calls the openSlot method to actually open the slot.

Clearing slots on the calendar uses a logic that is, in some ways, similar to that of opening slots on the calendar. To clear a slot, a method called clearSlotFeasibility is called. The clearSlotFeasibility method determines the feasibility of clearing a slot for a given appointment by finding all appointments that overlap the time interval of the appointment and then checking whether the requested slot can be cleared by recursively shifting the overlapping appointments before, around, or after the requested time interval. If pre-setup or post-setup appointments are required, the method determines the feasibility of clearing a slot large enough to accommodate the setup appointments in addition to the requested duration. It receives as an input the potential appointment for which the clear slot feasibility is to be determined and outputs:

- a Boolean indicator of whether clearing the slot is feasible;
- the net change in setup time;
- a list of overlapping appointments that should be cancelled in order to clear the slot; and
- a list of appointment actions required in order to clear the slot.

More particularly, the clearSlotFeasibility method initially sets the slot start time to the "potential appointment" start time and it sets the slot end time to the "potential appointment" end time. The clearSlotFeasibility method then determines whether a pre-setup and/or post-setup appointment should to be added in order the book the "potential appointment." If the "potential appointment" requires a setup then it finds the last appointment ending before the appointment start time ("pre-appointment") and determines whether the "pre-appointment" setup matches the "potential appointment's" setup requirement. If the pre-setup doesn't match the "potential appointment's" required setup it recalculates the slot start time by subtracting the required setup duration from the "potential appointment's" start time.

The clearSlotFeasibility method then finds the first appointment starting after the "potential appointment's" end time ("post-appointment"). If the "post-appointment" is not a setup appointment and the "post-appointment" requires a post-setup that is different than the "potential appointment" setup, then the clearSlotFeasibility method recalculates the slot end time by adding the post-setup duration to the "potential appointment's" end time. Next, the clearSlotFeasibility method finds all appointments that overlap with the time interval defined by the slot start time and slot end time. If there are no overlapping appointments then the method ends and returns indicating the result is feasible and no cancellations are required. Otherwise, the clearSlotFeasibility method sets the "before appointment" to the last overlapping appointment, i.e., the overlapping appointment with the latest start time, and calls a method named recurseClearSlot (discussed further immediately below) passing in the "potential appointment," the collection of overlapping appointments and the "before appointment."

The recurseClearSlot method first determines whether the "before appointment" can shift far enough to the left (to an earlier time) so the "potential appointment" could be booked after it. If the "potential appointment" has a setup requirement, then recurseClearSlot compares the setup requirement of the "before appointment" against the setup requirement of the "potential appointment." If the "before appointment" is a setup appointment, recurseClearSlot finds the appointment ("previous appointment") before the "before appointment" and compares its setup requirement against the setup requirement of the "potential appointment." If the "potential appointment" has a setup requirement and the setup doesn't match, recurseClearSlot calculates the required end time of the "before appointment" by subtracting the setup duration from the start time of the "potential appointment." If the required end time of the "before appointment" is less than its actual end time, the recurseClearSlot method calls the cascadeLeftShiftFeasibility method to determine if the "before appointment" can be shifted left enough so the "potential appointment" could be booked after it. The recurseClearSlot method calls the cascadeLeftShiftFeasibility method with the "before appointment" and the required left shift duration, which is the difference between the "before appointment's" end time and the required end time. If the "before appointment's" end time is less than its required end time, then there is no need to shift the "before appointment" to the left and the recurseClearSlot method looks at whether any appointments after the "before appointment" should be shifted to the right. If the "before appointment" is a setup appointment and there is no "previous appointment," then the setup appointment can be removed and recurseClearSlot continues the same as if cascadeLeftShiftFeasibility is feasible.

If the cascadeLeftShiftFeasibility method indicates the left shift is feasible, then the recurseClearSlot method finds the next appointment ("after appointment") after the "before appointment." If the "after appointment" has a setup requirement (post-setup) that is different than the "potential appointment," then the recurseClearSlot method calculates the required start time of the "after appointment" by adding the post-setup duration to the end time of the "potential appointment." If the required start time of the "after appointment" is later than the start time of the "after appointment," then the recurseClearSlot method calls the cascadeRightShiftFeasibility method to determine if the "after appointment" can be shifted right enough so the "potential appointment" could be booked before it. The recurseClearSlot method calls the cascadeRightShiftFeasibility method with the "after appointment" and the required right shift duration, which is the difference between the required start time of the "after appointment" and the actual start time of the "after appointment." If the cascadeRightShiftFeasibility method indicates the right shift is feasible, the recurseClearSlot method ends and returns a feasible result as well as the net setup added.

Otherwise, if the cascadeLeftShiftFeasibility method indicates the "before appointment" cannot shift left the required amount, then the recurseClearSlot method checks to see if there is an overlapping appointment before the "before appointment." If there is no overlapping appointment before the "before appointment" then the recurseClearSlot method determines how much the "before appointment" should be shifted to the right in order for the "potential appointment" to be booked in front of it. The required start time of the "before appointment" is the end time of the "potential appointment," unless the "before appointment" requires a setup that is different than the setup of the "potential appointment," and then the required start time of the "before appointment" is the sum of the end time of the "potential appointment" and the setup duration for the "before appointment." The recurseClearSlot method then calls the cascadeRightShiftFeasibility method with the "before appointment" and the required shift duration, which is the difference between the required start time of the "before appointment" and the actual start time of the "before appointment." If the cascadeRightShiftFeasibility method indicates the right shift is feasible, the recurseClearSlot method ends and returns a feasible result, as well as the net setup added.

In either of the two instances above where the cascadeRightShiftFeasibility method is invoked, if the cascadeRightShiftFeasibility method indicates the right shift is not feasible, the clear slot is not feasible using this "before appointment" before the "potential appointment," so the recurseClearSlot method determines if there is an overlapping appointment before the "before appointment." If there is an overlapping appointment ("previous appointment") before the "before appointment," the recurseClearSlot method calls itself recursively passing the "previous appointment" as the new "before appointment" and the other inputs (overlapping appointment collection and "potential appointment") are unchanged. If there is no overlapping appointment before the "before appointment," the recurseClearSlot method calculates the required start time of the "before appointment" so the "potential appointment" could be booked before it. The required start time of the "before appointment" in this case is the end time of the "potential appointment," unless the "before appointment requires a setup that is different than the setup of the "potential appointment." Then the required start time of the "before appointment" is the sum of the end time of the "potential appointment" and the setup duration for the "before appointment."

The recurseClearSlot method then attempts a cascadeRightShiftFeasibility on the "before appointment" using the required shift duration, which is the difference between the required start time of the "before appointment" and the actual start time of the "before appointment." If the cascadeRightShiftFeasibility method indicates the right shift is feasible, then the recurseClearSlot method ends and returns a feasible result, as well as the net setup added. If the cascadeRightShiftFeasibility method indicates the right shift is not feasible, then the recurseClearSlot method ends and returns a non-feasible result.

This recursion continues until either a feasible result is found or there is no previous overlapping appointment before the "before appointment" and the "before appointment" cannot be shifted to start after the "potential appointment" plus any post-setup that may be required immediately after the "potential appointment." If the recurseClearSlot method indicates that clearing the slot is feasible, the clearSlotFeasibility method returns the net setup change and the list of appointment actions required to clear the slot, and indicates the clear slot is feasible. If the recurseClearSlot method indicates that clearing the slot is not feasible, the clearSlotFeasibility method returns the list of overlapping appointments that should be cancelled and indicates the clear slot is not feasible.

The clearSlotFeasibility method enjoys great utility. The bid confirmer previously mentioned and another of the MSA's helper class objects known as the bid generator use this method. The bid generator uses the method to determine if a slot can be cleared for a potential bid. The bid confirmer uses this method to determine if a slot can be cleared to book a new appointment.

If it is feasible to clear the slot and it is still desirable to do so, the slot is cleared. The present invention employs one of three methods, depending on context. These three methods are called clearSlot, clearSlotAndBookAppointment, and forcedClearSlotAndBookAppointment. Each of these methods clears a slot for a specified appointment by finding all potential appointments that overlap with the specified appointment and then executing a clearing procedure that recursively tries to shift these appointments before, around, or after the specified appointment without canceling any appointments. If the slot cannot be cleared via shifting, overlapping appointments are cancelled one at a time and the recursive clearing procedure is called again after each cancellation. If pre-setup or post-setup appointments are required, the method clears a slot large enough to accommodate the setup appointments in addition to the specified appointment's duration. If the slot can be cleared, the clearSlotAndBookAppointment method proceeds and books the appointment. The forcedClearSlotAndBookAppointment method does not contemplate that the slot will not be cleared. This method will, in this particular embodiment, always clear the slot and book the appointment.

Turning now to the clearSlot method, this method first performs the same logic described for the clearSlotFeasibility method in order to determine if the required slot can be cleared by shifting the blocking appointments out of the overlapping area. If it is feasible to clear the slot without canceling appointments, the recurseClearSlot method also returns a list of appointment actions that are required in order to clear the slot. This list of appointment actions contains instructions for how much to shift each affected appointment and whether to delete a setup appointment that can be eliminated. The appointment actions are also ordered so the actions can be performed without causing any appointments to overlap on the calendar as each action is performed sequentially. Note that the client calling the clearSlot method is responsible for booking the appointment and any pre-setup or post-setup appointments, so these appointment actions are not included in the list.

If the recurseClearSlot method indicates the clear slot is feasible, then the clearSlot method performs the actions in the appointment action collection and actually shifts the necessary appointments and eliminates unnecessary setup appointments, and then returns a Boolean true indicating the clear slot was performed successfully. If the recurseClearSlot method indicates the clear slot is not feasible without canceling appointments, then the recurseClearSlot method returns a list of overlapping appointments. The clearSlot method then gets the first overlapping appointment ("overlap appointment") that is not a setup appointment and calls a method named cancelOverlappingAppointments passing the "overlap appointment," "potential appointment" and the collection of overlapping appointments.

The cancelOverlappingAppointments method cancels the "overlap appointment" and once again performs the same logic described for the clearSlotFeasibility method in order to determine if the required slot can be cleared by shifting the new blocking appointments, if any, out of the overlapping area. If it is feasible to clear the slot without canceling appointments, the recurseClearSlot method also returns a list of appointment actions that are required in order to clear the slot. This list of appointment actions contains instructions for how much to shift each affected appointment and whether to delete a setup appointment that can be eliminated. The appointment actions are also ordered so the actions can be performed without causing any appointments to overlap on the calendar as each action is performed sequentially.

If the recurseClearSlot method indicates the clear slot is feasible, or if there are no more overlapping appointments, then the cancelOverlappingAppointments method ends and returns the list of appointment actions to the clearSlot method. If the recurseClearSlot method indicates the clear slot is not feasible without canceling appointments, then the recurseClearSlot method returns a new list of overlapping appointments to the cancelOverlappingAppointments method which then gets the first overlapping appointment ("overlap appointment") from the new list of overlapping appointments and calls itself again recursively. This recursion repeats until either the recurseClearSlot method indicates the clear slot is feasible, or there are no more overlapping appointments. When the cancelOverlappingAppointments method returns to the clearSlot method, the clearSlot method performs the actions in the appointment action collection, if any, and actually shifts the necessary appointments and eliminates unnecessary setup appointments, and then returns a Boolean true indicating the clear slot was performed successfully. Note that no other methods are allowed to update the calendar while the clearSlot method is executing.

The clearSlotAndBookAppointment method has one additional input—a collection of appointments that are expected to be cancelled. The clearSlotAndBookAppointment method performs all of the same logic as the clearSlot method except for the way it handles appointment cancellations. The client is responsible for setting the penalty refund in each of the appointments in the input appointment collection. Before canceling any appointments, the method checks the actual list of overlapping appointments against the input list of overlapping appointments. If the actual overlapping appointment collection contains any appointment that was not included in the input appointment collection, then the clearSlotAndBookAppointment method resets the penalty refund to zero for each appointment in the input list of overlapping appointments and then ends returning false. If the clearSlotAndBookAppointment method is successful in clearing the slot, then it books the potential appointment and any pre-setup or post-setup appointments on the calendar and resets the penalty refund to zero in each appointment in the input list of overlapping appointments that was not cancelled.

The forcedClearSlotAndBookAppointment method performs all of the same logic as clearSlotAndBookAppointment except for the handling of canceled appointments and some additional logic related to the last appointment on the calendar. The forcedClearSlotAndBookAppointment method will cancel any appointments that are necessary in order to clear the slot, even if they are not included in the input appointment collection. The client is responsible for setting the penalty refund in each of the appointments in the input appointment collection. If this method cancels an appointment that is not included in the input appointment collection, it calls the penalty refund calculator to calculate the penalty refund and then sets the refund into the appointment before canceling it. If the method does not cancel an appointment that was included in the input appointment collection, it resets the penalty refund of that appointment to zero.

The other difference between the forcedClearSlotAndBookAppointment method and the clearSlotAndBookAppointment method is that the forcedClearSlotAndBookAppointment method handles the last appointment on the calendar the same way as the openSlotAndBookAppointment method. If there is a last appointment and if the last appointment is a lot processing appointment and if the appointment to be booked is a lot processing appointment with zero remaining transport time, then the forcedClearSlotAndBookAppointment method saves the original end time of the last appointment and sets a flag indicating the last appointment may be cancelled. After the slot is cleared and the new appointment and any pre-setup or post-setup appointments are booked, the forcedClearSlotAndBookAppointment method checks the new end time of the last appointment, if any, against the original end time of the last appointment.

If the last appointment has shifted to a later time, it calculates the ratio of the shift duration to the appointment duration and compares the ratio against a configurable property. If the calculated ratio is greater than the property value, the last appointment should be cancelled so the forcedClearSlotAndBookAppointment method determines if the last appointment should get a penalty refund. If the last appointment paid a bumping fee, which is normally non-refundable, the forcedClearSlotAndBookAppointment method sets the penalty refund of the last appointment equal to the bumping fee it paid, otherwise the penalty refund for the last appointment is set to zero. If the last appointment should be cancelled, the forcedClearSlotAndBookAppointment method then cancels the last appointment. The reason for canceling the last appointment is that when it is shifted beyond the threshold, it may be able to find a better appointment on another machine.

As mentioned above, whether the agent uses clearSlot, clearSlotAndBookAppointment, or forcedClearSlotAndBookAppointment method depends upon context. The MSA may directly call the clearSlot method to clear a slot in order to book a new appointment. However, the MSA's helper class bid confirmer uses the clearSlotAndBookAppointment method to clear a slot and book a new appointment in one calendar operation. The clearSlotAndBookAppointment method is typically used when it expects to bump, i.e., cancel, appointments that are already booked on the calendar. The MSA's helper class bid confirmer uses the forcedClearSlotAndBookAppointment method to clear a slot and book an appointment in one calendar operation for an "override" bid confirmation. In this situation, the appointment is booked because an event has been detected indicating the corresponding activity (carrier arriving at port, PM started, Qual started, machine downtime started, etc.) has already begun.

The methods discussed above for opening and clearing slots on calendars call other methods that actually move, or shift, the appointments, as is apparent from the discussion. Some of these methods "pull" appointments, some "cascade shift," and one is a "jump over." Some of these techniques are applied to shift appointments both left (i.e., earlier in time) and right (i.e., later in time), while others operate in only one direction. Some are recursive, while others are not. Some of these techniques will now be discussed.

Consider, first, a powerful technique known a "cascade shift," whereupon multiple appointments booked on a calendar are shifted contemporaneously in a cascaded fashion. Thus, if desired and if possible, a first appointment is shifted left or right (i.e., earlier or later in time) on the calendar. A second appointment is then shifted, taking advantage of the shift by the first appointment to increase the amount of the shift. Whether this second appointment is before or after the first appointment will depend on whether the shift is left or right. A series of consecutive, but not necessarily back-to-back, appointments are then serially shifted, or "cascaded," in this manner to clear space on the calendar.

For instance, to cascade shift left in the illustrated embodiment, the scheduling agent for the calendar first determines the feasibility of shifting appointments left (to an earlier time) in a cascade fashion starting at a specified appointment and shifting by a specified amount of time. A locked appointment is considered non-shiftable. No appointments are shifted at this time. If it is determined that such a shift is feasible, then appointments may be shifted left (to an earlier time) in a cascade fashion starting at a specified appointment and shifting by a specified amount of time, depending on the context in which the cascade left shift feasibility is performed.

More particularly, the scheduling agent selects a first appointment on the calendar that it wishes to shift as a part of the cascade and the amount of time it wishes to shift that first appointment. More technically, in the illustrated embodiment, the scheduling agent calls a method named cascadeLeftShiftFeasibility. This method is called by the openSlotFeasibility method, discussed above, to determine the feasibility of a cascading left shift in order to open a slot on the calendar large enough to accommodate another appointment. The input to the cascadeLeftShiftFeasibility method is the first appointment to be shifted and the shift duration. The cascadeLeftShiftFeasibility method formulates a response that comprises a Boolean indicating whether the shift is feasible; the duration of a shift of which the appointment is actually capable; the net change in setup time required by the shift; the first blocking appointment (i.e., an appointment that cannot be shifted); and a list of appointment actions required in order to perform the cascading left shift.

To develop this response, the cascadeLeftShiftFeasibility method, in turn, calls a method named recurseLeftShift on the first appointment with the desired shift duration equal to the original desired shift duration. The method recurseLeftShift then calls a method canShiftLeft on the first appointment to determine if it can shift left (to an earlier time) the desired amount considering its dynamic earliest start time ("EST") constraint. If the first appointment cannot shift the full desired amount, it is designated the "blocking" appointment and its actual left shift duration is noted.

The method recurseLeftShift then finds the previous appointment on the calendar and determines the amount of gap (i.e., idle or open) time between the end of the previous appointment and the start of the first appointment. The method recurseLeftShift then subtracts the gap amount from the actual duration this previous appointment can shift and calculates the revised amount, if any, the previous appointment should shift in order for the first appointment to achieve its actual left shift time. If it encounters a setup appointment that can be eliminated because it is would end up sandwiched back-to-back between two appointments that utilize the same setup, it treats the setup duration as a gap amount and subtracts the setup duration when calculating the revised amount the previous appointment should shift.

If there is no previous appointment, or if the previous appointment is in a completed status, or if the actual shift amount of this appointment is zero, or if the desired shift amount has been achieved, the method recurseLeftShift ends and returns the actual left shift duration that is possible. Otherwise, the method recurseLeftShift recursively calls itself, this time with the previous appointment and the revised left shift duration it calculated for the previous appointment. When the method recurseLeftShift returns, it indicates the shift is feasible only if the actual shift amount capable is equal to the desired shift duration.

If the cascade left shift is possible and still desirable, a method named cascadeLeftShift is called. This method is called by LSAs and PMSAs when reacting to the MSA shifting an appointment left on its calendar. The cascadeLeftShift method receives as inputs the first appointment that should be shifted left and the desired shift duration, and outputs a Boolean indicator of whether the cascade left shift has been performed successfully.

More particularly, the cascadeLeftShift method calls the recurseLeftShift method previously called by the cascadeLeftShiftFeasibility method. The recurseLeftShift method checks the feasibility of the cascading left shift exactly as described in above when called by the cascaseLeftShiftFeasibility method. The recurseLeftShift method also returns a list of appointment actions that are required in order to perform the cascading left shift. This list of appointment actions contains instructions for how much to shift each affected appointment and whether to delete a setup appointment that can be eliminated. The appointment actions are also ordered starting with the earliest appointment affected, so the actions can be performed without causing any appointments to overlap on the calendar as each action is performed sequentially. If the recurseLeftShift method indicates the cascading left shift is feasible, then the cascadeLeftShift method performs the actions in the appointment action collection and actually shifts the necessary appointments and eliminates unnecessary setup appointments, and then returns a Boolean true indicating the shift was performed successfully. If the recurseLeftShift method indicates the cascading left shift is not feasible, then this method returns a Boolean false indicating the shift cannot be performed.

Cascade shifts can be made to the right, as well. A method named cascadeRightShiftFeasibility is called by the method openSlotFeasibility to determine the feasibility of a cascading right shift in order to open a slot on the calendar large enough to accommodate another appointment. The cascadeRightShiftFeasibility method also is called by a helper class object of the MSA to determine whether a machine calendar can accommodate a lot's request to shift its appointment to a later time. The cascadeRightShiftFeasibility method determines the feasibility of shifting appointments right (to a later time) in a cascade fashion starting at a specified appointment and shifting by a specified amount of time. A locked appointment is considered non-shiftable. The cascadeRightShiftFeasibility method receives as input the first appointment that should be shifted right, the desired shift duration, and the setup of the appointment preceding the first appointment. It outputs a shift feasibility response consisting of a Boolean indicator of whether the shift is feasible, the time duration of the shift that the appointment is actually capable of, the net change in setup time, the first blocking appointment, and a list of appointment actions required in order to perform the cascading right shift More particularly, the cascadeRightShiftFeasibility method calls a method named recurseRightShift on the first appointment with the desired shift duration equal to the original desired shift duration. The recurseRightShift method calls another method named canShiftRight on the appointment to determine if it can shift right (to a later time) the desired amount considering its latest delivery time ("LDT") constraint. If the appointment cannot shift the full desired amount, it is designated the blocking appointment and its actual right shift duration is noted. The recurseRightShift method then finds the next appointment on the calendar and determines the amount of gap time between the end of this appointment and the start of the next appointment. It then subtracts the gap amount from the actual duration this appointment can shift and calculates the revised amount, if any, the next appointment should shift in order for this appointment to achieve its actual right shift time.

If the recurseRightShift method encounters a setup appointment that can be eliminated because it is would end up sandwiched back-to-back between two appointments that utilize the same setup, it treats the setup duration as a gap amount and subtracts the setup duration when calculating the revised amount the next appointment should shift. If there is no next appointment, or if the actual shift amount of this appointment is zero, or if the desired shift amount has been achieved, the method ends and returns the actual right shift duration that is capable. Otherwise, the recurseRightShift recursively calls itself, this time with the next appointment and the revised right shift duration it calculated for the next appointment. When the recurseRightShift method returns, it indicates the shift is feasible only if the actual shift amount capable is equal to the desired shift duration.

If the cascade right shift is feasible and still desirable, one of three methods is called to perform the cascade right shift, depending on context. A method named cascadeRightShift shifts appointments right (to a later time) in a cascade fashion starting at a specified appointment and shifting by a specified amount of time. A locked appointment is not considered shiftable by the cascadeRightShift method. A method named cascadeLockedRightShift shifts appointments right (to a later time) in a cascade fashion starting at a specified appointment and shifting by a specified amount of time. A locked appointment is considered shiftable within the constraints of its LDT by this method. A method named cascadeForcedRightShift shifts appointments right (to a later time) in a cascade fashion starting at a specified appointment and shifting by a specified amount of time. This method shifts appointments even if they are locked. If the LDT of an appointment prevents it from shifting right by the required duration, the method increases the LDT by the amount of time required to achieve the desired shift and then shifts the appointment.

The cascadeRightShift method receives as input the first appointment that should be shifted right, the desired shift duration, and the setup of the appointment preceding the first appointment. The cascadeRightShift method outputs a Boolean indicator of whether the shift has been performed successfully. The cascadeRightShift method calls the recurseRightShift method and checks the feasibility of the cascading right shift exactly as described above for the cascadeRightShiftFeasibility method. The recurseRightShift method also returns a list of appointment actions that are required in order to perform the cascading right shift. This list of appointment actions contains instructions for how much to shift each affected appointment and whether to delete a setup appointment that can be eliminated. The appointment actions are also ordered starting with the latest appointment affected, so the actions can be performed without causing any appointments to overlap on the calendar as each action is performed sequentially.

If the recurseRightShift method indicates the cascading right shift is feasible, then the cascadeRightShift method performs the actions in the appointment action collection and actually shifts the necessary appointments and eliminates unnecessary setup appointments, and then returns a Boolean true indicating the shift was performed successfully. If the recurseRightShift method indicates the cascading right shift is not feasible, then the cascadeRightShift method returns a Boolean false indicating the shift cannot be performed.

The cascadeLockedRightShift method receives inputs of a first appointment that should be shifted right, a desired shift duration, a setup of the appointment preceding the first appointment and outputs a Boolean indicator of whether the shift has been performed successfully. The cascadeLockedRightShift method is the same as the cascadeRightShift method except that the cascadeLockedRightShift method ignores whether an appointment is locked and considers it shiftable within the constraints of its LDT.

The cascadeForcedRightShift method receives as inputs a first appointment that should be shifted right and a desired shift duration and outputs a Boolean indicator of whether the shift has been performed successfully. The cascadeForcedRightShift method is the same as the cascadeLockedRightShift method except if an appointment's LDT prevents it from shifting right by the required duration, the method increases the LDT by the amount of time required to achieve the desired shift and then shifts the appointment.

As mentioned, which one of the cascadeRightShift method, cascadeLockedRightShift method, and cascadeForcedRightShift method is called depends on the context. The cascadeRightShift method and cascadeLockedRightShift method are called by the lot and PMSAs when reacting to the MSA shifting a non-locked and a locked appointment, respectively, right on its calendar. The MSA also calls these methods in one of its helper class objects in order to determine if it can accommodate a consumer's request to shift an appointment to the right when the blocking appointment is not locked and locked, respectively. The cascadeForcedRightShift method is used by the LSA in situations where an appointment on its calendar has not completed by the scheduled end time yet there is no point in canceling subsequent appointments so they are forced to shift right in a cascading fashion in order to allow the appointment to expand.

The illustrated embodiment also includes a method named recurseCascadeRightShift. The loading RSA and MSA call this method when reacting to an event requiring a series of appointments to shift right. The recurseCascadeRightShift method operates recursively until it determines how to shift appointments in a cascade fashion starting at a specified appointment and shifting a specified amount of time to the right (later in time). If the shift is not feasible, the blocking appointment, or the blocking participants of a batch appointment, are canceled if the appointment is not locked, or its commitment window end time (LDT) is increased if it is locked. The recurseCascadeRightShift method then calls itself recursively until the required shift duration can be accomplished.

The recurseCascadeRightShift method receives as inputs the first appointment that should be shifted right, the desired shift duration, and a list of appointment actions, excluding appointment cancellations, that should be performed to achieve the cascading right shift and returns no output. However, the input list of appointment actions is initially empty but may be updated on subsequent recursive calls if any actions are required other than canceling appointments or increasing the LDT of an appointment. Therefore, the list of appointment actions is both an input and output.

The recurseCascadeRightShift method performs cascadeRightShiftFeasibility to determine if the cascading right shift is feasible. If the shift is feasible, the recurseCascadeRightShift method ends and returns the list of appointment actions provided by cascadeRightShiftFeasibility. If the shift is not feasible, the recurseCascadeRightShift method gets the blocking appointment provided by cascadeRightShiftFeasibility and determines whether it is a batch appointment. If the blocking appointment is a batch appointment, the method determines which batch participant(s) are blocking the batch appointment from shifting the required amount. If the blocking batch participant is not locked, the blocking batch participant is cancelled. If the blocking batch participant is locked, the method increases the LDT of the blocking participant so the batch appointment will be able to shift the required amount. Similarly, if the blocking appointment is not a batch appointment, the method either cancels the blocking appointment if it isn't locked, or increases the LDT of the blocking appointment by the required amount if it is locked.

Regardless of whether the blocking appointment is a batch appointment, after the recurseCascadeRightShift method eliminates the blocking appointment it calls itself again recursively with the same parameters it was initially called with. Thus, if there is more than one blocking appointment, the next blocking appointment is found and eliminated (cancelled or LDT increased to allow required shifting) on a subsequent recursive call. The recursion continues until all of the blocking appointments have been eliminated, and then the method ends by returning the list of appointment actions provided by the last call to cascadeRightShiftFeasibility. Although this method eliminates all the blocking appointments by canceling the appointment or increasing its LDT, the client is responsible for performing all of the other appointment actions, which are returned to the client, in order to achieve the cascading right shift.

Another management technique alternative to the cascaded shift is to pull an appointment, or a chain of appointments left or right by a predetermined amount. A "chain" of appointments is a series of appointments, each of which has the same setup. When pulling a chain of appointments, all appointments in the chain are pulled by the same predetermined amount and in the same direction. In this context, "pull" means to shift one or more booked appointments by a single, predetermined amount of time or, in the case of a single appointment, to a predetermined time.

To pull a single appointment left to a desired start time, it is first determined whether such a pull is feasible. The first appointment with a start time after the desired start time ("first appointment") is identified. Setup appointments are excluded, such that, if the appointment earliest in time after the desired start time is a setup appointment, it is skipped over. The next appointment after the setup appointment then becomes the "first appointment." If the method does not find a "first appointment," the search ends, and the result is a "null." If the "first appointment" requires an incompatible setup, the desired start time is recalculated by adding the setup duration to the original desired start time. The dynamic earliest start time ("EST") of the "first appointment," is then calculated excluding setup time, and compared to the desired start time. The later of the desired start time and the dynamic EST is selected. From the selected time and the desired start time, it is determined whether the proposed pull is feasible. Whether an appointment is locked is immaterial to this determination, i.e., in determination of whether the pull is feasible ignores whether the appointment is locked.

More technically, a method pullLeftFeasibility is called to make this determination. The method pullLeftFeasibility receives as input the desired start time for the first appointment and the setup preceding the desired start time. The determination is made as described above between the desired start time and the dynamic EST. The latest of the desired start time and the dynamic EST is returned as the earliest time the "first appointment" can start. The MSA calls the pullLeftFeasibility method in one of its helper class objects to determine if it can eliminate or reduce idle time immediately following the appointment that is currently active.

If it is both feasible and desirable to pull the appointment left, a method named pullLeft is called. The MSA calls the pullLeft method from one of its helper class objects to pull a chain of appointments left to the end time of a completed appointment or to the anticipated end time of an appointment nearing completion. The pullLeft method receives as input the desired start time for the first appointment and the setup preceding the desired start time. The pullLeft method pulls a chain of appointments to the left (earlier in time), considering setup requirements. It updates the calendar by shifting one or more appointments to the left and eliminating any unnecessary setup appointments. All appointments in the chain are shifted left by the same amount as the first appointment in the chain, unless a following appointment can be shifted more to the left so that it can start immediately following the previous appointment. This method works the same as pullLeftChain, discussed below, except it will shift locked appointments to the left within the constraints of the dynamic EST.

More particularly, the pullLeft method is called with the actual start time returned by the pullLeftFeasibility method. The pullLeft method ignores whether an appointment is locked when it shifts appointments to the left. After the pullLeft method shifts the first appointment left to the desired start time and eliminates any unnecessary setups, it then continues by attempting to shift additional appointments to the left behind the first appointment. This process continues until it encounters a different setup or an appointment that cannot shift left at least the same amount as the first appointment shifted left.

The pullLeft method begins by finding the first appointment that starts after the desired start time ("next appointment"). If there is no "next appointment," the pullLeft method ends. If the "next appointment" is a setup appointment with a compatible setup, it eliminates the setup appointment and resets the "next appointment" to the next appointment after the setup appointment. The pullLeft method calculates the duration the "next appointment" should shift left ("base duration"), which is the difference between the start time of the "next appointment" and the desired start time, and then shifts the appointment left by the amount of the "base duration."

The pullLeft method then begins an iterative loop in which it gets the next appointment after the "next appointment" and determines if it can be shifted left enough so that it starts immediately following the last appointment that was shifted left ("last appointment"). If the there is no "next appointment" or if the "next appointment" is a setup appointment, the method ends. Otherwise, the pullLeft method calculates the amount of time ("adjoin duration") the "next appointment" should shift left in order to start immediately following the "last appointment," and then determines if the "next appointment" can shift left the "adjoin duration," which is the difference between the start time of the "next appointment" and the new end time of the "last appointment." If the "next appointment" cannot shift left the "adjoin duration," the method determines if the "next appointment" can shift left by the "base duration." If the "next appointment" can shift left either the "adjoin duration" or "base duration," the next appointment is actually shifted left by the greater of the durations that are feasible, the "next appointment" is reset to the next appointment after the last appointment shifted left which then becomes the new "last appointment" and the process iterates again.

If there is no "next appointment" or if the "next appointment" is a setup appointment or if the "next appointment" cannot shift left by the "adjoin duration" or the "base duration," then the pullLeft method prepares to end. The last step is to check if a setup should be inserted after the "last appointment" actually shifted left. If the "next appointment" (after the "last appointment" actually shifted) requires a setup and that setup is not compatible with the setup of the "last appointment" or if the amount of time between the end of the "last appointment" and the "next appointment" is greater than the setup duration for the "next appointment," then a setup appointment is booked on the calendar immediately preceding the "next appointment." After booking any required setup, the pullLeft method ends.

Appointments may also be "pulled" in chains. For instance, the pullLeftChain method is used to optimize a schedule for machine calendars where setups are prevalent and time-consuming. When filling a gap in this type of calendar, the MSA tries to avoid breaking a chain of appointments. However, the MSA first calls the pullLeftChainFeasibility method to determine if a schedule can be optimized for machine calendars where setups are prevalent and time-consuming.

The pullLeftChainFeasibility method calculates the amount of time a chain of appointments sharing the same setup can pull left (to an earlier time) without breaking the chain. The pullLeftChainFeasibility method considers that a locked appointment cannot shift. It receives as input the first appointment in the chain and outputs the time duration that the chain can pull left without breaking the chain. The pullLeftChainFeasibility method works with a chain of appointments starting with the first appointment and including all appointments after the first appointment until there are no more appointments that depend on a specific setup requirement. It returns the maximum amount of time that all of the appointments in the chain can shift left.

The pullLeftChainFeasibility method first determines if the "first appointment" is a setup appointment, and if it is, it gets the next appointment after it, which then becomes the "first appointment." If there is no "first appointment," the pullLeftChainFeasibility method ends and returns duration equals zero. Otherwise, if there is a "first appointment," the pullLeftChainFeasibility method determines the maximum amount of time the "first appointment" can shift to the left and this duration becomes the "minimum" shift duration.

The pullLeftChainFeasibility method then begins an iterative loop in which it gets the next appointment ("next appointment") after the "first appointment" and determines whether the "next appointment" can shift left the "minimum" shift duration. The pullLeftChainFeasibility method determines the maximum amount of time the "next appointment" can shift left ("maximum" shift duration) and compares the "maximum" shift duration to the current value of "minimum" shift duration. If the "maximum" shift duration is less than the current value of "minimum" shift duration, the "minimum" shift duration is set equal to the "maximum" shift duration and the method iterates again by finding the appointment after the "next appointment" which then becomes the "next appointment." If at any point in the iterative loop there is no "next appointment," or if the "next appointment" is a setup appointment, or if the "next appointment" does not have a setup requirement, then the pullLeftChainFeasibility method ends and returns with duration equal to the current value of the "minimum" shift duration.

If the left chain pull is feasible and still desirable, the pullLeftChain method is called. The pullLeftChain method receives as inputs the time where the chain of appointments should start as a result of this method and the setup prior to the start time. The pullLeftChain method returns no output. The pullLeftChain method pulls a chain of appointments to the left (earlier in time), considering setup requirements. It updates the calendar by shifting one or more appointments to the left and eliminating any unnecessary setup appointments. All appointments in the chain are shifted left by the same amount as the first appointment in the chain, unless an appointment can be shifted more to the left so that it can start immediately following the previous appointment. This method is very similar to the pullLeft method except it considers a locked appointment cannot shift. To pull a chain of appointments left, the pullLeftChain method is called with the actual start time returned by the pulljeftChainFeasibility method, or a later start time, depending on the context. The pullLeftChain method works the same as the pullLeft method except it does not shift locked appointments. If an appointment is locked it considers the appointment cannot be shifted.

Chains of appointments may also be pulled right. A method named pullRightChain is used to optimize a schedule for machine calendars where setups are prevalent and time-consuming in a manner similar the pullLeftChain method discussed above. Again, when filling a gap in this type of calendar, the MSA tries to avoid breaking a chain of appointments. However, a method named pullRightChainFeasibility is called first to determine if a schedule can be optimized for machine calendars where setups are prevalent and time-consuming.

More particularly, the pullRightChainFeasibility method receives as inputs the right-most appointment for the chain of appointments to be pulled right and outputs the amount of time the appointment chain can be pulled right without breaking the chain. The pullRightChainFeasibility method calculates the duration (amount of time) that a chain of appointments, starting at a specified appointment, can pull right without breaking a chain of appointments that use the same setup. This method considers a locked appointment cannot be shifted.

The pullRightChainFeasibility method first determines the amount of time the specified appointment can shift right and this duration becomes the initial value for "minimum duration," the amount of time the appointment chain can pull left. It also determines the setup requirement, if any, for the specified appointment. It then enters an iterative loop in which it gets the previous appointment and determines whether the chain has ended or if the "previous appointment" can shift. If there is no "previous appointment," or if the "previous appointment" does not require a setup, or if the "previous appointment's" setup requirement is not compatible with the input appointment's setup, or if the "previous appointment" is a setup appointment, then the chain is broken and the method ends by returning the "minimum duration." Otherwise, the pullRightChainFeasibility method determines the amount of time the "previous appointment" can shift right, and compares this new duration against the "minimum duration." If the new duration is less than the "minimum duration," the value of the "minimum duration" is set to the new duration. After adjusting the "minimum duration," if required, the iterative loop begins again by getting the new "previous appointment" which is the appointment immediately before the old "previous appointment." If feasible and still desirable, the chain is pulled right by calling the pullRightChain method. The pullRightChain method receives as inputs the rightmost appointment of the chain of appointments that is to be pulled right and the time where the chain of appointments should end as a result of this method. The pullRightChain method returns no output. The pullRightChain method is very similar to the pullRightChainFeasibility method except it actually shifts the appointments to the right.

The pullRightChain method is called with a duration less than or equal to the duration returned by the pullRightChain-Feasibility method. The pullRightChain method first checks whether the specified appointment can shift right to end at the specified time, and the appointment returns the greatest end time ("new end time") it can support that is less than or equal to the specified time. The pullRightChain method then shifts the appointment to end at the "new end time." It then determines the setup requirement, if any, for the specified appointment and also determines the "new start time" of the appointment.

The pullRightChain method then enters an iterative loop in which it gets the previous appointment and determines whether the chain has ended or if the "previous appointment" can shift. If there is a "previous appointment," and the "previous appointment" requires a setup, and the "previous appointment's" setup requirement is compatible with the input appointment's setup, then the method checks whether the "previous appointment" can shift right to end at the "new start time." The "previous appointment" returns the greatest end time ("new end time") it can support that is less than or equal to the "new start time," and then the method shifts the "previous appointment" to end at the "new end time." If the "previous appointment" is a setup appointment, then the method ends, otherwise it sets the "new start time" to the new start time of the "previous appointment" and then begins the iterative loop again by getting the new "previous appointment" which is the appointment immediately before the old "previous appointment."

There is one other condition that can cause the iterative loop to stop. If there is no "previous appointment," or if the "previous appointment" does not require a setup, or if the "previous appointment's" setup requirement is not compatible with the input appointment's setup, then the chain is broken and the method prepares to end. If the "previous appointment" is a setup appointment that is compatible with the input appointment's setup, then the setup appointment is shifted to end at the "new start time." Otherwise, the pullRightChain method ends.

Another of these management techniques is not related to opening or clearing slots on calendars—"jump over." The jump over technique is illustrated in FIG. 8B and was first discussed above relative thereto. In the illustrated embodiment, a method named jumpoverFeasibility is called to determine whether a jump over is feasible and a method named jumpover is called to actually perform the jumpover. One use for this jump over technique is to fill idle time on the machine calendar when the appointment immediately following the idle time cannot shift left, or earlier in time, enough to eliminate the idle time. The machine scheduling agent, in this circumstance, considers filling the idle time by jumping a subsequent appointment over the intervening appointments to start at an earlier time. Each of these methods will now be discussed in greater detail.

The jumpoverFeasibility method uses a cutoff time and the current setup to find all the appointments on the calendar whose earliest start time is before the cutoff time. The jumpoverFeasibility method then temporarily removes the potential "jumping" appointment(s) from its(their) original location, and calculates the potential start time(s) as the maximum of the desired start time and the EST. The jumpoverFeasibility method then uses the potential start time to determine the new start time of the first appointment currently on the calendar starting after the desired start time. The jumpoverFeasibility method evaluates jumping for each of the appointments whose earliest start time is before the cutoff time.

The jumpoverFeasibility method calls the cascadeRightShiftFeasibility method to check whether this first appointment can be shifted to this new start time. If it is feasible, the jumpoverFeasibility method calculates the net setup change due to this "jump over" action, creates a jumpoverFeasibilityResponse and adds this response to the jumpoverFeasibilityResponseCollection. The jumpoverFeasibilityResponse is a collection of information regarding one "jumping" appointment, and the jumpoverFeasibilityResponseCollection is a collection of jumpoverFeasibilityResponses for various "jumping" appointments. If the cascade shift right is not feasible, the potential "jumping" appointment will not be selected as a candidate for being a "jumping" appointment. After the cascadeRightShiftFeasibility method returns, the jumpoverFeasibility method restores the temporarily removed appointment back into the calendar.

If feasible and still desirable, the jumpover method is called to actually perform the jump over action. The jumpover method receives as input, among other things, a start time that is the new start time of the "jumping" appointment or the pre-setup appointment of the "jumping" appointment if a pre-setup is required, and the current setup. The jumpover method uses the start time, current setup, and the setup of the jumping appointment to find the real start time of the "jumping" appointment, and it also temporarily removes the "jumping" appointment from the calendar.

The jumpover method then calls the cascadeRightShift method to clear a slot for the "jumping" appointment and the possible post-setup appointment. If the cascadeRightShift call succeeds, it calls a method named: jumpForward that puts the jumping appointment back into the calendar at the new start time using a simulated left shift. Otherwise, if the cascadeRightShift call does not succeed, the jumpover method throws an exception caught from the cascadeRightShift call and puts the temporarily removed appointment back into the calendar. If the cascadeRightShift call does not throw any exception, but returns a false value, the jumpover method will also throw an OverlappingException. The best jump over appointment should be the one that has the smallest total idle time among all the feasible jumpover appointments. The total idle time is the sum of the duration between the current time and the start time of the first appointment (the "jumping appointment") and the net setup duration.

Some of these calendar management techniques are related to changes in capacity or capability of machines in the process flow. For instance, the MSA calls a method named increaseThroughput when it detects that the machine's throughput has increased, typically because a chamber that was down has now become available. The increaseThroughput method shrinks all non-started processing appointments on the calendar to respond to an increase in the machine's throughput rate. Each time it shrinks an appointment, the method attempts to pull following appointments to the left (earlier in time) and then recursively calls itself if there are more processing appointments after the last appointment that it shrank.

More particularly, the increaseThroughput method receives as inputs the starting time when throughput of machine increases and, e.g., the number of chambers available at the starting time and returns no output. The increaseThroughput method gets the first processing appointment that starts after the specified time and has not started processing. If there is no such processing appointment, the increaseThroughput method ends. Otherwise, the increaseThroughput method finds the lot's wafer count and process-operation, and obtains the processing time for the given machine and number of available chambers. The increaseThroughput method calculates the new end time of the appointment by adding the processing time to the start time, and then shrinks the appointment to end at the new end time.

The increaseThroughput method then gets the next appointment ("next appointment") after the appointment that it shrank, and the method ends if there is no "next appointment." If there is a "next appointment," the method calls the pullLeftChainFeasibility method for the "next appointment."

The pullLeftChainFeasibility method returns the feasible shift duration for the "next appointment," which the increaseThroughput method then subtracts from the start time of the "next appointment" in order to calculate the earliest starting time for the "next appointment." If the earliest starting time of the "next appointment" is earlier than the new end time of the shrunken appointment, the desired start time of the "next appointment" is set to the new end time of the shrunken appointment, otherwise the desired start time is set to the earliest starting time that was calculated for the "next appointment." If the desired start time of the "next appointment" is earlier than the actual start time, the increaseThroughput method calls the pullLeftChain method with the desired start time and the setup of the appointment that was shrunk. The increaseThroughput method then calls itself recursively with the new end time of the shrunken appointment and the same number of available chambers. The increaseThroughput method ends when there are no more processing appointments on the calendar.

As is evident from the discussion above, the calendaring technique of the present invention contributes more than storing information representing booked appointments. The calendaring technique provides functionality throughout the entire scheduling process, including bid generation, bid confirmation, bid request, as well as appointment execution and reactive scheduling. For example, the openSlotFeasibility, openSlot, openSlotAndBookAppointment, clearSlotFeasibility, and forcedClearSlotAndBookAppointment, methods are called during bid confirmation; the openSlotFeasibility and clearSlotFeasibility methods are called during bid generation; the cascadeRightShiftFeasibility, cascadeLockedRightShiftFeasibility, pullLeftFeasibility, pullLeftChainFeasibility, cascadeRightShift, cascadeLockedRightShift, pullLeft, pullLeftChain, and pullRightChain methods are called to change a previously booked appointment. The cascadeLeftShift, cascadeLockedRightShift, and recurseCascadeRightShift methods are used in reactive scheduling.

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Thus, the present invention includes, but is not limited to, in its various aspects, embodiments, and implementations:

a calendaring system comprising autonomous agents, calendars, and appointments, wherein the agents represent a respective one of a plurality of manufacturing domain entities with respect to at least one of scheduling and processing, each calendar is maintained by one of the agents in scheduling for the respective domain entity; and each appointment existing in one of a plurality of appointment states and being scheduled on behalf the manufacturing domain entities by the agents on the respective calendar for the manufacturing domain entity;
  the use of calendars with appointments including a floating processing window within a commitment window, in which the commitment window defined by an earliest start time and a latest delivery time and the processing window is defined by a start time and an end time within the commitment window;
  the use of calendars with appointments including a floating processing window within a commitment window, in which the processing window includes a first interval (i.e., a "consumption interval") in which at least one lot is consumed for processing and a second interval (i.e., a "processing interval") in which the consumed lot is processed;
  manipulating appointments on calendars in a process flow, whether by booking a tentative appointment or altering a booked appointment, using any of several powerful calendar manipulation techniques, such as:
    determining the feasibility of opening a slot for a tentative appointment on a calendar, opening the feasible slot, and booking the tentative appointment on the calendar in the opened slot;
    determining the feasibility of clearing a slot for a tentative appointment on a calendar, clearing the feasible slot, and booking the tentative appointment on the calendar in the cleared slot;
    pulling a booked appointment left to an end time for an earlier booked appointment;
    pulling a chain of booked appointments left to an end time for an earlier booked appointment;
    pulling a chain of booked appointments right;
    shifting a plurality of booked appointments left in a cascade; and
    shifting a plurality of booked appointments right in a cascade;
  synchronizing corresponding appointments on different calendars kept by different agents for different manufacturing domain entities for the same activity in a process flow; and
  explicitly constraining the booking of a new appointment with the presence of previously booked appointments and implicitly constraining the booking of the new appointment with at least one attribute of the previously booked appointments;

Still other aspects, embodiments, and implementations of the invention may become apparent to those skilled in the art having the benefit of this disclosure.

This concludes the detailed description. The particular embodiments disclosed above are illustrative only, as the invention may be modified and practiced in different but equivalent manners apparent to those skilled in the art having the benefit of the teachings herein. Note that further variations not discussed may be employed in still other embodiments. For instance, if a machine has idle time to sell it may want to advertise, or, individual machines may be assigned sales quotas as a goal to meet in utilization. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for windowing appointments, comprising:
   providing a commitment window; and
   providing a processing window floating within the commitment window, the processing window including:
   a first interval in which at least one lot is consumed for processing; and
   a second interval in which the consumed lot is processed.

2. The method of claim 1, wherein the commitment windows for at least two of the appointments overlap.

3. The method of claim 2, wherein the second interval of at least one of the appointments overlaps with the processing window of at least one other appointment.

4. The method of claim 1, wherein at least two processing windows are booked back-to-back.

5. A calendar of appointments, each appointment comprising:
   a commitment window; and
   a processing window floating within the commitment window, the processing window including:
   a first interval in which at least one lot is consumed for processing; and
   a second interval in which the consumed lot is processed.

6. The calendar of claim 5, wherein the commitment windows for at least two of the appointments overlap.

7. The calendar of claim 6, wherein the second interval of at least one of the appointments overlaps with the processing window of at least one other appointment.

8. The calendar of claim 5, wherein each appointment exists in a status selected from the group consisting of tentative, unready, ready, active, processing, near complete, active PM/Qual, processing PM/Qual, completed, and aborted.

9. The calendar of claim 5, wherein at least two processing windows are booked back-to-back.

10. The calendar of claim 5, wherein each appointment is of a type selected from the group consisting of a move appointment, a lot appointment, a load appointment, an unload appointment, a feeder appointment, a max move appointment, a lot processing appointment, a setup appointment, a machine PM appointment, a machine Qual appointment, a machine batch appointment, an unscheduled downtime appointment, a PM appointment, a Qual appointment, a load lot appointment, an unload lot appointment, a charge lot appointment, a discharge lot appointment, a resource load batch appointment, a resource unload batch appointment, a resource charge batch appointment, a resource discharge batch appointment, a resource PM appointment, a resource Qual appointment, and a resource downtime appointment.

11. The calendar of claim 5, wherein the calendar is of a type selected from the group consisting of a machine calendar, a PM calendar, a lot calendar, and a resource calendar.

12. The calendar of claim 11, wherein the selected calendar type is the machine calendar, and the machine calendar is of a further type selected from tle group consisting of a batch machine calendar, a lot machine calendar, a wafer machine calendar, and a sequential machine calendar.

13. The calendar of claim 11, wherein the selected calendar type is the machine calendar, and each of the appointments is of a type selected from the group consisting of a lot processing appointment, a setup appointment, a machine PM appointment, a machine Qual appointment, a machine batch appointment, and an unscheduled downtime appointment.

14. The calendar of claim 11, wherein the selected calendar type is the resource calendar, and the resource calendar is of a further type selected from the group consisting of a shared resource calendar and a dedicated resource calendar.

15. The calendar of claim 11, wherein the selected calendar type is the resource calendar, and each appointment is selected from a group consisting of a load lot appointment, an unload lot appointment, a charge lot appointment, a discharge lot appointment, a resource load batch appointment, a resource unload batch appointment, a resource charge batch appointment, a resource discharge batch appointment, a resource PM appointment, a resource Qual appointment, and a resource downtime appointment.

16. The calendar of claim 11, wherein the selected calendar type is the lot calendar, and each appointment is selected from the group consisting of a lot appointment, a load appointment, an unload appointment, a feeder appointment, and a max move appointment.

17. The calendar of claim 11, wherein the selected calendar type is the PM calendar, and each appointment is selected from the group consisting of a PM appointment and a Qual appointment.

18. A method for calendaring appointments, comprising:
   booking a processing appointment on a calendar;
   defining a first portion of the booked appointment as a consumption interval; and
   defining a non-overlapping portion of the booked appointment as a processing interval.

19. The method of claim 18, wherein the consumption interval is set to zero.

20. The method of claim 18, further comprising:
   booking a second processing appointment on the calendar;
   defining a first portion of the second booked appointment as a second consumption interval; and
   defining a non-overlapping portion of the second booked appointment as a second processing interval.

21. A method for calendaring appointments, comprising:
   explicitly constraining an appointment with the presence of another appointment booked on the same calendar; and
   implicitly constraining an appointment with at least one attribute representing a constraint that may not be associated with any other appointment on the same calendar.

22. The method of claim 21, wherein explicitly constraining the booking of the new appointment includes explicitly constraining an appointment from shifting to an earlier start time by an earlier booked appointment on the same calendar or explicitly constraining the appointment from shifting to a later start time by a later booked appointment on the same calendar.

23. The method of claim 21, wherein implicitly constraining an appointment includes implicitly constraining the earliest start time of an appointment with at least one attribute representing a transport delay, a loading delay, a setup delay or the current time.

24. The method of claim 21, wherein implicitly constraining an appointment includes implicitly constraining the shifting of the appointment or separation between the appointment and a previous appointment with at least one attribute representing an unloading delay or a discharge duration.

25. A method for calendaring appointments, comprising:
booking a first appointment on a first calendar;
booking a second appointment corresponding to the first appointment on a second calendar; and
synchronizing changes to the first and second appointments responsive to events in a process flow.

26. The method of claim 25, wherein:
the first calendar is a machine calendar, the first appointment is a lot processing appointment, the second calendar is a lot calendar, and the second appointment is a lot appointment;
the first calendar is a resource calendar, the first appointment is a load lot appointment, the second calendar is a lot calendar, and the second appointment is a load appointment;
the first calendar is a resource calendar, the first appointment is an unload lot appointment, the second calendar is a lot calendar, and the second appointment is an unload appointment;
the first calendar is a PM calendar, the first appointment is a PM appointment, the second calendar is a machine calendar, and the second appointment is a machine PM appointment;
the first calendar is a PM calendar, the first appointment is a Qual appointment, the second calendar is a machine calendar, and the second appointment is a machine Qual appointment;
the first calendar is a PM calendar, the first appointment is a PM appointment, the second calendar is a resource calendar, and the second appointment is a resource PM appointment;
the first calendar is a PM calendar, the first appointment is a Qual appointment, the second calendar is a resource calendar, and the second appointment is a resource Qual appointment;
the first calendar is a machine calendar, the first appointment is an unscheduled downtime appointment, the second calendar is a resource calendar, and the second appointment is a resource downtime appointment;
the first calendar is a machine calendar, the first appointment is a machine batch appointment, the second calendar is resource calendar, and the second appointment is a resource charge batch appointment or a resource discharge batch appointment; or
the first calendar is a machine calendar, the first appointment is a lot processing appointment, the second calendar is a resource calendar, and the second appointment is a charge lot appointment or a discharge lot appointment.

27. The method of claim 25, wherein synchronizing changes to the first and second appointments includes:
broadcasting a change to the first appointment;
listening for the broadcast; and
upon hearing of a broadcast change event, initiating a corresponding change to the second appointment.

28. The method of claim 27, wherein listening for the broadcast includes subscribing to a plurality of notifiers.

29. The method of claim 25, further comprising logging the change or logging the contents of the calendar after the change.

30. The method of claim 25, further comprising displaying a third calendar, the third calendar including a third appointment synchronized to the first or second appointments.

31. A calendaring system, comprising:
a first calendar an which a first appointment is booked; and
a second calendar on which a second appointment is booked, the second appointment being synchronized to the first appointment responsive to events in a process flow.

32. The method of claim 31, wherein:
the first calendar is a machine calendar, the first appointment is a lot processing appointment, the second calendar is a lot calendar, and the second appointment is a lot appointment;
the first calendar is a resource calendar, the first appointment is a load lot appointment, the second calendar is a lot calendar, and the second appointment is a load appointment;
the first calendar is a resource calendar, the first appointment is an unload lot appointment, the second calendar is a lot calendar, and the second appointment is an unload appointment;
the first calendar is a PM calendar, the first appointment is a PM appointment, the second calendar is a machine calendar, and the second appointment is a machine PM appointment;
the first calendar is a PM calendar, the first appointment is a Qual appointment the second calendar is a machine calendar, and the second appointment is a machine Qual appointment;
the first calendar is a PM calendar, the first appointment is a PM appointment, the second calendar is a resource calendar, and the second appointment is a resource PM appointment;
the first calendar is a PM calendar, the first appointment is a Qual appointment, the second calendar is a resource calendar, and the second appointment is a resource Qual appointment;
the first calendar is a machine calendar, the first appointment is an unscheduled downtime appointment, the second calendar is a resource calendar, and the second appointment is a resource downtime appointment;
the first calendar is a machine calendar, the first appointment is a machine batch appointment, the second calendar is resource calendar, and the second appointment is a resource charge batch appointment or a resource discharge batch appointment; or
the first calendar is a machine calendar, the first appointment is a lot processing appointment, the second calendar is a resource calendar, and the second appointment is a charge lot appointment or a discharge lot appointment.

33. The calendaring system of claim 31, further comprising:
a notifier capable of broadcasting a change to the first appointment; and
a listener capable of listening for the broadcast and, upon hearing of a broadcast change event, initiating a corresponding change to the second appointment.

34. The calendaring system of claim 33, wherein initiating the corresponding change includes triggering a scheduling agent for a manufacturing domain entity for whom the second appointment is booked to make the corresponding change.

35. The calendaring system of claim 33, wherein broadcasting the change includes publishing the appointment change event.

36. The calendaring system of claim 33, wherein listening for the broadcast includes subscribing to the notifier.

37. The calendaring system of claim 31, further comprising a logger capable of logging the change or logging the contents of the calendar after the change.

38. The calendaring system of claim 37, wherein logging the change includes listening for all broadcast changes.

39. The calendaring system of claim 31, further comprising a third calendar displayed to a display device, the third calendar including a third appointment synchronized to the first or second appointments.

40. The calendaring system of claim 39, further comprising a display listener capable of listening for the broadcast and, upon hearing of the broadcast change event, initiating a corresponding change to the third appointment.

* * * * *

UNITED STATES PATENT AND TRADEMARK OFFICE
CERTIFICATE OF CORRECTION

| | | |
|---|---|---|
| PATENT NO. | : 7,512,454 B1 | Page 1 of 1 |
| APPLICATION NO. | : 10/160956 | |
| DATED | : March 31, 2009 | |
| INVENTOR(S) | : Yiwei Li et al. | |

It is certified that error appears in the above-identified patent and that said Letters Patent is hereby corrected as shown below:

Title page, No. 54: Delete "Display Unit With Processor and Communication Controller" and insert --Scheduling Calendars and Appointments in a Manufacturing Process Flow--.

Title page, No. 63: Delete "Continuation of application No. 09/732,291 filed on Dec. 8, 2000, now Pat. No. 6,549,970". This patent is not a continuation nor does it claim priority to any other application or patent.

In Claim 12, column 58, line 8, delete "tle" and insert therefor --the--.

In Claim 31, column 60, line 8, delete "an" and insert therefor --on--.

In Claim 32, column 60, line 31, insert a --,-- after "Qual appointment".

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,512,454 B1 | Page 1 of 1 |
| APPLICATION NO. | : 10/160956 | |
| DATED | : March 31, 2009 | |
| INVENTOR(S) | : Yiwei Li et al. | |

It is certified that error appears in the above-identified patent and that said Letters Patent is hereby corrected as shown below:

Title page, Item (54) and at Column 1, lines 1 and 2, Title: Delete "Display Unit With Processor and Communication Controller" and insert --Scheduling Calendars and Appointments in a Manufacturing Process Flow--.

Title page, Item (63): Delete "Continuation of application No. 09/732,291 filed on Dec. 8, 2000, now Pat. No. 6,549,970". This patent is not a continuation nor does it claim priority to any other application or patent.

In Claim 12, column 58, line 8, delete "tle" and insert therefor --the--.

In Claim 31, column 60, line 8, delete "an" and insert therefor --on--.

In Claim 32, column 60, line 31, insert a --,-- after "Qual appointment".

This certificate supersedes the Certificate of Correction issued April 5, 2011.

Signed and Sealed this
Third Day of May, 2011

David J. Kappos
*Director of the United States Patent and Trademark Office*